US012180029B2

(12) United States Patent
Kobayashi et al.

(10) Patent No.: US 12,180,029 B2
(45) Date of Patent: Dec. 31, 2024

(54) PLATEN CONVEYANCE DEVICE

(71) Applicant: BROTHER KOGYO KABUSHIKI KAISHA, Nagoya (JP)

(72) Inventors: Tetsuro Kobayashi, Chiryu (JP); Shuichi Tamaki, Nagoya (JP); Yutaka Takagiwa, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 144 days.

(21) Appl. No.: 17/846,592

(22) Filed: Jun. 22, 2022

(65) Prior Publication Data

US 2022/0315364 A1 Oct. 6, 2022

Related U.S. Application Data

(63) Continuation of application No. PCT/JP2020/048399, filed on Dec. 24, 2020.

(30) Foreign Application Priority Data

Dec. 25, 2019 (JP) ................................ 2019-233952

(51) Int. Cl.
*B65H 5/18* (2006.01)
*B41J 11/06* (2006.01)

(52) U.S. Cl.
CPC ................ *B65H 5/18* (2013.01); *B41J 11/06* (2013.01)

(58) Field of Classification Search
CPC .................................. B65H 5/18; B41J 11/06
See application file for complete search history.

(56) References Cited

U.S. PATENT DOCUMENTS

| | | | | |
|---|---|---|---|---|
| 9,108,447 | B1 * | 8/2015 | Komiya | B41J 25/308 |
| 9,352,592 | B2 * | 5/2016 | Anzai | B41J 13/0009 |
| 9,434,187 | B2 * | 9/2016 | Mashima | B41J 11/20 |
| 9,475,314 | B2 * | 10/2016 | Kojima | B41J 15/04 |
| 10,618,315 | B2 * | 4/2020 | Hamada | B41J 3/4078 |

(Continued)

FOREIGN PATENT DOCUMENTS

| | | |
|---|---|---|
| CN | 105934352 A | 9/2016 |
| CN | 106827812 A | 6/2017 |

(Continued)

OTHER PUBLICATIONS

Espacenet translation of CN206827812; https://translationportal.epo.org/emtp/translate/?ACTION=description-retrieval&COUNTRY=CN&ENGINE=google&FORMAT=docdb&KIND=A&LOCALE=en_EP&NUMBER=106827812&OPS=ops.epo.org/3.2&SRCLANG=zh&TRGLANG=en (Year: 2019).*

(Continued)

*Primary Examiner* — Leslie A Nicholson, III
(74) *Attorney, Agent, or Firm* — K&L Gates LLP

(57) ABSTRACT

A platen conveyance device includes a first conveyance path, a platen supporter, a second conveyance path, and a positioner. The first conveyance path is configured to convey a platen to a pretreatment device. The platen supporter is configured to support the platen conveyed by the first conveyance path. The second conveyance path is provided with the platen supporter. The second conveyance path is configured to convey the platen supporter to a printer. The positioner is configured to position the platen supported by the platen supporter at a prescribed printing position in a first direction in a horizontal direction.

17 Claims, 33 Drawing Sheets

(56) References Cited

U.S. PATENT DOCUMENTS

| | | | | |
|---|---|---|---|---|
| 10,696,065 | B2 * | 6/2020 | Mombourquette | B41J 11/06 |
| 11,279,126 | B2 * | 3/2022 | Fujimaki | B41J 11/0095 |
| 2005/0068358 | A1 | 3/2005 | Misutani | |
| 2009/0097044 | A1 | 4/2009 | Zach | |
| 2013/0314483 | A1 | 11/2013 | Moriya | |
| 2016/0089904 | A1 | 3/2016 | Kitagishi | |
| 2016/0325571 | A1 | 11/2016 | Aragon et al. | |
| 2017/0113894 | A1 | 4/2017 | Zou et al. | |
| 2018/0093497 | A1 | 4/2018 | Bekkem et al. | |
| 2018/0162148 | A1 | 6/2018 | Komiya | |
| 2018/0345689 | A1 | 12/2018 | Hojo | |
| 2018/0345699 | A1 | 12/2018 | Hojo | |
| 2018/0345700 | A1 | 12/2018 | Hojo | |
| 2019/0299663 | A1 | 10/2019 | Takagiwa | |
| 2019/0366740 | A1 | 12/2019 | Watanabe et al. | |

FOREIGN PATENT DOCUMENTS

| | | | | | |
|---|---|---|---|---|---|
| CN | 106994839 | A | | 8/2017 | |
| CN | 107010458 | A | | 8/2017 | |
| CN | 108973341 | A | | 12/2018 | |
| CN | 108973342 | A | | 12/2018 | |
| CN | 106827812 | B | * | 6/2019 | B41J 11/0015 |
| JP | H03199069 | A | | 8/1991 | |
| JP | H10157915 | A | | 6/1998 | |
| JP | 2003205653 | A | | 7/2003 | |
| JP | 2004291399 | A | | 10/2004 | |
| JP | 2005067103 | A | | 3/2005 | |
| JP | 2006044941 | A | | 2/2006 | |
| JP | 2006231834 | A | | 9/2006 | |
| JP | 2009241370 | A | | 10/2009 | |
| JP | 2011037239 | A | | 2/2011 | |
| JP | 2011156721 | A | | 8/2011 | |
| JP | 2013028444 | A | | 2/2013 | |
| JP | 2017148970 | A | | 8/2017 | |
| JP | 2018202651 | A | | 12/2018 | |
| JP | 2019178008 | A | | 10/2019 | |
| JP | 2019209587 | A | | 12/2019 | |

OTHER PUBLICATIONS

International Preliminary Report on Patentability for corresponding PCT application PCT/JP2020/048399, dated Jun. 28, 2022.
Written Opinion for corresponding PCT application PCT/JP2020/048399, dated Mar. 16, 2021. (3 pages.).
International Search Report of corresponding PCT application PCT/JP2020/048399, dated Mar. 16, 2021.
International Search Report of PCT application PCT/JP2020/048398, dated Mar. 16, 2021.
International Preliminary Report on Patentability for corresponding PCT application PCT/JP2020/048398, dated Jun. 28, 2022.
Written Opinion for corresponding PCT application PCT/JP2020/048398, dated Mar. 16, 2021. (3 pages.).
Office Action issued in related Chinese Patent Application No. 202080089577.8, dated Jul. 6, 2023. (9 pages.).
Office Action issued in related Chinese Patent Application No. 202080089736.4, dated Jun. 29, 2023. (7 pages.).
Extended European Search Report issued in related European Patent Application No. 20907505.0, dated Dec. 8, 2023. (10 pages.).
Extended European Search Report issued in related European Patent Application No. 20908026.6, dated Dec. 11, 2023. (10 pages.).
Office Action issued in related Chinese Patent Application No. 202080089577.8, dated Nov. 29, 2023. (7 pages.).
Office Action issued in related U.S. Appl. No. 17/846,562, dated Dec. 21, 2023. (8 pages.).
Office Action issued in related Japanese Patent Application No. 2021-567601, dated Feb. 13, 2024. (2 pages.).
Office Action issued in related Japanese Patent Application No. 2021-567602, dated Feb. 13, 2024. (2 pages.).
Decision of Refusal issued in related Chinese Patent Application No. 202080089577.8, dated Mar. 20, 2024. (5 pages.).

* cited by examiner

PLATEN CONVEYANCE DEVICE

CROSS-REFERENCE TO RELATED APPLICATIONS

This application is a continuation application of International Application No. PCT/JP2020/048399, filed Dec. 24, 2020, which claims priority from Japanese Patent Application No. 2019-233952, filed on Dec. 25, 2019. The disclosure of the foregoing application is hereby incorporated by reference in its entirety.

BACKGROUND

The present disclosure relates to a platen conveyance device.

A printer is provided with a platen and a printing portion. The platen includes a support surface able to support a cloth, and moves toward the printing portion. The printing portion performs printing on the cloth supported by the platen.

SUMMARY

Before printing on a cloth by a printer, a pretreatment is sometimes performed on the cloth using a pretreatment device. In this case, it is necessary for an operator to set the cloth on which the pretreatment has been performed by the pretreatment device on a support surface of a platen of the printer, and this requires time and effort. Here, a mechanism is conceivable with which the platen supporting the cloth is conveyed to the pretreatment device using a first conveyance path, then the platen conveyed using the first conveyance path is transferred to a second conveyance path and is conveyed to the printer, for example. In the above-described mechanism, if the position of the platen becomes displaced from the first conveyance path with respect to the second conveyance path, in the printing by the printer, there is a possibility that a printing position may be displaced.

Embodiments of the broad principles derived herein provide a platen conveyance device that reduces a positional displacement when transferring the platen.

A platen conveyance device related to one aspect of the present disclosure includes a first conveyance path, a platen supporter, a second conveyance path, and a positioner. The first conveyance path is configured to convey a platen to a pretreatment device. The platen supporter is configured to support the platen conveyed by the first conveyance path. The second conveyance path is provided with the platen supporter. The second conveyance path is configured to convey the platen supporter to a printer. The positioner is configured to position the platen supported by the platen supporter at a prescribed printing position in a first direction in a horizontal direction.

When the platen supporter is conveyed to the printer by the second conveyance path, the positioner positions the platen at the prescribed printing position in the horizontal direction. Thus, the platen conveyance device can reduce positional displacement when transferring the platen.

BRIEF DESCRIPTION OF THE DRAWINGS

Embodiments will be described below in detail with reference to the accompanying drawings in which.

DETAILED DESCRIPTION

Figure 1:
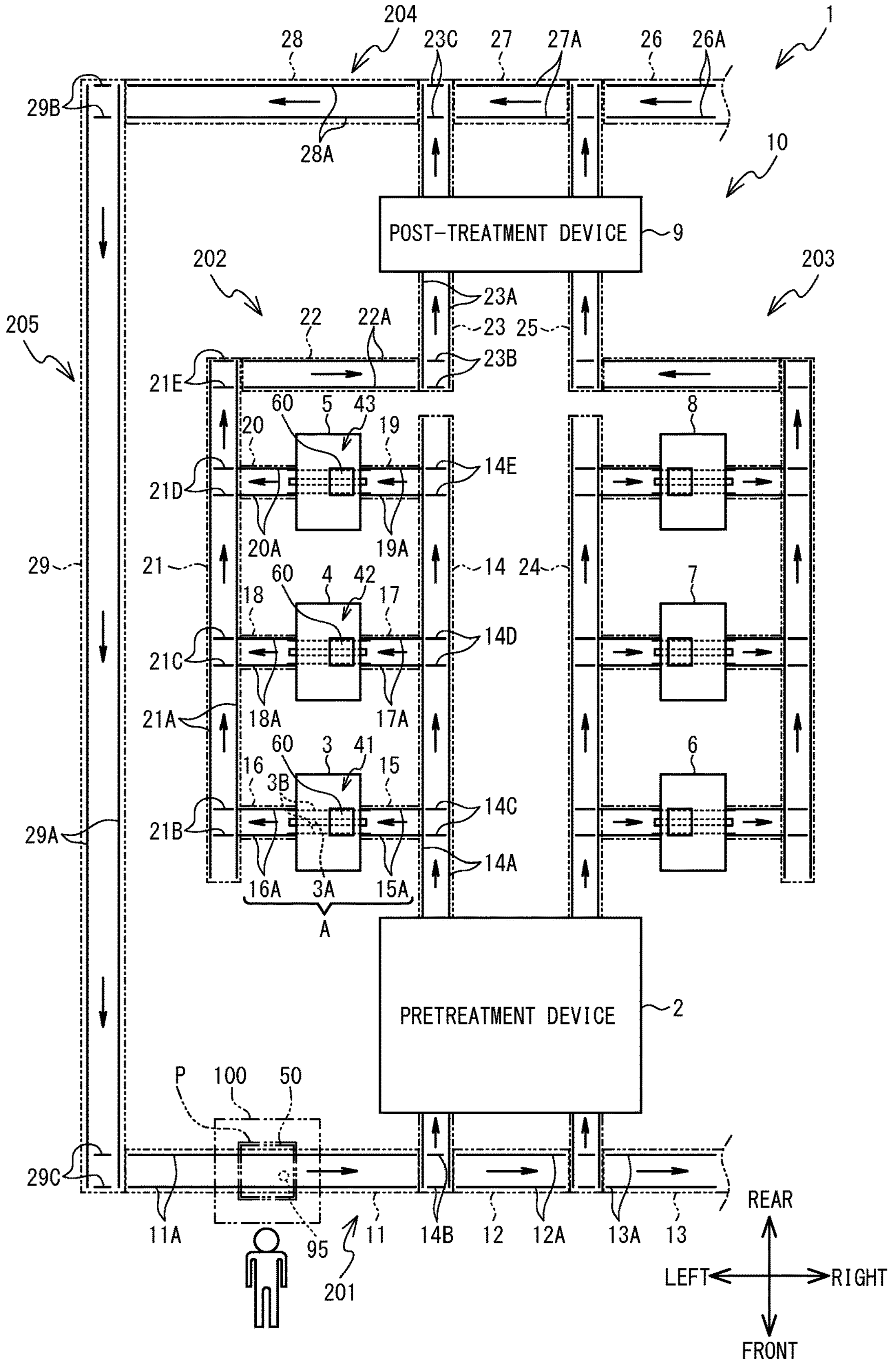
FIG. 1 is a plan view of a print system.

In a description of an embodiment of the present disclosure, left and right, front and rear, and up and down directions shown by arrows in the drawings are used. A print system 1 shown in FIG. 1 performs pretreatment, print processing, and post-treatment on a print medium supported by a platen 50, while conveying the platen 50. An example of the print medium is a cloth, such as a T-shirt or the like. Examples of a material of the cloth include cotton, polyester, a cotton/polyester mix, and the like.

The configuration of the print system 1 will be described with reference to FIG. 1. The print system 1 is provided with a pretreatment device 2, printers 3 to 8, a post-treatment device 9, a platen conveyance mechanism 10, a code reader 95, and the like. The pretreatment device 2 is disposed at the front of the print system 1, and performs pretreatment on a cloth P supported by the platen 50. The pretreatment device 2 is provided with an application portion and a heat treatment portion, for example. The application portion sprays a pretreatment agent using a spray, and applies the pretreatment agent to the cloth P supported by the platen 50. The pretreatment agent is a base coat agent that is applied before ink is applied to the cloth P. The pretreatment agent is a liquid to form a film between fibers of the cloth so that the ink is fixed on the cloth P more effectively, and is, for example, an aqueous solution containing a resin component, a metal salt, such as $CaCl_2$), and the like. The heat treatment portion heats the pretreatment agent applied to the cloth P at a high temperature. Thus, fixing of the pretreatment agent on the cloth P is improved, and quality of a print image is improved.

To the rear of the pretreatment device 2, three of the printers 3 to 5 are aligned in the front-rear direction on the left, and three of the printers 6 to 8 are aligned in the front-rear direction on the right. The printers 3 to 8 are inkjet printers that perform printing by ejecting ink from nozzles of a print head onto the cloth P after the pretreatment that is supported by the platen 50. The post-treatment device 9 is disposed to the rear of the printers 3 to 8, and, by heating the cloth P after the printing that is supported by the platen 50 at a high temperature and drying the ink, improves the fixing of the ink to the cloth P. The platen conveyance mechanism 10 conveys the platen 50 disposed at a preparation position 100 (to be described later) in an order of the pretreatment device 2, one of the printers 3 to 8, and the post-treatment device 9, and once more returns the platen 50 to the preparation position 100.

The code reader 95 provided at the preparation position 100 (to be described later) reads identification information for identifying the cloth P, from an identification information portion (not shown in the drawings) provided on the cloth P and inputs the read identification information to the print system 1. The identification information is information to identify the cloth P, and is, for example, information of a code, such as a one-dimensional code, such as a bar code, a two-dimensional code, such as a QR code (registered trademark), or a three-dimensional code. The identification information may include information about a type, a color, a size, of the cloth P, a print color, a print size, and the like.

The configuration of the platen conveyance mechanism 10 will be explained with reference to FIG. 1. The platen conveyance mechanism 10 is provided with a dispatch line 201, a left processing line 202, a right processing line 203, a first return line 204, and a second return line 205.

The dispatch line 201 is provided extending linearly in the left-right direction, at the forefront of the print system 1, and conveys the platen 50 toward the left processing line 202 and the right processing line 203 to be described later. The dispatch line 201 is provided with conveyance mechanisms 11 to 13 in that order from the left. The preparation position 100 is provided at the conveyance mechanism 11. The preparation position 100 is a position for preparation at which the cloth P is attached to the platen 50. The conveyance mechanisms 11 to 13 convey the platen 50 to the right. A front end portion of a conveyance mechanism 14 to be described later is disposed between the conveyance mechanisms 11 and 12. A front end portion of a conveyance mechanism 24 to be described later is disposed between the conveyance mechanisms 12 and 13.

The left processing line 202 and the right processing line 203 are provided side by side in the left-right direction, between the dispatch line 201 and the first return line 204 to be described later. The left processing line 202 conveys the platen 50 received from the dispatch line 201 to the pretreatment device 2, to one of the printers 3 to 5, and to the post-treatment device 9, in that order, and transfers the platen 50 to the first return line 204. The right processing line 203 conveys the platen 50 received from the dispatch line 201 to the pretreatment device 2, to one of the printers 6 to 8, and to the post-treatment device 9, in that order, and transfers the platen 50 to the first return line 204.

The left processing line 202 is provided with the conveyance mechanism 14 and conveyance mechanisms 15 to 23 and print conveyance mechanisms 41 to 43. The conveyance mechanism 14 extends to the rear from between the conveyance mechanisms 11 and 12 of the dispatch line 201, passes through the interior of the pretreatment device 2, and further extends to the rear. The conveyance mechanism 14 receives the platen 50 from the conveyance mechanism 11, passes through the pretreatment device 2, and conveys the platen 50 to the rear. The conveyance mechanism 15 extends to the left from the conveyance mechanism 14 toward the printer 3. The conveyance mechanism 15 receives the platen 50 from the conveyance mechanism 14, and conveys the platen 50 toward the printer 3. The conveyance mechanism 16 extends to the left from the printer 3. The conveyance mechanism 16 receives the platen 50 from the printer 3, and conveys the platen 50 to the left.

The conveyance mechanism 17 is disposed to the rear of the conveyance mechanism 15, and extends to the left from the conveyance mechanism 14 toward the printer 4. The conveyance mechanism 17 receives the platen 50 from the conveyance mechanism 14, and conveys the platen 50 toward the printer 4. The conveyance mechanism 18 extends to the left from the printer 4. The conveyance mechanism 18 receives the platen 50 from the printer 4, and conveys the platen 50 to the left. The conveyance mechanism 19 is disposed to the rear of the conveyance mechanism 17, and extends to the left from the conveyance mechanism 14 toward the printer 5. The conveyance mechanism 19 receives the platen 50 from the conveyance mechanism 14, and conveys the platen 50 toward the printer 5. The conveyance mechanism 20 extends to the left from the printer 5. The conveyance mechanism 20 receives the platen 50 from the printer 5, and conveys the platen 50 to the left.

The conveyance mechanism 21 extends in the front-rear direction, to the left of the printers 3 to 5, and is coupled to each of the left end portions of the conveyance mechanisms 16, 18, and 20. The conveyance mechanism 21 receives the platen 50 from each of the conveyance mechanisms 16, 18, and 20, and conveys the platen 50 to the rear. The conveyance mechanism 22 is disposed to the rear of the printer 5, and extends to the right from the rear end portion of the conveyance mechanism 21. The conveyance mechanism 22 receives the platen 50 from the conveyance mechanism 21, and conveys the platen 50 to the right. The conveyance mechanism 23 extends to the rear from the right end portion of the conveyance mechanism 22, passes through the interior of the post-treatment device 9, and further extends to the rear. The conveyance mechanism 23 receives the platen 50 from the conveyance mechanism 22, passes through the post-treatment device 9, and conveys the platen 50 to the rear. The rear end portion of the conveyance mechanism 23 is disposed between conveyance mechanisms 27 and 28 of the first return line 204 to be described later.

The print conveyance mechanism 41 is provided at the printer 3, and can convey the platen 50 in the left-right direction. The print conveyance mechanism 41 is provided with a platen supporter 60, a ball screw 3A, a pair of rails 3B, and a conveyance motor 137 (refer to FIG. 12). The platen supporter 60 receives the platen 50 from the conveyance mechanism 15 and supports the platen 50. The ball screw 3A extends in the left-right direction. The pair of rails 3B are provided at positions on either side of the ball screw 3A such that the ball screw 3A is positioned centrally therebetween, and extend in the left-right direction. A nut (not shown in the drawings) that is screwed onto the ball screw 3A is fixed to the platen supporter 60.

The conveyance motor 137 causes the ball screw 3A to rotate. In this way, the platen supporter 60 can move together with the nut along the ball screw 3A, as a result of the driving of the conveyance motor 137. Note that the configuration for conveying the platen supporter 60 may be a configuration other than described above, and the configuration may be provided with a pair of pulleys, an endless belt, and a motor, for example. The endless belt is stretched across the pair of pulleys. The platen supporter 60 is fixed to a part of the endless belt. As a result of the motor causing one of the pulleys to rotate in a normal and reverse direction, the endless belt moves between the pair of pulleys. In this way, the platen supporter 60 can move together with the endless belt.

The printer 4 is provided with the print conveyance mechanism 42, and the printer 5 is provided with the print conveyance mechanism 43. The print conveyance mechanisms 42 and 43 have the same configuration as the print conveyance mechanism 41, and a description thereof is thus omitted here.

The right processing line 203 has a structure that is left-right symmetrical with the left processing line 202, and a description thereof is thus omitted here. The conveyance mechanism 24 is provided at the front end of the right processing line 203, and a conveyance mechanism 25 is provided at the rear end of the right processing line 203. The conveyance mechanism 24 has the same structure as the conveyance mechanism 14 of the left processing line 202. The front end portion of the conveyance mechanism 24 is disposed between the conveyance mechanisms 12 and 13 of the dispatch line 201. The conveyance mechanism 25 has the same structure as the conveyance mechanism 23 of the left processing line 202. The rear end portion of the conveyance mechanism 25 is disposed between conveyance mechanisms 26 and 27 of the first return line 204 to be described later.

The first return line 204 is disposed at the rearmost portion of the print system 1, extends linearly in the left-right direction, and conveys the platen 50 received from the left processing line 202 and the right processing line 203 to the left. The first return line 204 is provided with the conveyance mechanisms 26 to 28 in that order from the right. The conveyance mechanisms 26 to 28 convey the platen 50 to the left. The rear end portion of the conveyance mechanism 23 of the left processing line 202 is disposed between the conveyance mechanisms 27 and 28. The rear end portion of the conveyance mechanism 25 of the right processing line 203 is disposed between the conveyance mechanisms 26 and 27.

The second return line 205 extends linearly in the front-rear direction, conveys the platen 50 received from the first return line 204 to the front, and transfers the platen 50 to the conveyance mechanism 11. The second return line 205 is provided with a conveyance mechanism 29. The conveyance mechanism 29 conveys the platen 50 to the front. The platen 50 transferred to the conveyance mechanism 11 is returned to the preparation position 100 by the conveyance mechanism 11.

The conveyance mechanism 13 of the dispatch line 201 may convey the platen 50 toward another processing line (not shown in the drawings). The other processing line may have the same configuration as the left processing line 202 and the right processing line 203. The conveyance mechanism 26 of the first return line 204 may convey the platen 50 received from the other processing line (not shown in the drawings) to the left.

A belt configuration of the platen conveyance mechanism 10 will be explained with reference to FIG. 1. Apart from being left-right symmetrical, the belt configurations of each of the left processing line 202 and the right processing line 203 are the same as each other. Thus, the belt configuration of the left processing line 202 will be described and a description of the belt configuration of the right processing line 203 will be omitted. The conveyance mechanisms 11 to 13 are respectively provided with pairs of lateral belts 11A to 13A. The lateral belts 11A to 13A are provided at both end portions of the conveyance mechanisms 11 to 13 in a direction orthogonal to a conveyance direction, in a plan view, and convey the platen 50 to the right.

The conveyance mechanism 14 is provided with a pair of longitudinal belts 14A and pairs of lateral raising/lowering belts 14B to 14E. The pair of longitudinal belts 14A are provided at both end portions of the conveyance mechanism 14 in a direction orthogonal to the conveyance direction, in a plan view. The pair of longitudinal belts 14A convey the platen 50 to the rear. The pairs of lateral raising/lowering belts 14B to 14E are disposed between the pair of longitudinal belts 14A. The pair of lateral raising/lowering belts 14B are provided at the front end portion of the conveyance mechanism 14 such that they can be raised and lowered. The pair of lateral raising/lowering belts 14B convey the platen 50 to the right. The pair of lateral raising/lowering belts 14C can be raised and lowered on the right of the conveyance mechanism 15. The pair of lateral raising/lowering belts 14D can be raised and lowered on the right of the conveyance mechanism 17. The pair of lateral raising/lowering belts 14E can be raised and lowered on the right of the conveyance mechanism 19. The pairs of lateral raising/lowering belts 14C to 14E convey the platen 50 to the left.

The conveyance mechanisms 15 to 20 are respectively provided with pairs of lateral conveyance belts 15A to 20A. The pairs of lateral conveyance belts 15A to 20A are respectively provided at both end portions of the conveyance mechanisms 15 to 20 in a direction orthogonal to the conveyance direction, in a plan view, and are provided such that they can be raised and lowered.

The conveyance mechanism 21 is provided with a pair of longitudinal belts 21A and pairs of lateral raising/lowering belts 21B to 21E. The pair of longitudinal belts 21A are provided at both end portions of the conveyance mechanism 21 in a direction orthogonal to the conveyance direction, in a plan view. The pair of longitudinal belts 21A convey the platen 50 to the rear. The pairs of lateral raising/lowering belts 21B to 21E are disposed between the pair of longitudinal belts 21A, can be raised and lowered on the left of the conveyance mechanisms 16, 18, 20, and 22, respectively. The pairs of lateral raising/lowering belts 21B to 21D convey the platen 50 to the left, and the pair of lateral raising/lowering belts 21E convey the platen 50 to the right.

The conveyance mechanism 22 is provided with a pair of lateral belts 22A. The pair of lateral belts 22A are provided at both end portions of the conveyance mechanism 22 in a direction orthogonal to the conveyance direction, in a plan view, and convey the platen 50 to the right. The conveyance mechanism 23 is provided with a pair of longitudinal belts 23A and pairs of lateral raising/lowering belts 23B and 23C. The pair of longitudinal belts 23A are provided at both end portions of the conveyance mechanism 23 in a direction orthogonal to the conveyance direction, in a plan view. The pair of longitudinal belts 23A convey the platen 50 to the rear. The pairs of lateral raising/lowering belts 23B and 23C are disposed between the pair of longitudinal belts 23A, and can be raised and lowered on the right of the conveyance mechanisms 22 and 28, respectively. The pair of lateral raising/lowering belts 23B convey the platen 50 to the right, and the pair of lateral raising/lowering belts 23C convey the platen 50 to the left.

The conveyance mechanisms 26 to 28 are respectively provided with pairs of lateral belts 26A to 28A that extend in the conveyance direction, and convey the platen 50 in the conveyance direction in each of the conveyance mechanisms 26 to 28, that is, to the left. The conveyance mechanism 29 is provided with a pair of longitudinal belts 29A and pairs of lateral raising/lowering belts 29B and 29C. The pair of longitudinal belts 29A are provided at both end portions of the conveyance mechanism 29 in a direction orthogonal to the conveyance direction, in a plan view. The pair of longitudinal belts 29A convey the platen 50 to the front. The pairs of lateral raising/lowering belts 29B and 29C are disposed between the pair of longitudinal belts 29A, and can be raised and lowered on the left of the conveyance mechanisms 28 and 11, respectively. The pair of lateral raising/lowering belts 29B convey the platen 50 to the left, and the pair of lateral raising/lowering belts 29C convey the platen 50 to the right.

Figure 12:
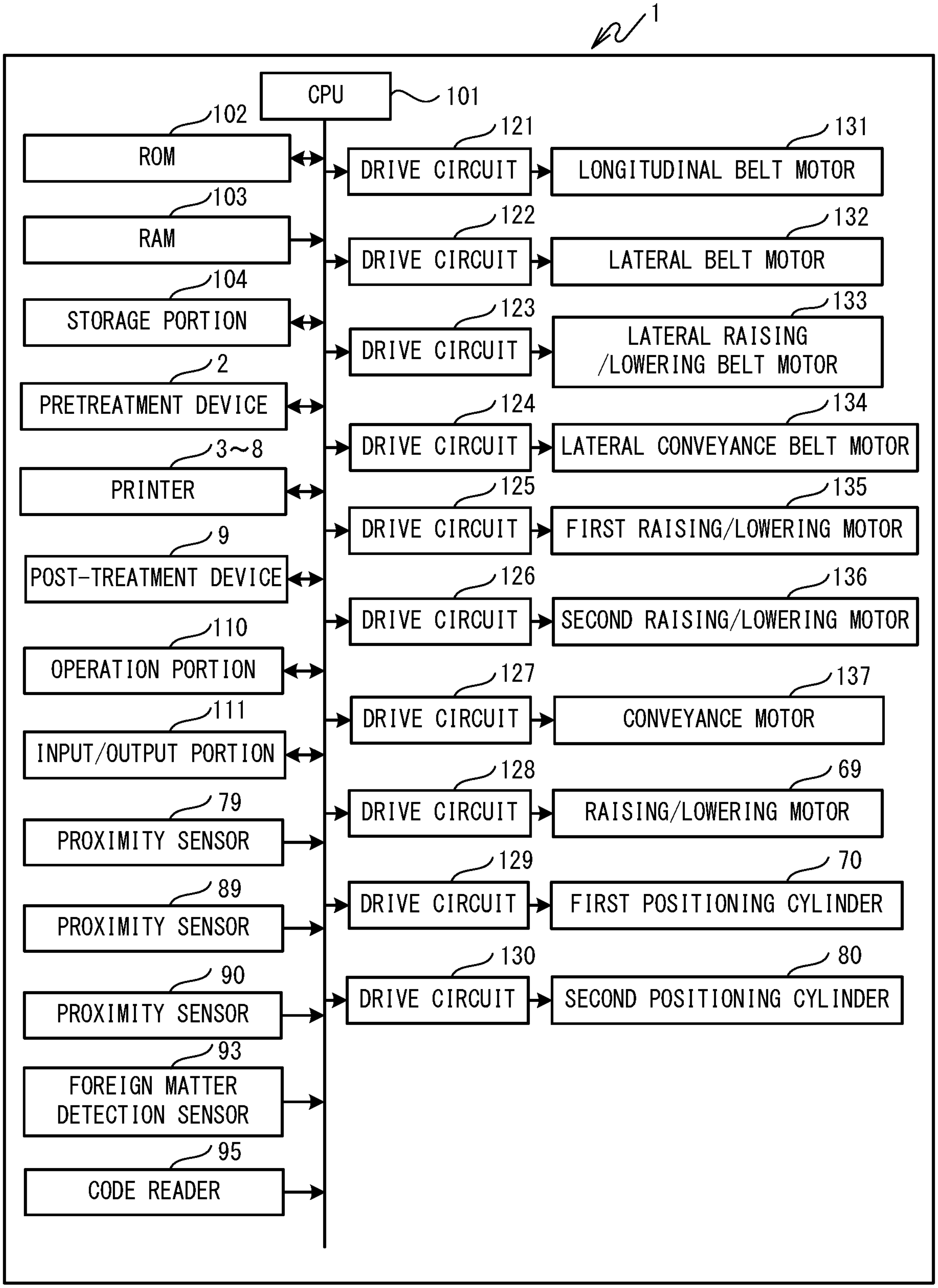
FIG. 12 is a block diagram showing an electrical configuration of the print system.

As shown in FIG. 12, the platen conveyance mechanism 10 is further provided with a longitudinal belt motor 131, a lateral belt motor 132, a lateral raising/lowering belt motor 133, a lateral conveyance belt motor 134, a first raising/lowering motor 135, a second raising/lowering motor 136, the conveyance motor 137, a raising/lowering motor 69, and the like. The longitudinal belt motor 131 is provided so as to correspond to each of the longitudinal belts 14A, 21A, 23A, and 29A, and drives each of the belts. The lateral belt motor 132 is provided so as to correspond to each of the lateral belts 11A to 13A, 22A, and 26A to 28A, and drives each of the belts. The lateral raising/lowering belt motor 133 is provided so as to correspond to each of the lateral raising/lowering belts 14B to 14E, 21B to 21E, 23B, 23C, 29B, and 29C, and drives each of the belts. The lateral conveyance belt motor 134 is provided so as to correspond to each of the lateral conveyance belts 15A to 20A, and drives each of the belts. The first raising/lowering motor 135 is provided so as to correspond to each of the lateral raising/lowering belts 14B to 14E, 21B to 21E, 23B, 23C, 29B, and 29C, and raises and lowers each of the belts. The second raising/lowering motor 136 is provided so as to correspond to each of the lateral conveyance belts 15A to 20A, and raises and lowers each of the belts.

An example of a platen conveyance operation by the platen conveyance mechanism 10 will be described with reference to FIG. 1. Sensors (not shown in the drawings) are respectively disposed at positions of the respective lateral raising/lowering belts. The sensors can detect the platen 50 that is on the corresponding lateral raising/lowering belt. On the basis of a detection result from each of the sensors, a CPU 101 controls the driving and the upward and downward movement of each of the belts. When the conveyance of the platen 50 from the preparation position 100 is instructed, the lateral belts 11A are driven and convey the platen 50 to the right. At this time, the lateral raising/lowering belts 14B are disposed at the same height position as the lateral belts 11A, an d transfer the platen 50 from the lateral belts 11A to the lateral raising/lowering belts 14B. After that, the driving of the lateral raising/lowering belts 14B is stopped and the lateral raising/lowering belts 14B are lowered. At the same time, the longitudinal belts 14A are driven. The platen 50 is placed on the longitudinal belts 14A as a result of the lateral raising/lowering belts 14B being lowered to be lower than the longitudinal belts 14A, and the platen 50 is conveyed to the rear. The platen 50 passes through the pretreatment device 2, and is further conveyed to the rear.

When the platen 50 reaches a position above the lateral raising/lowering belts 14C, the driving of the longitudinal belts 14A is stopped, and the upward movement of the lateral raising/lowering belts 14C is started. The lateral raising/lowering belts 14C are raised to be higher than the longitudinal belts 14A, and are stopped at the same height position as the lateral conveyance belts 15A. The lateral conveyance belts 15A and the lateral raising/lowering belts 14C are driven, and the platen 50 is transferred from the lateral raising/lowering belts 14C to the lateral conveyance belts 15A. The lateral conveyance belts 15A are driven, and convey the platen 50 toward the printer 3. The platen 50 is transferred from the lateral conveyance belts 15A to the platen supporter 60 provided inside the printer 3. Note that a specific procedure by which the platen 50 is transferred from the lateral conveyance belts 15A to the platen supporter 60 will be described later.

The platen 50 is supported by the platen supporter 60, is conveyed to the left along the pair of rails 3B, and the printing is performed inside the printer 3. When the printing is complete, the platen 50 is conveyed to the left from inside the printer 3, and is stopped at a left end position of the pair of rails 3B. Next, when the lateral conveyance belts 16A are raised, the platen 50 is lifted up by the lateral conveyance belts 16A, and separates from the platen supporter 60. Next, the lateral raising/lowering belts 21B of the conveyance mechanism 21 is raised to the same height position as the lateral conveyance belts 16A. The lateral conveyance belts 16A and the lateral raising/lowering belts 21B are driven, and the platen 50 is transferred from the lateral conveyance belts 16A to the lateral raising/lowering belts 21B. The driving of the lateral raising/lowering belts 21B is stopped and the lateral raising/lowering belts 21B are lowered. At the same time, the longitudinal belts 21A of the conveyance mechanism 21 are driven. The platen 50 is placed on the longitudinal belts 21A as a result of the lateral raising/ lowering belts 21B being lowered to be lower than the longitudinal belts 21A, and the platen 50 is conveyed to the rear.

Subsequently, although not described in detail, the platen 50 is conveyed in the order of the conveyance mechanisms 21, 22, and 23 using the same transfer operation as described above, and passes through the post-treatment device 9. The platen 50 that has passed through the post-treatment device 9 is transferred from the left processing line 202 to the first return line 204, and from the first return line 204 to the second return line 205 in that order, is transferred to the conveyance mechanism 11 of the dispatch line 201, and is returned to the preparation position 100.

The structure of the platen 50 will be explained with reference to FIG. 2 to FIG. 5. A process A shown in FIG. 1 is a process in which the platen 50 is conveyed in order of the conveyance mechanism 15, the printer 3, and the conveyance mechanism 16. Hereinafter, in a description from FIG. 2 to FIG. 24, for ease of description, in the process A shown in FIG. 1, the right direction on paper (an upstream in the conveyance direction) is the front of the printer 3, the left direction on paper (a downstream in the conveyance direction) is the rear of the printer 3, the upward direction on paper is the right of the printer 3, and the downward direction on paper is the left of the printer 3. An orientation of the platen 50 is described using the directions shown in FIG. 2 to FIG. 5, and FIG. 14 to FIG. 20 in the same manner as directions in the process A. The same process as the process A is also provided in the printers 4 to 8, but in a first embodiment, the process A is described as an example.

Figure 2:
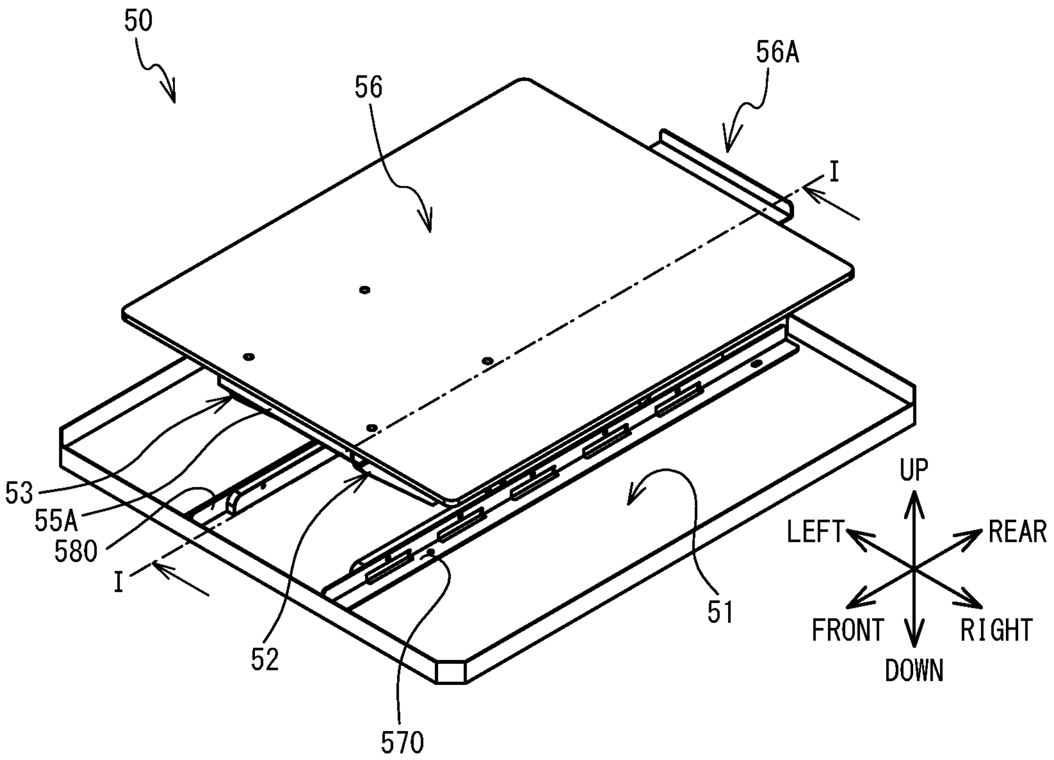
FIG. 2 is a perspective view of a platen.
Figure 3:
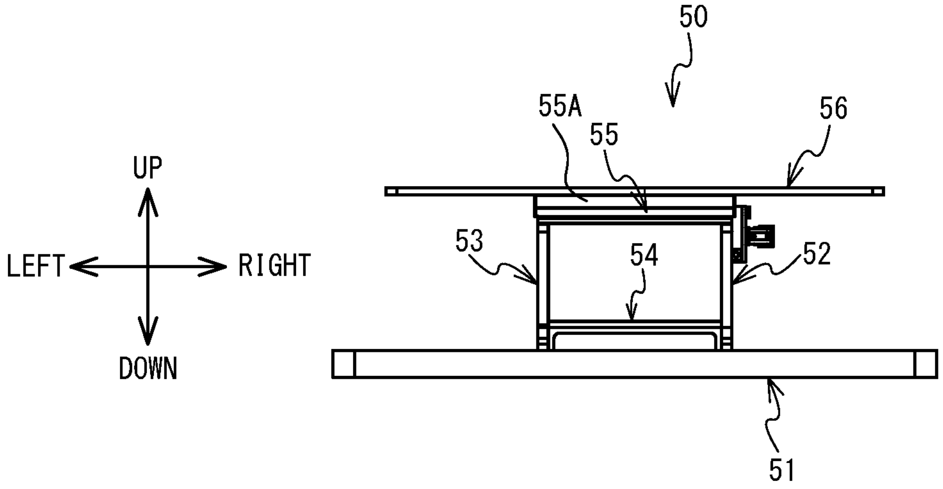
FIG. 3 is a front view of the platen.
Figure 4:
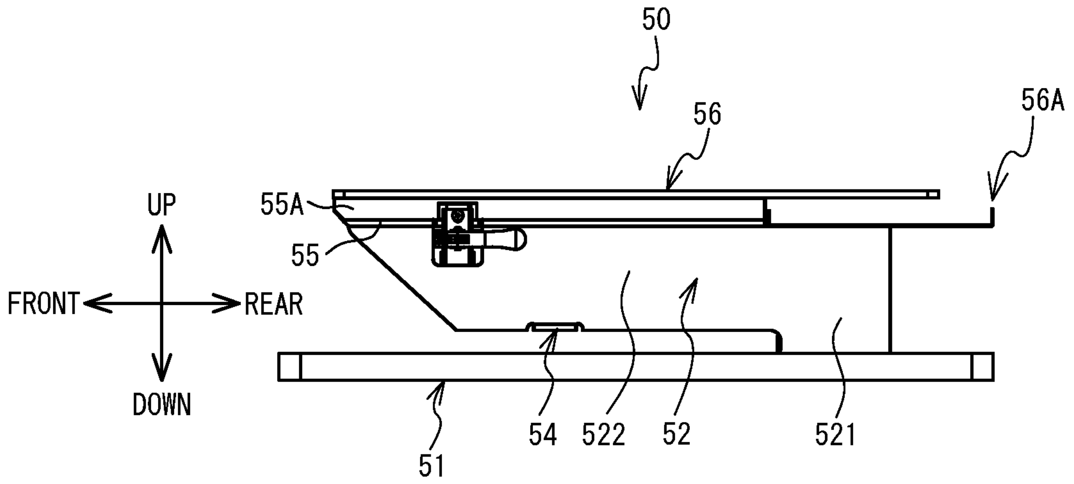
FIG. 4 is a right side view of the platen.

As shown in FIG. 2 and FIG. 3, the platen 50 is provided with a seat 51, a right side face plate 52, a left side face plate 53, a lower plate 54, a upper plate 55, and an attachment plate 56. The seat 51 is formed in a rectangular shape in a plan view. At a substantially central portion in the left-right direction of the upper surface of the seat 51, a pair of supporters 570 and 580 are fixed at positions that are separated from each other in the left-right direction. As shown in FIG. 4, the right side face plate 52 is formed in an inverted L shape in a right side view and is provided with an upward extending portion 521 and a forward extending portion 522. The upward extending portion 521 extends in the up-down direction from the seat 51. The forward extending portion 522 extends forward from the upper portion of the upward extending portion 521, and extends in the front-rear direction. The front end portion of the forward extending portion 522 is inclined toward the rear from the upper portion to the lower portion thereof. On the upper surface of the seat 51, the right side face plate 52 is disposed to the left of the supporter 570 shown in FIG. 2. The lower end portion of the upward extending portion 521 of the right side face plate 52 is fixed to the left surface of the supporter 570 using screws (not shown in the drawings). Thus, the right side face plate 52 stands on the upper surface of the seat 51.

Figure 5:
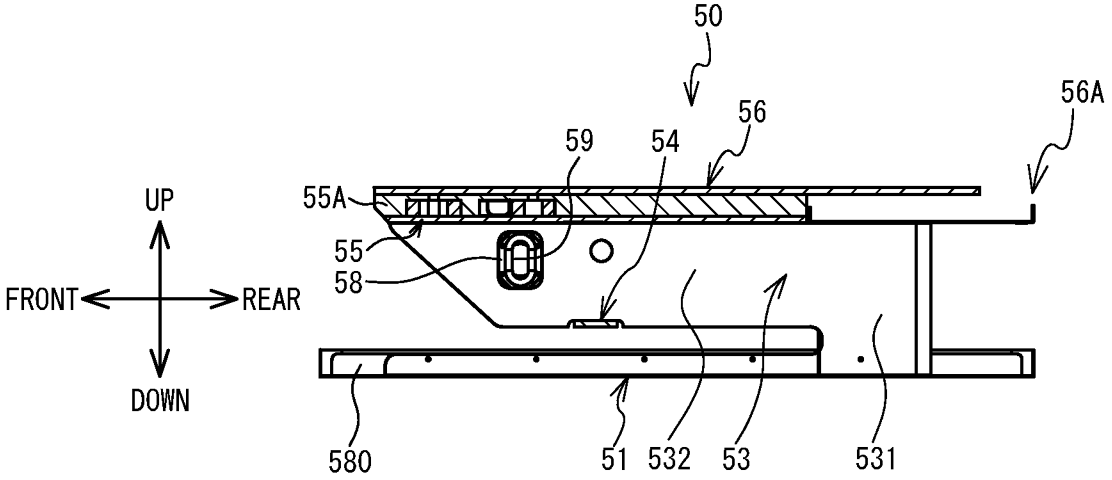
FIG. 5 is a cross-sectional view in the direction of arrows along a line I-I shown in FIG. 2.

As shown in FIG. 5, in the same manner as the right side face plate 52, the left side face plate 53 is provided with an upward extending portion 531 and a forward extending portion 532, and is formed in an inverted L shape in a left side view. The front end portion of the forward extending portion 532 is inclined toward the rear from the upper portion to the lower portion thereof. On the upper surface of the seat 51, the left side face plate 53 is disposed to the right of the supporter 580. The lower end portion of the upward extending portion 531 of the left side face plate 53 is fixed to the right surface of the supporter 580 using screws (not shown in the drawings). Thus, the left side face plate 53 stands on the upper surface of the seat 51 in parallel to the right side face plate 52.

As shown in FIG. 3 to FIG. 5, the lower plate 54 connects a front portion of the lower end portion of the forward extending portion 522 of the right side face plate 52 and a front portion of the lower end portion of the forward extending portion 532 of the left side face plate 53. The upper plate 55 connects the upper end portion of the right side face plate 52 and the upper end portion of the left side face plate 53, and is provided in parallel with the lower plate 54. In a plan view, the upper plate 55 has a substantially rectangular shape that is smaller than the seat 51. The attachment plate 56 is fixed to the upper surface of the upper plate 55 via a spacer 55A that is a metal plate. In a plan view, the attachment plate 56 is formed in a substantially rectangular shape that is smaller than the seat 51 and larger than the upper plate 55. The cloth P is attached to the upper surface of the attachment plate 56.

When a shirt, such as a T-shirt or the like, is attached to the attachment plate 56 as the cloth P, the neck of the shirt is positioned at the front of the platen 50, and the hem of the shirt is positioned at the rear. In order to prevent the hem of the shirt from hanging down, a hanging prevention plate 56A is provided at the rear of the platen 50. The hanging prevention plate 56A extends further to the rear than the rear end of the attachment plate 56, from the rear end of the spacer 55A, below the attachment plate 56, and then extends upward from there.

Figure 6:
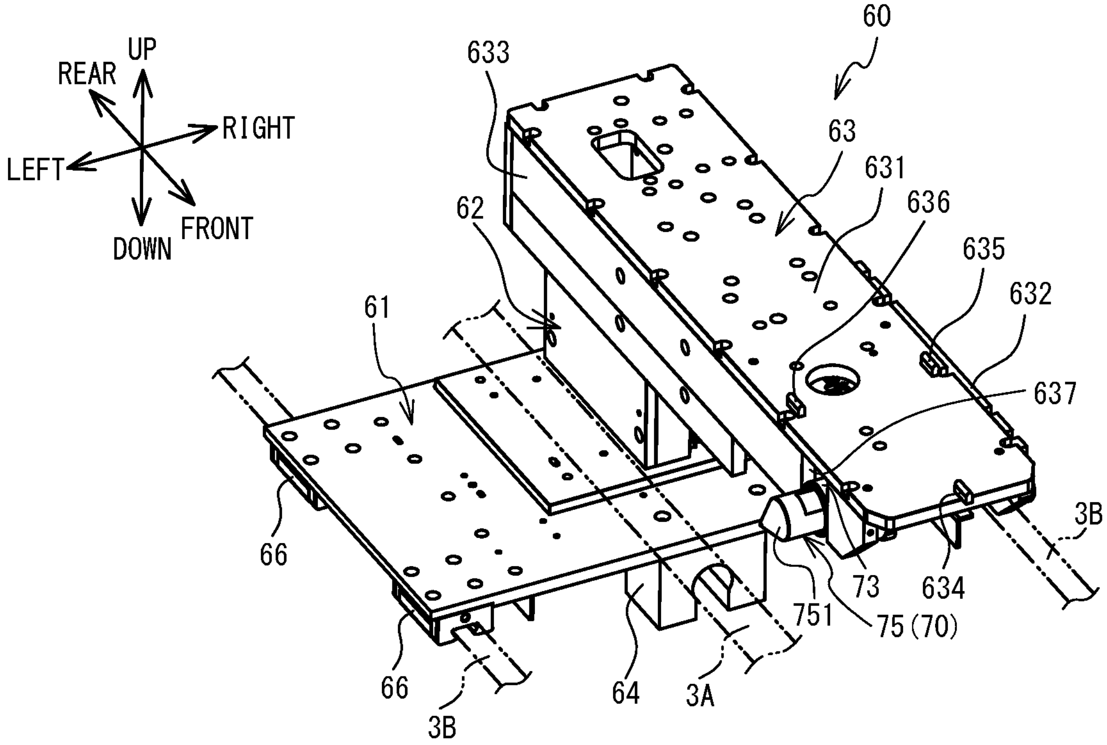
FIG. 6 is a perspective view of a platen supporter.
Figure 7:
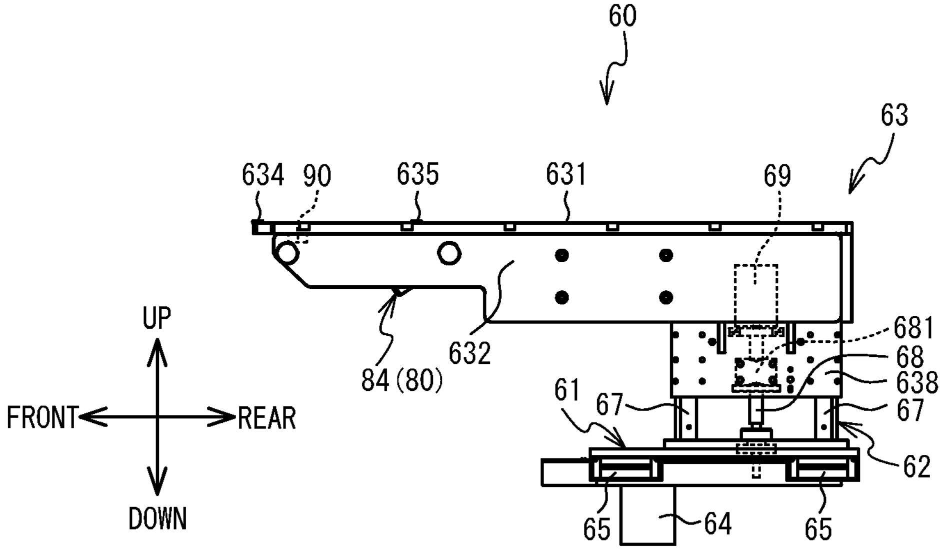
FIG. 7 is a right side view of the platen supporter.
Figure 8:
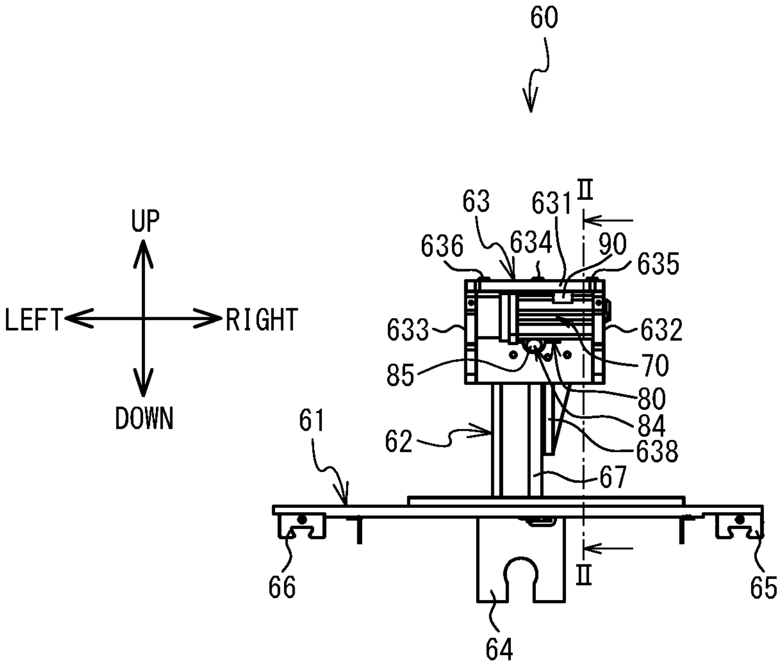
FIG. 8 is a front view of the platen supporter.

The structure of the platen supporter 60 will be described with reference to FIG. 6 to FIG. 9. As shown in FIG. 6 to FIG. 8, the platen supporter 60 is provided with a base 61, a column 62, a raising/lowering table 63, a first positioning cylinder 70, a second positioning cylinder 80, and a proximity sensor 90. The base 61 is formed in a substantially rectangular shape that is long in the left-right direction in a plan view. A guided portion 64 is provided in a central portion, in the left-right direction, of the lower surface of the base 61. The guided portion 64 extends in the front-rear direction, and is formed having a cross-sectional U shape that is open downward. The ball screw 3A (refer to FIG. 1 and FIG. 6) is inserted into the guided portion 64. Guided portions 65 and 66 are provided at both end portions, in the left-right direction, of the lower surface of the base 61. The guided portions 65 and 66 extend in the front-rear direction, and are formed having a cross-sectional U shape that is open downward. The guided portions 65 and 66 are supported by the pair of rails 3B so as to be able to move along the pair of rails 3B. As a result, the base 61 can move in an accurate manner in the front-rear direction along the pair of rails 3B.

The column 62 is provided standing in substantially the center, in the left-right direction, of the upper surface of the base 61, and is formed in a substantially cuboid shape extending upward. As shown in FIG. 7, a pair of rails 67, a ball screw 68, and the raising/lowering motor 69 are provided at the right surface of the column 62. The pair of rails 67 are provided along both end portions at the front and rear of the right surface of the column 62, and extend in the up-down direction. The ball screw 68 is provided between the pair of rails 67 and is axially supported so as to be able to rotate. A nut 681 is screwed onto the ball screw 68. The nut 681 is fixed to a suspended plate 638 (to be described later) provided at the raising/lowering table 63. The raising/lowering motor 69 is provided above the ball screw 68. An output shaft of the raising/lowering motor 69 protrudes downward and is coupled to the upper end portion of the ball screw 68. The raising/lowering motor 69 is not limited to this example, and may be positioned below the ball screw 68, the output shaft thereof may protrude upward, and may be connected to the ball screw 68 via a pulley and belt that are not shown in the drawings. Further, the ball screw 68 may be a feed screw, for example, or may be a trapezoidal screw.

As shown in FIG. 6, the raising/lowering table 63 is formed in a substantially box shape whose bottom surface is open, and is provided with a upper plate 631, a right plate 632, a left plate 633, and the suspended plate 638 (refer to FIG. 7). The upper plate 631 is substantially rectangular shaped and is long in the front-rear direction in a plan view. Three protrusions 634 to 636 are provided at the front portion of the upper surface of the upper plate 631. The protrusion 634 is provided at substantially a central portion, in the left-right direction, of the front end portion of the upper surface of the upper plate 631. The protrusion 635 is provided further to the rear than the protrusion 634, in the vicinity of the right end portion of the upper surface of the upper plate 631. The protrusion 636 is provided further to the rear than the protrusion 634, in the vicinity of the left end portion of the upper surface of the upper plate 631. In other words, the three protrusions 634 to 636 are respectively disposed at respective vertices of a triangular shape in a plan view, on the upper surface of the upper plate 631. Each of the protrusions 634 to 636 has a rib shape that is long in the front-rear direction The right plate 632 extends downward from the right end portion of the upper plate 631. The left plate 633 extends downward from the left end portion of the upper plate 631. An opening 637 is provided at the front end of the left plate 633. As shown in FIG. 7, the suspended plate 638 is suspended downward from inside the raising/lowering table 63, and is formed in a substantially rectangular shape in a right side view. The suspended plate 638 supports the raising/lowering table 63. The suspended plate 638 is supported to be movable in the up-down direction along the pair of rails 67, on the right surface of the column 62. The nut 681 is fixed to the left surface of the suspended plate 638.

Figure 9:
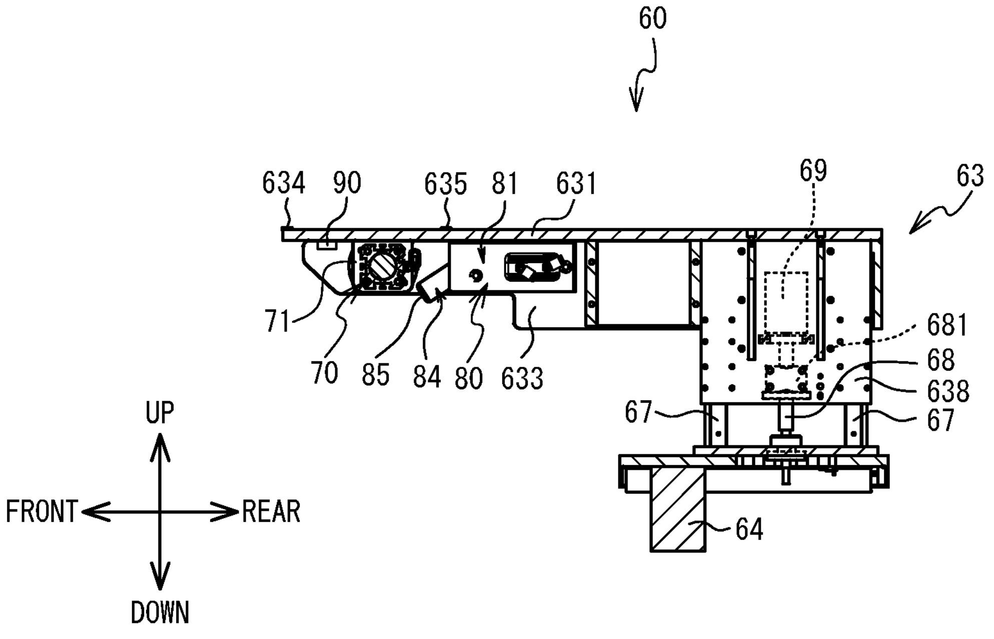
FIG. 9 is a cross-sectional view in the direction of arrows along a line II-II shown in FIG. 8.

As shown in FIG. 8 and FIG. 9, the first positioning cylinder 70 is disposed further to the inside than an outer shape of the raising/lowering table 63 in a plan view, and is closely adhered and fixed to each of the front end of the lower surface of the upper plate 631 and the front end of the inner surface of the right plate 632. The first positioning cylinder 70 positions the platen 50 in the horizontal direction, by causing the leading end portion of a horizontal pin 75 (refer to FIG. 10) to be described later to extend to the left and to come into contact with and press the left side face plate 53 of the platen 50 disposed on the raising/lowering table 63. In a similar manner to the first positioning cylinder 70, the second positioning cylinder 80 is disposed further to the inside than the outer shape of the raising/lowering table 63 in a plan view. The second positioning cylinder 80 is fixed at a position to the rear of and adjacent to the first positioning cylinder 70, on the lower surface of the upper plate 631, and, in a similar manner to the first positioning cylinder 70, is disposed further to the inside than the outer shape of the raising/lowering table 63. The second positioning cylinder 80 positions the platen 50 in the up-down direction, by causing a pin 84 to be described later to move downward and to come into contact with and press the upper surface of the lower plate 54 of the platen 50 disposed on the raising/lowering table 63.

The proximity sensor 90 is fixed to the front end of the lower surface of the upper plate 631 of the raising/lowering table 63, and is disposed at a hidden position further to the inside than the outer shape of the raising/lowering table 63 in a plan view. The proximity sensor 90 can detect the platen 50 placed on the raising/lowering table 63. The proximity sensor 90 and a proximity sensor 79 to be described later may be, for example, an induction type proximity sensor, an electrostatic capacity type proximity sensor, a magnetic proximity sensor, or the like.

Figure 10:
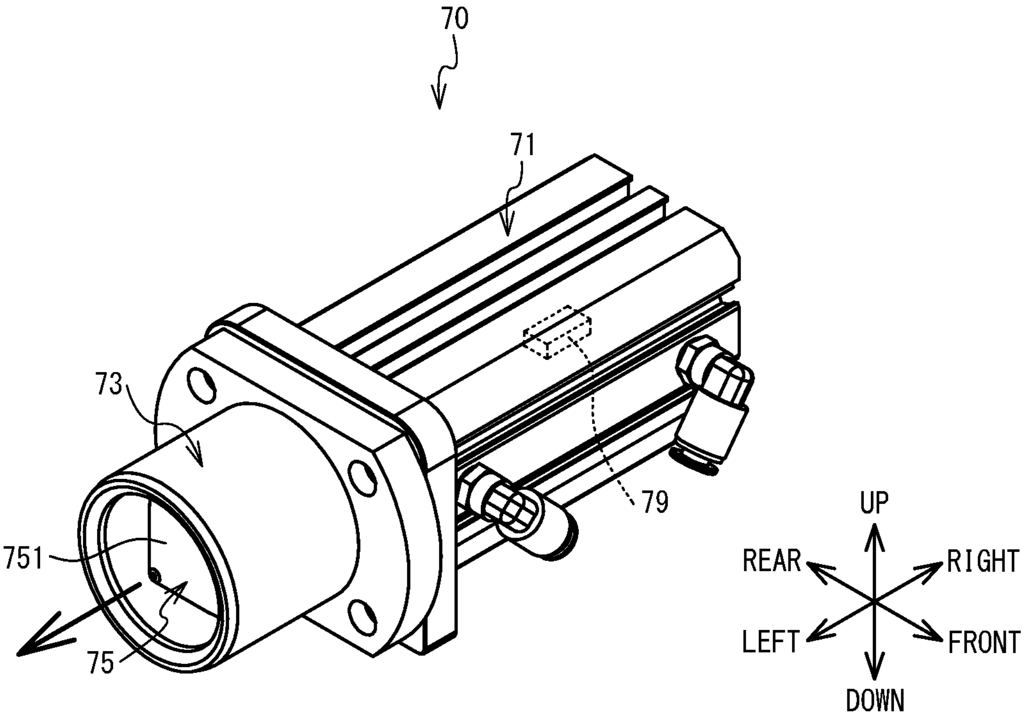
FIG. 10 is a perspective view of a first positioning cylinder.

The structure of the first positioning cylinder 70 will be described with reference to FIG. 10. The first positioning cylinder 70 is an air cylinder, and is provided with a main body portion 71, a cylindrical portion 73, the horizontal pin 75, the proximity sensor 79 and the like. A cylinder tube (not shown in the drawings) that includes a piston is provided inside the substantially cuboid shaped main body portion 71.

The horizontal pin 75 is made of metal and has a substantially circular cylindrical shape extending in the left-right direction. A tapered portion 751 is provided at the leading end portion on the left side of the horizontal pin 75. The tapered portion 751 has a substantially conical shape, and the diameter thereof becomes smaller toward the left. A diameter R (refer to FIG. 19) of the tapered portion 751 is smaller than a large diameter r1 of an insertion hole 59 (to be described later) provided in the left side face plate 53 of the platen 50, and is larger than a small diameter r2 thereof. The horizontal pin 75 can advance and retract in the left-right direction, inside the cylindrical portion 73, as a result of a reciprocating movement of the piston. The first positioning cylinder 70 is fixed inside the raising/lowering table 63 by screws or the like, in a state in which the right surface of the main body portion 71 is in close contact with the upper portion of the inner face of the right plate 632 of the raising/lowering table 63. In the state in which the first positioning cylinder 70 is fixed inside the raising/lowering table 63, the cylindrical portion 73 is disposed inside the opening 637 provided in the left plate 633 of the raising/lowering table 63 (refer to FIG. 6).

The proximity sensor 79 is provided at a predetermined position inside the main body portion 71. The predetermined position is a position in proximity to the piston inside an air tube, when the horizontal pin 75 has extended to the left to its furthest extent. The proximity sensor 79 detects that the piston has come close.

A structure of the second positioning cylinder 80 will be described with reference to FIG. 11. The second positioning cylinder 80 is provided with a supporter 81, a main body portion 82, a cylinder rod 83, the pin 84, a support shaft 86, a main body support shaft 818, a proximity sensor 89, and the like.

The supporter 81 is formed in a substantial U-shape that is open to the front in a plan view. The supporter 81 is provided with a rear plate 811, a right plate 812, and a left plate 813. The right plate 812 is disposed extending to the front from the right end portion of the rear plate 811. An opening portion 817 is provided at a position slightly to the rear of the center of the right plate 812. A shaft support hole 814 is provided, in the right plate 812, at a position to the front of and closer to the lower end of the opening portion 817. Fixing pieces 815 and 816 are provided, separated in the front-rear direction, at the upper end portion of the right plate 812. The fixing pieces 815 and 816 protrude to the right from the upper end portion of the right plate 812.

The left plate 813 is installed extending to the front from the left end portion of the rear plate 811. A shaft support hole (not shown in the drawings) is provided, in the left plate 813, at a position facing the shaft support hole 814 of the right plate 812. The support shaft 86 extends in the left-right direction, is inserted through the shaft support hole 814 of the right plate 812 and the shaft support hole of the left plate 813, and is fixed. The main body support shaft 818 also extends in the left-right direction, is inserted through a shaft support hole (not shown in the drawings) provided at a position in the vicinity of the rear of opening portion 817 of the right plate 812, through a shaft support hole (not shown in the drawings) provided at a position at the rear end of the left plate 813 and corresponding to the shaft support hole of the right plate 812, and is fixed. The fixing pieces 815 and 816 are also provided, separated in the front-rear direction, at the upper end portion of the left plate 813. The fixing pieces 815 and 816 protrude to the left from the upper end portion of the left plate 813. Each of the fixing pieces 815 and 816 of the right plate 812 and the left plate 813 is fixed to the lower surface of the upper plate 631 of the raising/lowering table 63, using screws. In this way, the supporter 81 is fixed to the lower surface of the upper plate 631.

The main body portion 82 is disposed inside the supporter 81, and is axially supported so as to be able to pivot around the main body support shaft 818. The cylinder rod 83 is provided so as to be able to advance and retract in the front-rear direction from a substantially central portion of the front surface of the main body portion 82, and is coupled to the piston inside the cylinder tube. A U-shaped portion 831 is fixed to the leading end portion of the cylinder rod 83. The U-shaped portion 831 has a substantial U shape that is open toward the front in a plan view. A support shaft 832 that extends in the left-right direction is supported inside the U-shaped portion 831.

The pin 84 is provided with a base portion 841 and a cylindrical portion 842. The base portion 841 is substantially cuboid shaped. The cylindrical portion 842 extends diagonally downward and to the front, from a side surface of the base portion 841. Note that an R portion 851 may be provided at a corner portion of the outer periphery of a leading end portion 85 of the cylindrical portion 842. The R portion 851 may be formed in a circular arc shape such that a diameter thereof becomes smaller toward the leading end. A part of the base portion 841 is disposed inside the U-shaped portion 831 of the cylinder rod 83. The base portion 841 is supported so as to be able to pivot with respect to the support shaft 86 fixed to the supporter 81. Furthermore, the base portion 841 is supported so as to be able to pivot with respect to the support shaft 832 of the U-shaped portion 831, at a position higher than the support shaft 86. Thus, inside the supporter 81, the main body portion 82 and the pin 84 are supported by the main body support shaft 818 and the support shaft 86.

The proximity sensor 89 is provided at a predetermined position inside the main body portion 82. The predetermined position is, for example, a position in proximity to the piston inside the air tube, when the cylinder rod 83 has extended to the front to its furthest extent. The proximity sensor 89 detects that the piston has come close.

An electrical configuration of the print system 1 will be described with reference to FIG. 12. The print system 1 is provided with the CPU 101, a ROM 102, a RAM 103, a storage portion 104, the pretreatment device 2, the printers 3 to 8, the post-treatment device 9, an operation portion 110, an input/output portion 111, the proximity sensors 79, 89, and 90, a foreign matter detection sensor 93, the code reader 95, drive circuits 121 to 130, the longitudinal belt motor 131, the lateral belt motor 132, the lateral raising/lowering belt motor 133, the lateral conveyance belt motor 134, the first raising/lowering motor 135, the second raising/lowering motor 136, the conveyance motor 137, the raising/lowering motor 69, the first positioning cylinder 70, the second positioning cylinder 80, and the like, which are mutually connected via a bus.

The CPU 101 controls operations of the print system 1. The ROM 102 stores various programs. The RAM 103 is a working memory and temporarily stores various types of information. The storage portion 104 is a non-volatile flash memory, and stores various types of information. The operation portion 110 receives various inputs by an operator. The operation portion 110 may be a touch panel (not shown in the drawings), and may display various types of information, in addition to receiving the various inputs. The input/output portion 111 is provided with an SD memory card slot, a USB (registered trademark) port, a serial port of another standard, and the like.

The drive circuit 121 controls the operation of the longitudinal belt motor 131 on the basis of a control command from the CPU 101. The drive circuit 122 controls the operation of the lateral belt motor 132 on the basis of a control command from the CPU 101. The drive circuit 123 controls the operation of the lateral raising/lowering belt motor 133 on the basis of a control command from the CPU 101. The drive circuit 124 controls the operation of the lateral conveyance belt motor 134 on the basis of a control command from the CPU 101. The drive circuit 125 controls the operation of the first raising/lowering motor 135 on the basis of a control command from the CPU 101. The drive circuit 126 controls the operation of the second raising/lowering motor 136 on the basis of a control command from the CPU 101. The drive circuit 127 controls the operation of the conveyance motor 137 on the basis of a control command from the CPU 101. The drive circuit 128 controls the operation of the raising/lowering motor 69 on the basis of a control command from the CPU 101. The drive circuit 129 controls the operation of the first positioning cylinder 70 on the basis of a control command from the CPU 101. The drive circuit 130 controls the operation of the second positioning cylinder 80 on the basis of a control command from the CPU 101.

Stepping motors may be used as each of the motors configuring the platen conveyance mechanism 10. In this case, encoders are connected to each of the motors, and the CPU 101 can recognize the position of each of the motors as a result of position information of the motors being transmitted to the CPU 101 from each of the encoders.

The print processing will be described with reference to FIG. 13 to FIG. 20. The platen conveyance mechanism 10 conveys the platen 50 disposed at the preparation position 100 to the pretreatment device 2, one of the printers 3 to 8, and the post-treatment device 9 in that order, and once more returns the platen 50 to the preparation position 100. In the first embodiment, processing will be described in detail in which the platen 50 to which the cloth P is attached is transferred from the conveyance mechanism 15 to the platen supporter 60, and, after the printing inside the printer 3, is transferred from the platen supporter 60 to the conveyance mechanism 16. The processing to be described below is performed by the CPU 101 reading a control program stored in the ROM 102.

Figure 14:
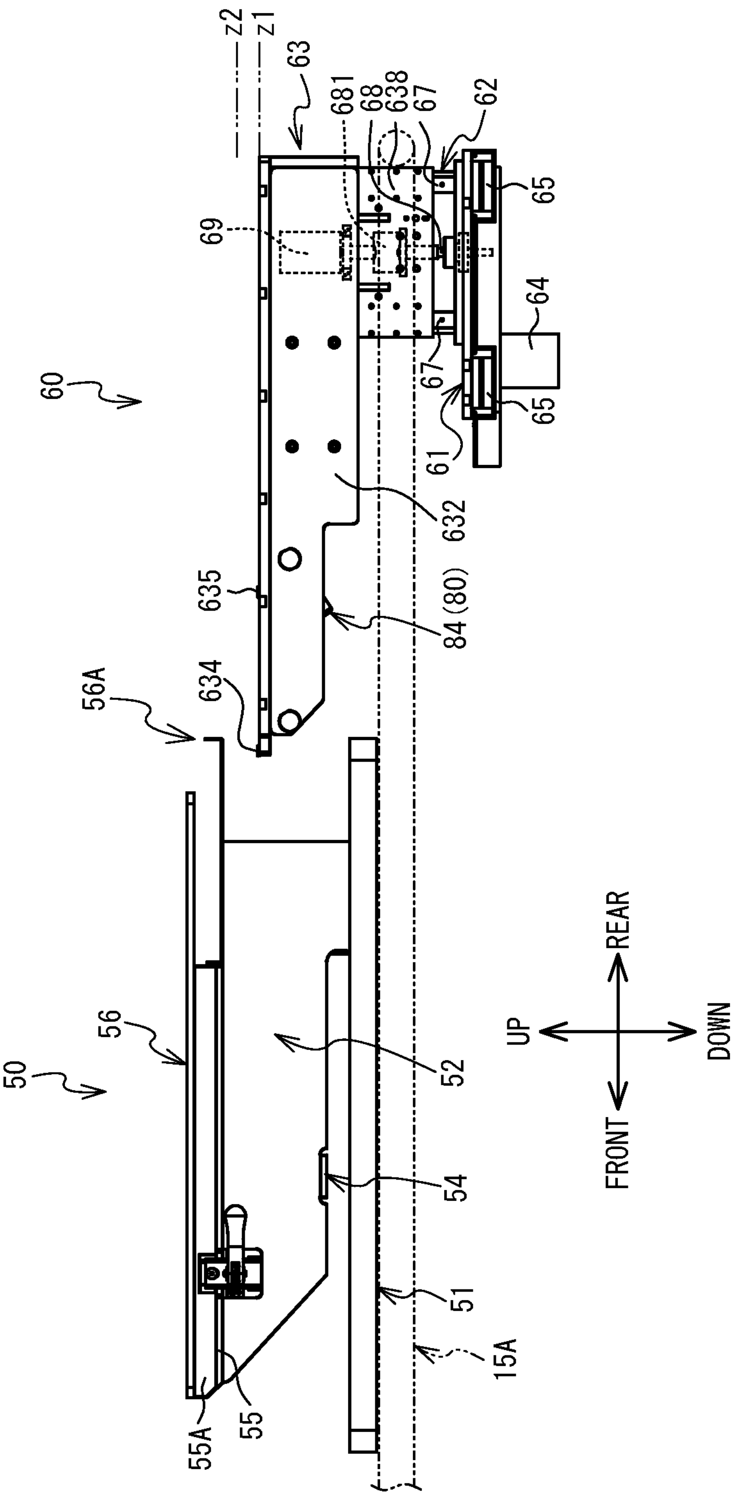
FIG. 14 is a diagram showing a positional relationship between the platen and the platen supporter at a start of the print processing.

When the platen 50 is conveyed to the front of the platen supporter 60 of the printer 3 by the lateral conveyance belts 15A of the conveyance mechanism 15, as shown in FIG. 14, the platen supporter 60 is disposed at a receiving position in the front-rear direction, and the raising/lowering table 63 is disposed at a first position z1 in the up-down direction. An initial position is a position of the platen supporter 60, in the front-rear direction, when the platen supporter 60 receives the platen 50, and is, for example, a front end position of a movable range of the platen supporter 60 along the pair of rails 3B.

For example, when the platen 50 on the lateral conveyance belts 15A is conveyed toward the raising/lowering table 63 in a state in which the raising/lowering table 63 is at the first position z1, the position of the raising/lowering table 63 is low with respect to the platen 50, and thus, the rear end of the lower plate 54 of the platen 50 collides with the front ends of each of the right plate 632 and the left plate 633 of the raising/lowering table 63. When these members have collided, the raising/lowering table 63 is only inserted partway into a space surrounded by the right side face plate 52, the left side face plate 53, the lower plate 54, and the upper plate 55 of the platen 50. When the positioning has been performed by the first positioning cylinder 70 and the second positioning cylinder 80 in this state, the platen 50 cannot be positioned with respect to a prescribed printing position W, and a defect occurs, such as a printing position with respect to the cloth P being displaced, and the like.

Figure 15:
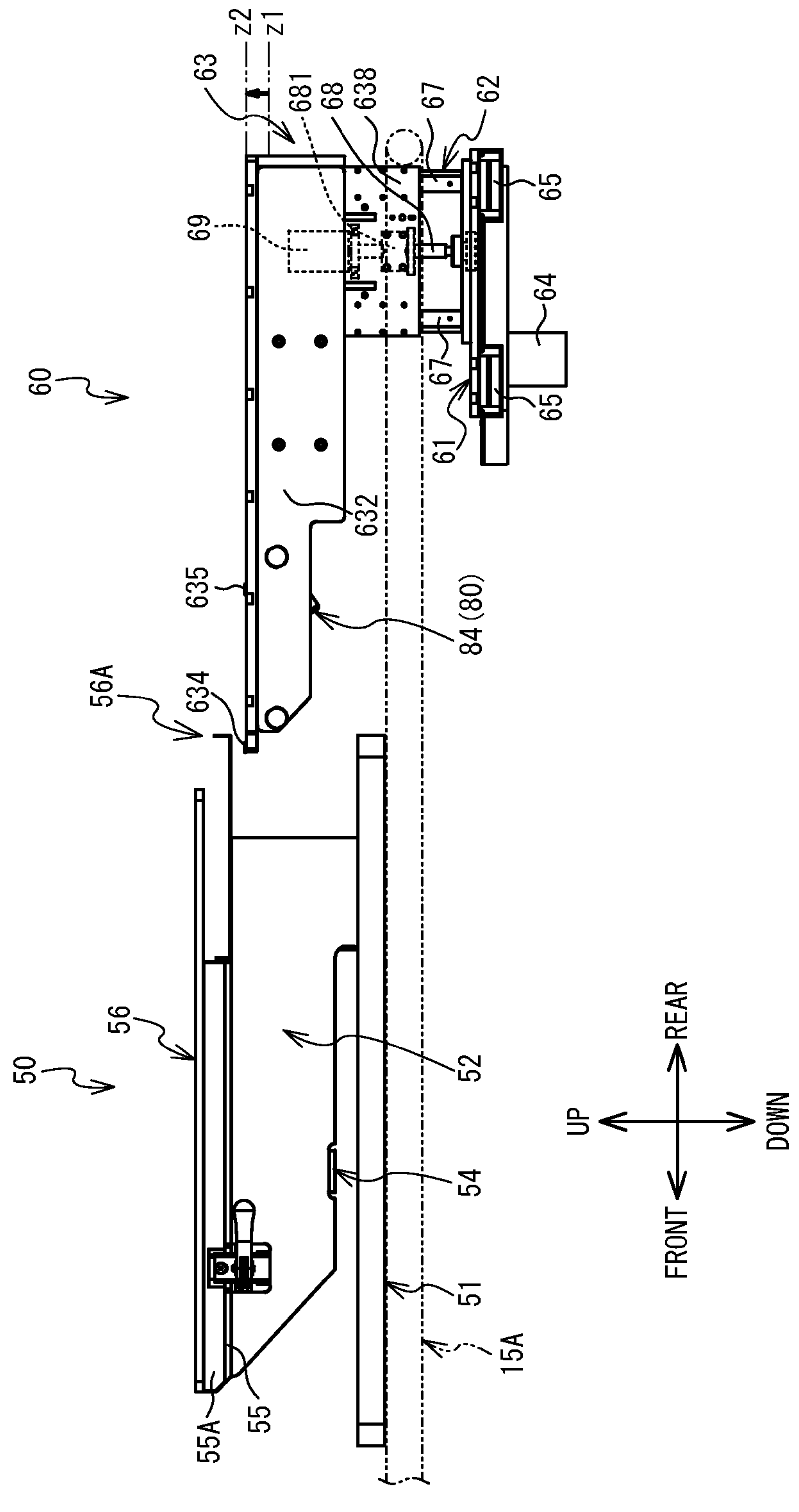
FIG. 15 is a diagram in which a raising/lowering table is raised to a second position.

Here, as shown in FIG. 15, the CPU 101 raises the raising/lowering table 63 from the first position z1 to a second position z2 (step S10). Next, the CPU 101 drives the lateral conveyance belts 15A and conveys the platen 50 toward the raising/lowering table 63 (step S11). Since the raising/lowering table 63 is at the second position z2, the raising/lowering table 63 is inserted into the space surrounded by the right side face plate 52, the left side face plate 53, the lower plate 54, and the upper plate 55 of the platen 50, from the leading end side thereof, without any interference (refer to FIG. 16). At the time of this insertion, due to the hanging prevention plate 56A, the cloth P does not block the space surrounded by the right side face plate 52, the left side face plate 53, the lower plate 54, and the upper plate 55, and thus, the raising/lowering table 63 is inserted without coming into contact with the cloth P.

Figure 16:
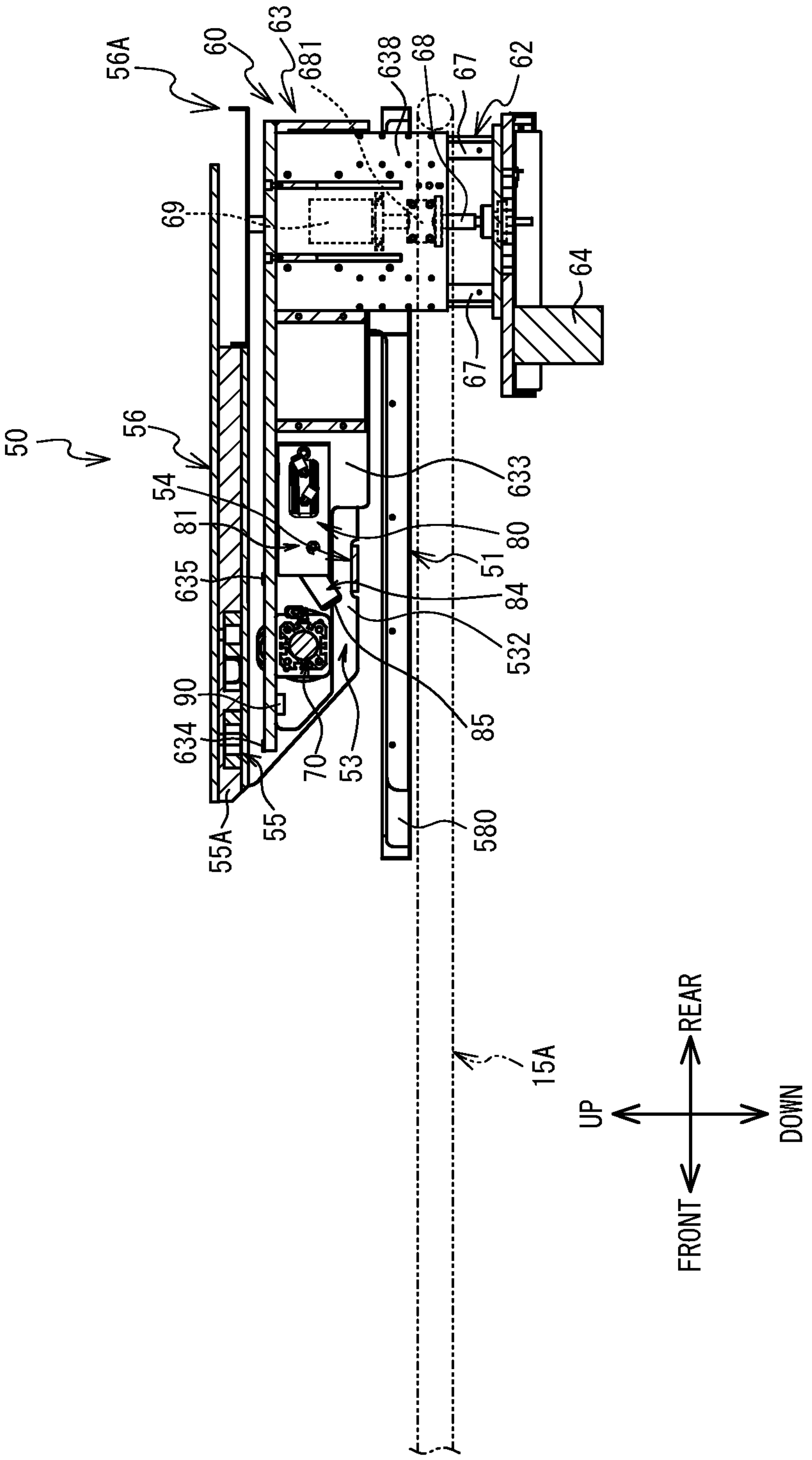
FIG. 16 is cross-sectional view showing a state in which the raising/lowering table is inserted inside the platen.

The CPU 101 determines whether the insertion of the platen 50 is complete (step S12). An insertion complete position of the platen 50 is, for example, a predetermined position on a downstream of the lateral conveyance belts 15A in the conveyance direction. A limiter switch is provided at the predetermined position, for example. An ON signal of the limiter switch is transmitted to the CPU 101 as a result of the platen 50 conveyed by the lateral conveyance belts 15A pressing the limiter switch and switching it on. As a result of receiving the ON signal, the CPU 101 determines that the insertion of the platen 50 is complete. Until the insertion of the platen 50 is complete (no at step S12), the CPU 101 returns the processing to step S12, and continues to convey the platen 50 toward the raising/lowering table 63. As shown in FIG. 16, when the insertion of the platen 50 is complete (yes at step S12), the CPU 101 stops the driving of the lateral conveyance belt motor 134 of the lateral conveyance belts 15A, and stops the conveyance of the platen 50 (step S13).

Figure 17:
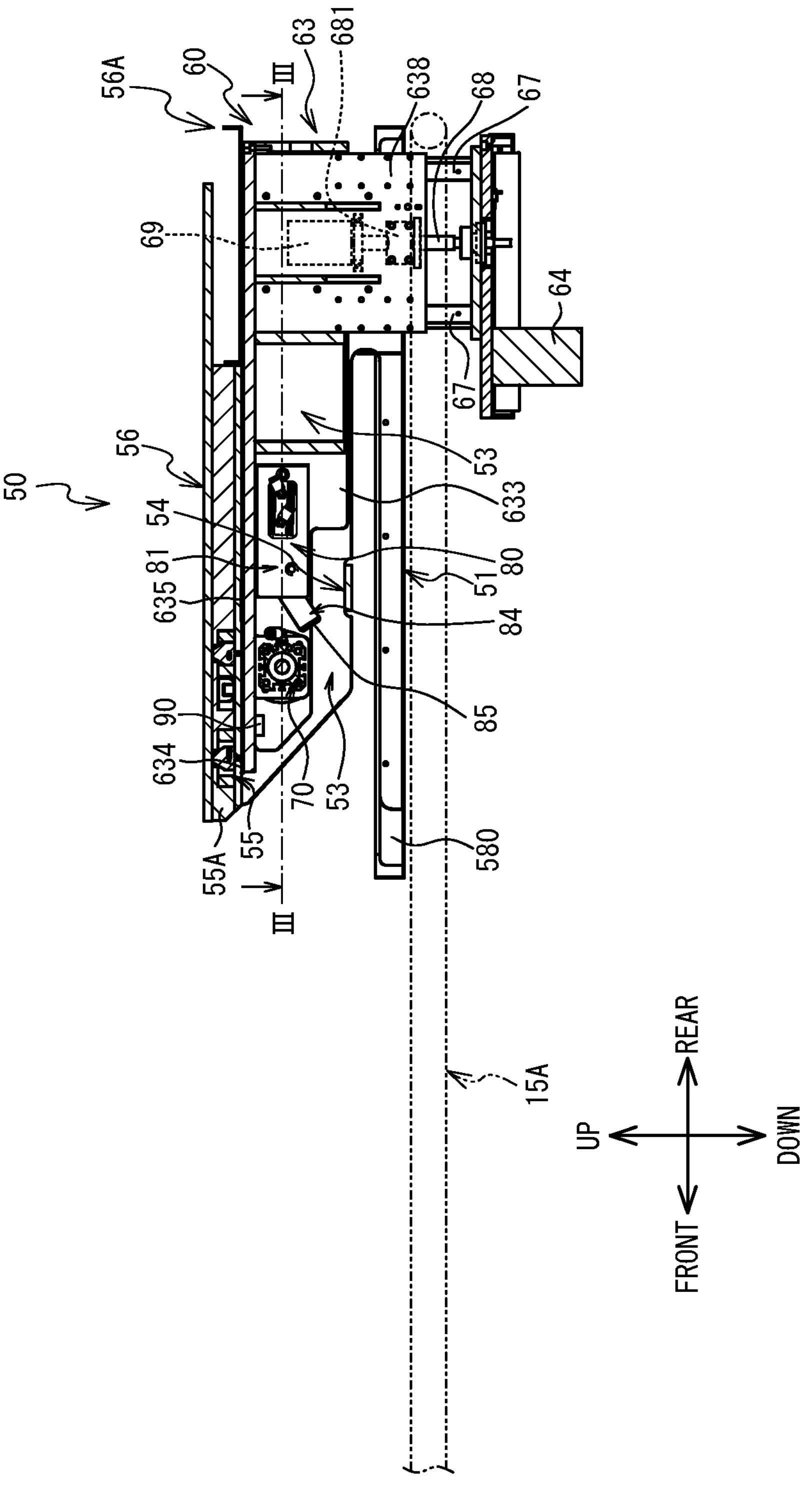
FIG. 17 is a cross-sectional view showing a state in which a lateral conveyance belt is lowered from a state shown in FIG. 16 and the platen is supported on the raising/lowering table.

As shown in FIG. 17, the CPU 101 lowers the lateral conveyance belts 15A in order to cause the platen 50 to be placed on the upper surface of the upper plate 631 of the raising/lowering table 63 and to be supported (step S14). The platen 50 is lowered together with the lateral conveyance belts 15A. The lower surface of the upper plate 55 of the platen 50 comes into contact with the three protrusions 634 to 636 provided on the upper plate 631 of the raising/lowering table 63, and, due to gravity, the platen 50 is in a placed state and is supported. The CPU 101 determines whether the platen 50 has been placed on the raising/lowering table 63 (step S15). When the lower surface of the upper plate 55 of the platen 50 has come into contact with the three protrusions 634 to 636 provided on the upper plate 631 of the raising/lowering table 63 and the platen 50 is supported, the proximity sensor 90 fixed to the upper plate 631 of the raising/lowering table 63 detects the platen 50. The proximity sensor 90 transmits a detection signal to the CPU 101. When the detection signal from the proximity sensor 90 has not been received, the platen 50 is separated from the raising/lowering table 63 (no at step S15), and thus, the CPU 101 determines whether an elapsed time from lowering the lateral conveyance belts 15A has been exceeded or not (step S29). When the elapsed time has not been exceeded (no at step S29), the CPU 101 returns the processing to step S14, and continues to lower the lateral conveyance belts 15A. When the elapsed time has been exceeded (yes at step S29), the CPU 101 outputs an error (step S30), and ends the print processing.

When the detection signal from the proximity sensor 90 has been received, the platen 50 is separated from the lateral conveyance belts 15A and has been placed on the raising/lowering table 63 (yes at step S15), and thus, the CPU 101 stops the driving of the second raising/lowering motor 136 of the lateral conveyance belts 15A, and stops the lowering of the lateral conveyance belts 15A (step S16). The operation is not limited to this example, and the following operation may be performed. The CPU 101 rotates the second raising/lowering motor 136 by a predetermined amount, lowers the lateral conveyance belts 15A by a predetermined amount, and stops the lowering of the lateral conveyance belts 15A. At this time, the CPU 101 determines whether the detection result from the proximity sensor 90 has been received. When it is determined that the detection result has been received, the CPU 101 determines that the platen 50 has been placed on the raising/lowering table 63. When it is determined that the detection result has not been received, the CPU 101 outputs the error. The three protrusions 634 to 636 that support the platen 50 are disposed at each of the vertices of the triangular shape in a plan view (refer to FIG. 6), on the upper plate 631 of the raising/lowering table 63, and thus, the protrusions 634 to 636 can support the platen 50 in a stable manner. Note that the number of the protrusions provided at the upper plate 631 of the raising/lowering table 63 is not limited to three and there may be three or more of the protrusions, and the arrangement of the protrusions can also be freely changed.

Note that, if, for example, the protrusions 634 to 636 of the upper plate 631 of the raising/lowering table 63 are omitted and the lower surface of the upper plate 55 of the platen 50 is directly placed on the upper surface of the upper plate 631, if the lower surface of the upper plate 55 and the upper surface of the upper plate 631 are not parallel to each other, the lower surface of the upper plate 55 does not come into close contact with the upper surface of the upper plate 631, the platen 50 rattles with respect to the raising/lowering table 63, and the platen 50 is not supported at a constant height position. In contrast to this, the first embodiment can support the upper plate 55 of the platen 50 at the constant height position with respect to the upper plate 631 of the raising/lowering table 63, by placing the lower surface of the upper plate 55 of the platen 50 on the protrusions 634 to 636.

In order to position the platen 50 at the prescribed printing position W (refer to FIG. 18) in the left-right direction and the front-rear direction in the printer 3, first, the CPU 101 operates the first positioning cylinder 70 (step S17). The platen 50 that has been positioned at the prescribed printing position W moves in the direction in which the rails 3B extend (the left-right direction in FIG. 1; the front-rear direction in FIG. 2 and FIG. 18), and the printing is performed inside the printer 3. At the time of printing, if the platen 50 is displaced from a reference position in the front-rear direction or the left-right direction, the image cannot be printed at the desired position on the cloth P. Thus, at the time of printing inside the printer 3, it is necessary for the position of the platen 50 to be aligned with the reference position. After receiving the platen 50, the platen supporter 60 moves along the direction in which the rails 3B extend, and thus, the position of the platen 50 changes in the front-rear direction shown in FIG. 18, but the position does not change in the left-right direction. In other words, at the time of printing, the reference position and the prescribed printing position W change in the front-rear direction but do not change in the left-right direction. For example, when the printer 3 includes a carriage that reciprocates in the left-right direction shown in FIG. 18 as a main scanning direction, the prescribed printing position W in the left-right direction is within a movement range of the carriage to which an inkjet head is mounted. Further, the printer 3 recognizes the position in the front-rear direction of the platen supporter 60 supporting the platen 50, and forms the image. Further, in the up-down direction also, it is necessary for the platen 50 to be lower than an image forming portion provided in the printer 3, such that the platen 50 does not come into contact with the image forming portion. In particular, when the image forming portion is the inkjet head, a landing distance changes in accordance with a distance between the platen 50 and the inkjet head, and thus, if the position of the platen 50 changes in the up-down direction, the printer 3 cannot print the desired image. In other words, it is necessary for the levelness of the platen 50 to be secured such that the distance between the platen 50 at each of positions thereof and the inkjet head is within a predetermined range. Before the printing, the position of the platen 50 in the up-down direction may be adjusted automatically or manually in accordance with a thickness of the cloth P, but it is preferable to establish the position of the platen 50 before the adjustment. The distance between the platen 50 and the image forming portion is preferably from 1 mm to 100 mm. Thus, it is necessary to perform positioning such that the position of the platen 50 with respect to the platen supporter 60 does not change in the front-rear direction, the left-right direction, and the up-down direction, each time the platen 50 is transferred to the platen supporter 60. It is assumed that the position of the platen 50 with respect to the platen supporter 60 is the prescribed printing position W. The prescribed printing position W is, for example, a predetermined position with respect to the platen supporter 60, and is a position used as a reference at the time of printing by the printer 3. The CPU 101 positions the platen 50 at the prescribed printing position W by determining the position of the platen 50 in the front-rear direction, the left-right direction, and the up-down direction with respect to the raising/lowering table 63 of the platen supporter 60 disposed at the receiving position in the front-rear direction.

Figure 18:
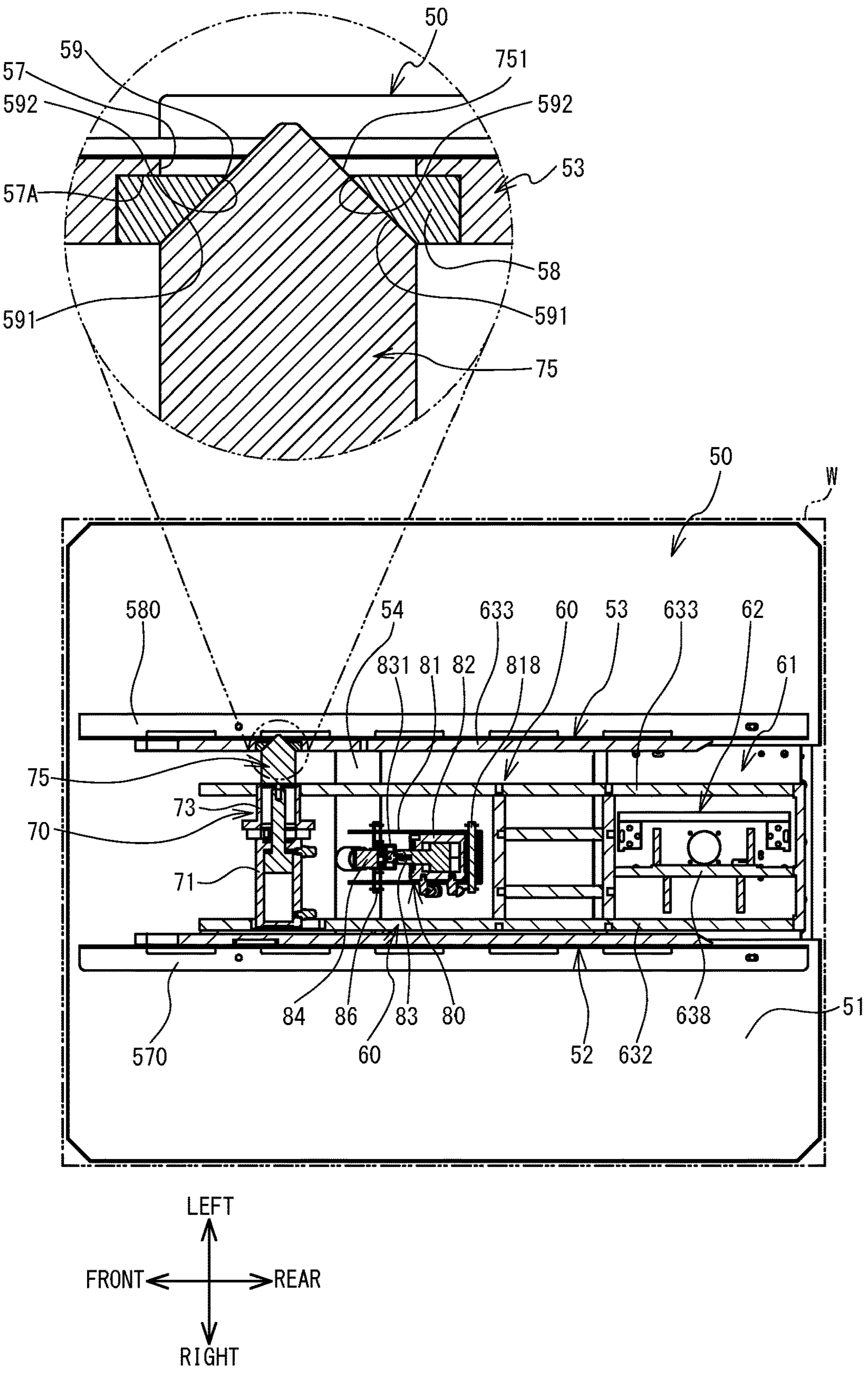
FIG. 18 is a cross-sectional view in the direction of arrows along a line III-III shown in FIG. 17.
Figure 19:
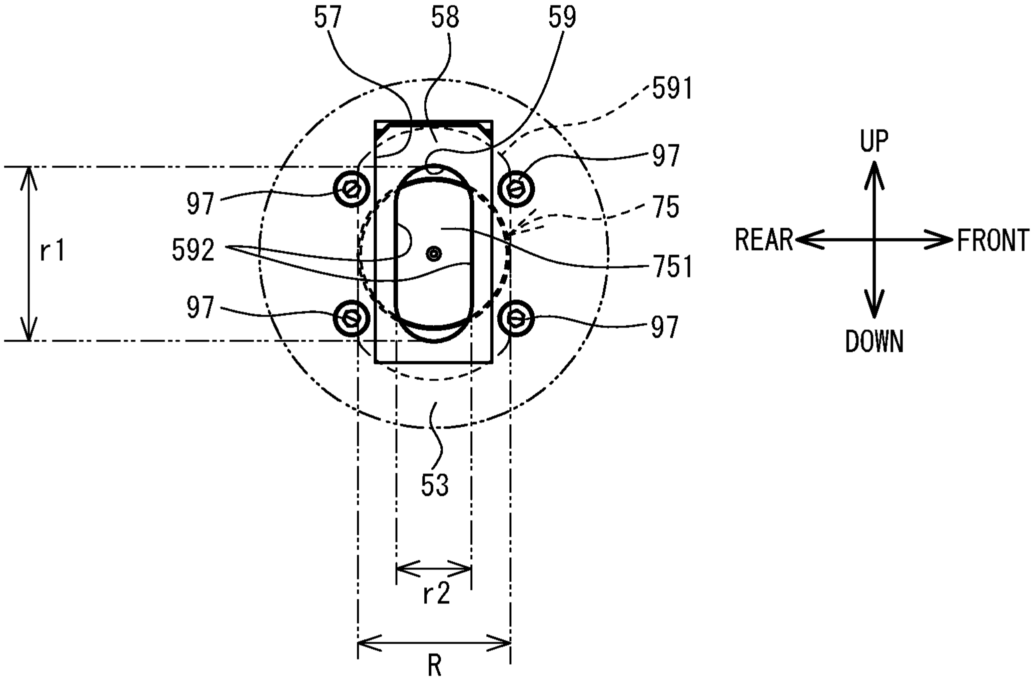
FIG. 19 is a partial expanded view, as seen from the left of a left-side face plate, of a state in which a tapered portion of a horizontal pin has come into contact with side edge portions of an insertion hole and the side edge portions are pressed.

Here, as shown in FIG. 18 and FIG. 19, a through hole 57 is provided at the front end portion of the forward extending portion 532 of the left side face plate 53 of the platen 50. The through hole 57 has a substantially rectangular shape in a left side view, and penetrates the left side face plate 53 in the left-right direction. A recessed portion 57A, which is a recessed shape recessed to the left, is provided around the periphery of the through hole 57, at an inner surface, of the left side face plate 53, facing the right side face plate 52. A metal contact plate 58 is fitted inside the recessed portion 57A, and is fixed using 4 screws 97. The insertion hole 59 is provided at substantially the center of the contact plate 58. The insertion hole 59 is an elliptical hole that is longer in the up-down direction than in the front-rear direction, and has the large diameter r1 in the up-down direction and the small diameter r2 in the front-rear direction. The insertion hole 59 is communicated with the through hole 57. A tapered portion 591 is provided at the outer periphery of the insertion hole 59. The tapered portion 591 is an elliptical ring shape having a constant width along the outer periphery of the insertion hole 59, and is inclined such that a thickness thereof becomes thinner in the left-right direction the further toward the insertion hole 59.

When the first positioning cylinder 70 is operated, the horizontal pin 75 extends from the cylindrical portion 73 of the first positioning cylinder 70 toward the insertion hole 59 of the left side face plate 53 of the platen 50 (refer to FIG. 6). As the horizontal pin 75 extends toward the insertion hole 59, the leading end portion of the tapered portion 751 is inserted into the insertion hole 59, and the tapered portion 751 comes into contact with the tapered portion 591 of the insertion hole 59. As described above, the diameter R of the tapered portion 751 of the horizontal pin 75 is smaller than the large diameter r1 of the insertion hole 59, and is larger than the small diameter r2. Thus, the tapered portion 751 comes into contact with a pair of side edge portions 592 facing each other in the front-rear direction, of the tapered portion 591 of the insertion hole 59, and does not come into contact with an upper edge portion and a lower edge portion. As a result of not allowing the tapered portion 751 to come into contact with the upper edge portion and the lower edge portion of the tapered portion 591, in the operation of the second positioning cylinder 80 to be described below, it is possible to position the platen 50 in the up-down direction.

When the horizontal pin 75 further extends toward the insertion hole 59, the tapered portion 751 presses one of the side edge portions 592 to the left, in a state of being in contact with the one of the pair of side edge portions 592 of the insertion hole 59. Here, both the tapered portion 751 of the horizontal pin 75 and the tapered portion 591 of the insertion hole 59 are inclined so as to widen in the up-down direction and the front-rear direction from the left toward the right. Thus, for example, even if the center of the insertion hole 59 on the platen 50 is displaced in the front-rear direction with respect to the leading end of the horizontal pin 75, as a result of the tapered portion 751 pressing the one of the side edge portions 592 of the tapered portion 591 to the left, the tapered portion 591 slides along the inclined surface of the tapered portion 751, and moves such that the center of the insertion hole 59 is aligned with the position, in the front-rear direction, of the leading end of the horizontal pin 75. At this time, the platen 50 moves in the front-rear direction using the position of the horizontal pin 75 as a reference.

Then, when both a front section and a rear section of the tapered portion 751 of the horizontal pin 75 are in contact with the front end portion and the rear end portion of the insertion hole 59, the platen 50 cannot move in the front-rear direction, and the platen 50 is firmly positioned in the front-rear direction with respect to the raising/lowering table 63.

Further, the tapered portion 751 of the horizontal pin 75 presses the tapered portion 591 of the insertion hole 59 to the left, and thus, the platen 50 moves to the left with respect to the raising/lowering table 63. As a result of this, the inner surface (left surface) of the right side face plate 52 of the platen 50 comes into contact with the outer surface (right surface) of the right plate 632 of the raising/lowering table 63. Therefore, not only in the front-rear direction, the platen 50 also cannot move in the left-right direction, and the platen 50 is thus firmly positioned in the left-right direction with respect to the raising/lowering table 63.

As described above, the tapered portion 751 of the horizontal pin 75 is in contact with and is pressed against the tapered portion 591 of the insertion hole 59, and thus, for example, even if the leading end portion of the tapered portion 751 of the horizontal pin 75 is displaced from the center of the insertion hole 59 in the front-rear direction, the tapered portion 591 slides along the inclined surface of the tapered portion 751. In this way, the horizontal pin 75 is guided toward the center of the insertion hole 59. Then, in the state of being in contact with the pair of side edge portions 592, the tapered portion 751 presses the side edge portions to the left. Thus, the platen 50 also cannot move in the front-rear direction, and at the same time as determining the position in the left-right direction, the platen 50 is also firmly positioned in the front-rear direction with respect to the raising/lowering table 63.

The CPU 101 determines whether the positioning in the left-right direction and the front-rear direction is complete (step S18). The proximity sensor 79 (refer to FIG. 10) provided at the first positioning cylinder 70 detects the piston when the horizontal pin 75 has extended to the left to its furthest extent, and transmits the detection signal to the CPU 101. When the horizontal pin 75 has extended to the left to its furthest extent, the positioning of the platen 50 in the left-right direction and the front-rear direction is complete. Until the CPU 101 receives the detection signal from the proximity sensor 79, the positioning of the platen 50 in the left-right direction and the front-rear direction is not complete (no at step S18), and the CPU 101 returns the processing to step S17 and the horizontal pin 75 continues to extend to the left. When the CPU 101 has received the detection signal from the proximity sensor 79, the positioning of the platen 50 in the left-right direction and the front-rear direction is complete (yes at step S18), and thus, subsequently, the CPU 101 operates the second positioning cylinder 80 (step S19).

Figure 11:
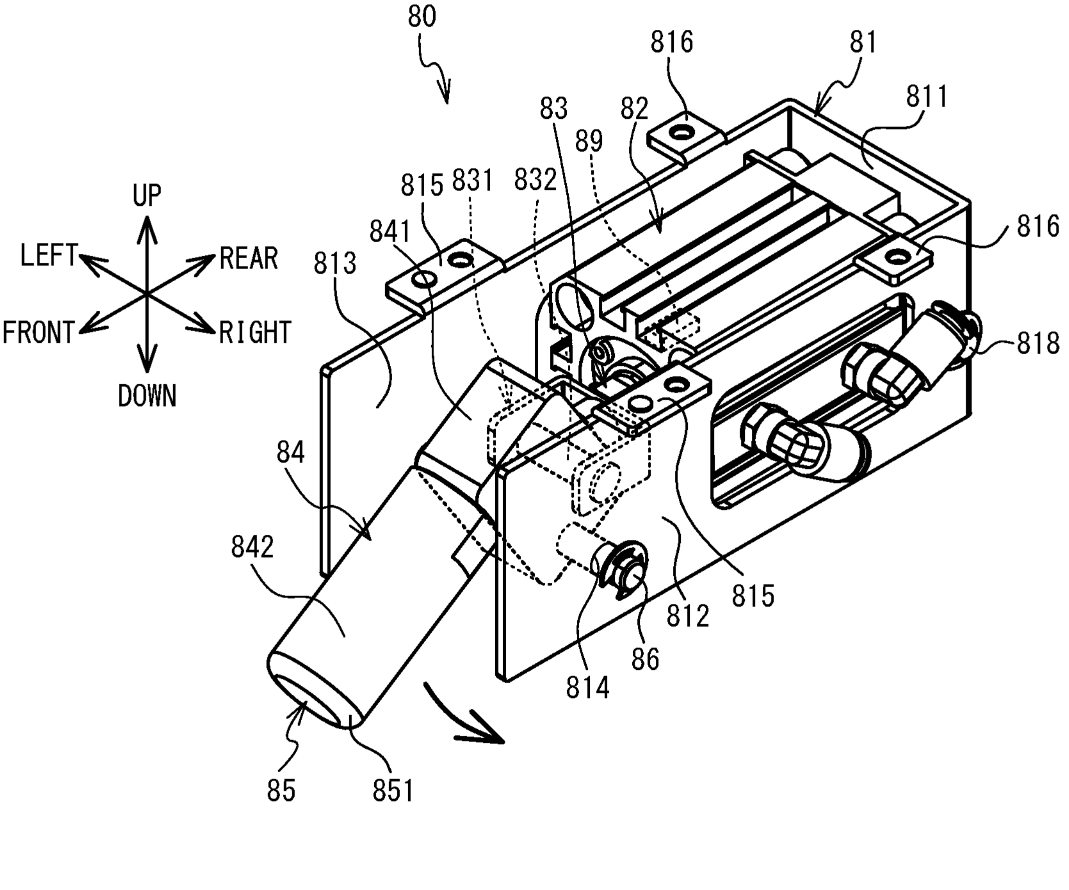
FIG. 11 is a perspective view of a second positioning cylinder.
Figure 20:
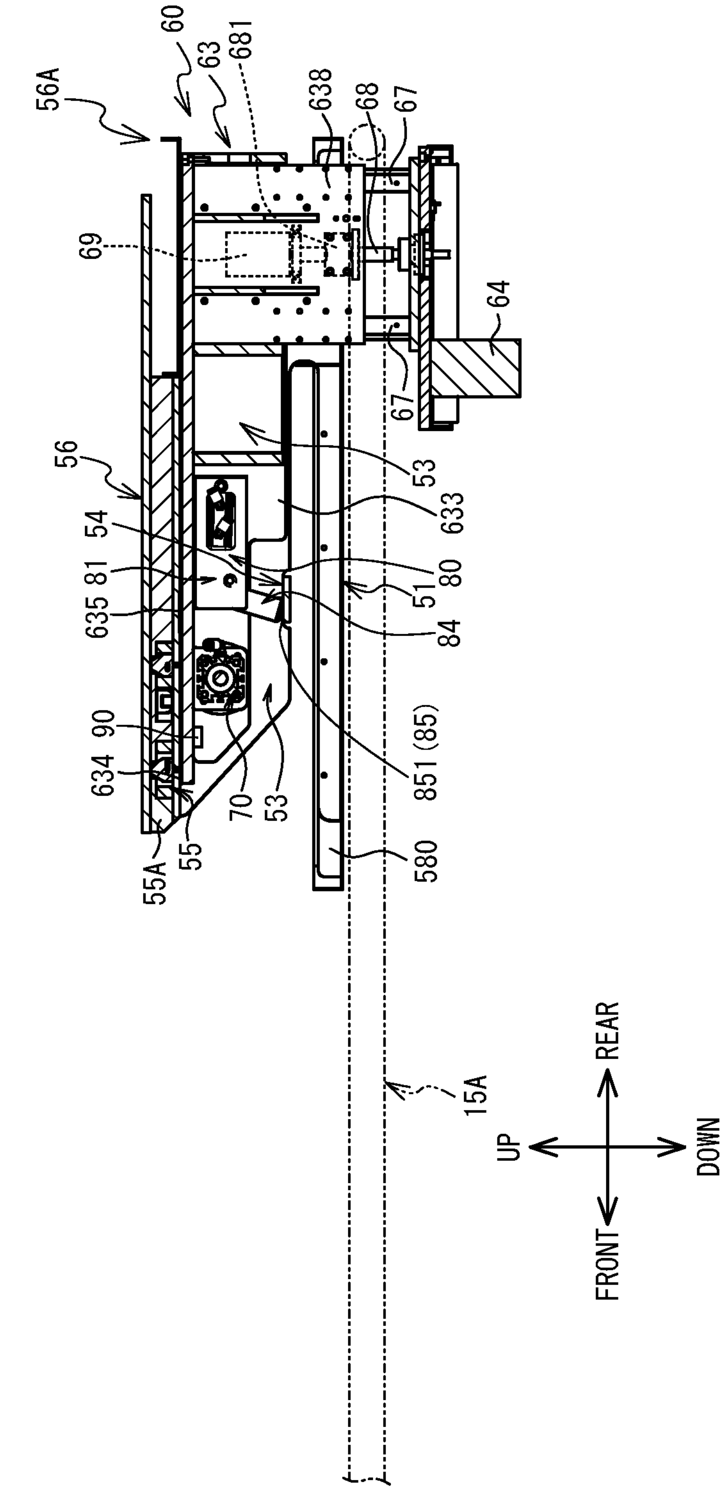
FIG. 20 is a cross-sectional view showing a state in which a leading end portion of a pin has come into contact with a lower plate of the platen and the lower plate is pressed.

As shown in FIG. 11, when the second positioning cylinder 80 is operated, the cylinder rod 83 extends toward the front from the center of the left surface of the main body portion 82 of the second positioning cylinder 80. As the cylinder rod 83 extends toward the front, the support shaft 832 of the U-shaped portion 831 pushes the base portion 841 of the pin 84 to the front. As a result of this, the base portion 841 rotates around the support shaft 86 in the counter-clockwise direction in a right side view, and thus, the leading end portion 85 of the pin 84 also rotates downward around the support shaft 86. Then, as shown in FIG. 20, the R portion 851 of the leading end portion 85 of the pin 84 comes into contact with the upper surface of the lower plate 54 of the platen 50. At this time, the upper surface of the lower plate 54 is in a state of being pressed by the pin 84.

The lower surface of the upper plate 55 of the platen 50 is already in contact with the protrusions 634 to 636 of the upper plate 631 of the raising/lowering table 63. Thus, as a result of the lower plate 54 being pressed downward by the leading end portion 85 of the pin 84, the platen 50 moves downward so as to correct a displacement in the up-down direction with respect to the raising/lowering table 63. Then, a state is obtained in which the upper plate 55 of the platen 50 is being pressed from above against the protrusions 634 to 636 of the raising/lowering table 63. In this way, the platen 50 is firmly positioned in the up-down direction with respect to the raising/lowering table 63. Then, the platen 50 is positioned with respect to the raising/lowering table 63 in each of the left-right direction, the front-rear direction, and the up-down direction, and thus, the platen 50 is accurately positioned at the prescribed printing position W of the printer 3.

The CPU 101 determines whether the positioning in the up-down direction is complete (step S20). The proximity sensor 89 (refer to FIG. 11) provided at the second positioning cylinder 80 detects the piston when the cylinder rod 83 has extended to the front to its furthest extent, and transmits the detection signal to the CPU 101. When the cylinder rod 83 has extended to the front to its furthest extent, the positioning of the platen 50 in the up-down direction is complete. Until the CPU 101 receives the detection signal from the proximity sensor 89, the positioning of the platen 50 in the up-down direction is not complete (no at step S20), and the CPU 101 returns the processing to step S19 and continues to cause the cylinder rod 83 to extend to the front and cause the leading end portion 85 of the pin 84 to pivot downward.

When the CPU 101 has received the detection signal from the proximity sensor 89, the positioning of the platen 50 in the up-down direction is complete (yes at step S20), and thus, subsequently, in accordance with the height position of the platen 50 input by the operator using the operation portion 110, the CPU 101 lowers the raising/lowering table 63 from the second position z2 and lowers the position of the platen 50 (step S21). Depending on the thickness of the cloth P, it is sometimes necessary to lower the position of the platen 50. It is sufficient for the operator to use the operation portion 110 and input the height position of the platen 50 depending on the thickness of the cloth P. The print preparation is completed in this way, and thus, the CPU 101 uses the printer 3 to perform the printing, using the print head, on the cloth P on which the pretreatment has been performed (step S22).

Note that there are variations in the thickness of the cloth P attached to the platen 50, and wrinkles and the like are an example of this. When the foreign matter detection sensor 93 (refer to FIG. 12) fixed inside the printer 3 detects the cloth P above a predetermined height position from the platen 50, the CPU 101 determines that the cloth P is wrinkled. In this case, the CPU 101 may output an error, for example, temporarily cancel the print processing, and notify the operator of that fact on the operation portion 110. Note that an optical sensor, such as an infrared sensor or the like, can be used as the foreign matter detection sensor 93. The infrared sensor is provided with a light emitting portion that outputs infrared light, and a light receiving portion that receives the infrared light output from the light emitting portion. For example, the light emitting portion and the light receiving portion are disposed at a certain height position from the platen 50, and when the wrinkle of the cloth P is disposed between the light emitting portion and the light receiving portion, the infrared light output from the light emitting portion is blocked. Thus, the CPU 101 can determine the presence or absence of the wrinkles in the cloth P, on the basis of an amount of the infrared light in the light receiving portion.

When the print processing ends, the CPU 101 conveys the platen supporter 60 along the pair of rails 3B to a transfer position (step S23). At the transfer position, the pair of lateral conveyance belts 16A are disposed at both the left and right directions of the pair of rails 3B (refer to FIG. 1). Thus, the pair of lateral conveyance belts 16A are disposed at both the left and right directions of the lower surface of the seat 51 of the platen 50 positioned with respect to the raising/ lowering table 63. The CPU 101 raises the raising/lowering table 63 to the second position z2 (step S24). By moving the cylinder rod 83 of the second positioning cylinder 80 to the rear and causing the leading end portion 85 of the pin 84 to be separated from the lower plate 54 of the platen 50, the CPU 101 releases the positioning of the platen 50 in the up-down direction (step S25). Next, by moving the horizontal pin 75 of the first positioning cylinder 70 to the right and pulling the horizontal pin 75 out from the insertion hole 59 of the left side face plate 53 of the platen 50, the CPU 101 releases the positioning of the platen 50 in the left-right direction and the front-rear direction (step S26). The platen 50 is in a state of once more being placed on the raising/lowering table 63 and being supported.

The CPU 101 raises the pair of lateral conveyance belts 16A (step S27). The lower surface of the seat 51 of the platen 50 is placed on the upper surface of each of the pair of lateral conveyance belts 16A. As a result of the lateral conveyance belts 16A further rising, the upper plate 55 of the platen 50 is separated from the protrusions 634 to 636 of the upper plate 631 of the raising/lowering table 63, and the platen 50 is lifted up. The CPU 101 determines whether the platen 50 has separated from the raising/lowering table 63 (step S28). When the proximity sensor 90 fixed to the raising/lowering table 63 continues to detect the platen 50, this means that the platen 50 has not separated from the raising/lowering table 63 (no at step S28), and the CPU 101 determines whether an elapsed time from the raising of the lateral conveyance belts 16A has been exceeded (step S31).

When the elapsed time has not been exceeded (no at step S31), the CPU 101 returns the processing to step S27, and continues to raise the lateral conveyance belts 16A. When the elapsed time has been exceeded (yes at step S31), the CPU 101 outputs an error (step S32), and ends the print processing.

When the proximity sensor 90 no longer detects the platen 50, this means that the platen 50 has separated from the raising/lowering table 63 (yes at step S28), and the CPU 101 ends this processing. The platen 50 is in a state of having been transferred to the lateral conveyance belts 16A. When the platen 50 is transferred to the lateral conveyance belts 16A, the platen supporter 60 in a state of supporting the platen 50 may be rotated forward and rearward by a forward/rearward rotation device that is not shown in the drawings. The platen 50 can be transferred to the lateral conveyance belts 16A by this forward and rearward rotation. The configuration is not limited to this example, and after the printing in the printer 3, although the platen supporter 60 is conveyed to the left along the pair of rails 3B, the platen supporter 60 may transfer the platen 50 to the lateral conveyance belts 16A during that conveyance. When the platen 50 is placed, the CPU 101 moves the lateral conveyance belts 16A to be higher than the platen supporter 60, and further rotates the lateral conveyance belts 16A to the left. In this way, the platen 50 is transferred from the platen supporter 60 to the lateral conveyance belts 16A.

As described above, the print system 1 according to the first embodiment is provided with the conveyance mechanisms 14 and 15, the print conveyance mechanism 41, and the first positioning cylinder 70. The conveyance mechanism 14 conveys the platen 50 to the pretreatment device 2. The print conveyance mechanism 41 is provided with the platen supporter 60. The platen supporter 60 supports the platen 50 conveyed by the conveyance mechanism 15. The print conveyance mechanism 41 conveys the platen supporter 60 to the printer 3. The first positioning cylinder 70 positions the platen 50 supported by the platen supporter 60 at the prescribed printing position W in the front-rear direction in the printer 3. In this way, the platen 50 is conveyed to the printer 3 by the print conveyance mechanism 41 in the state of being positioned at the prescribed printing position W. Thus, the printer 3 can accurately perform the printing on the cloth P on the platen 50 without any positional displacement.

The platen 50 is provided with the upper plate 55 and the lower plate 54. The upper plate 55 and the lower plate 54 are separated from each other in the up-down direction, and extend in the horizontal direction. The second positioning cylinder 80 is provided at the raising/lowering table 63 and is provided with the pin 84. The pin 84 can move downward between the upper plate 55 and the lower plate 54. The pin 84 moves downward and comes into contact with the lower plate 54. In this way, the platen 50 is lowered with respect to the raising/lowering table 63, the platen 50 is positioned in the up-down direction, and the platen 50 is fixed to the raising/lowering table 63. In this way, the print system 1 can position the platen 50 in the up-down direction.

After the platen supporter 60 has supported the platen 50, the pin 84 of the second positioning cylinder 80 moves downward and positions the platen 50. In this way, the print system 1 can reduce an erroneous operation of determining the position of the platen 50 at the raising/lowering table 63 without supporting the platen 50.

The platen 50 is provided with the pair of the right side face plate 52 and the left side face plate 53. The right side face plate 52 and the left side face plate 53 are provided standing in the up-down direction. The insertion hole 59 is provided in the left side face plate 53. The first positioning cylinder 70 is provided at the raising/lowering table 63 and is provided with the horizontal pin 75. The horizontal pin 75 can move in the horizontal direction toward the left side face plate 53, between the pair of the right side face plate 52 and the left side face plate 53. The horizontal pin 75 has the diameter R that is larger than the small diameter r2 in the front-rear direction, of the diameters of the insertion hole 59. The tapered portion 751 is provided at the leading end portion, of the horizontal pin 75, facing the left side face plate 53. The diameter of the tapered portion 751 becomes smaller toward the left side face plate 53. Then, the horizontal pin 75 moves in the horizontal direction toward the left side face plate 53, the tapered portion 751 is inserted into the insertion hole 59 and comes into contact with the side edge portions 592 that face each other in the front-rear direction, of the edge portions of the insertion hole 59, and the platen 50 is thus positioned at the prescribed printing position W in the horizontal direction. In this way, the platen 50 is positioned in the left-right direction in which the horizontal pin 75 moves and in the front-rear direction in which the side edge portions 592 of the insertion hole 59 face each other. In this way, the print system 1 can position the platen 50 in the left-right direction and in the front-rear direction at the prescribed printing position W.

After the platen supporter 60 has supported the platen 50, the first positioning cylinder 70 moves the horizontal pin 75 in the horizontal direction toward the left side face plate 53, and positions the platen 50 in the left-right direction and the front-rear direction at the prescribed printing position W. After the positioning by the first positioning cylinder 70, the second positioning cylinder 80 moves the pin 84 downward and positions the platen 50 in the up-down direction at the prescribed printing position W. In the state of being supported by the platen supporter 60, the position of the platen 50 in the up-down direction is roughly determined by gravity. Using that characteristic, the print system 1 positions the platen 50 in the up-down direction at the prescribed printing position W after first determining the position of the platen 50 in the left-right direction and the front-rear direction at the prescribed printing position W. In this way, after determining the position of the platen 50 in the horizontal direction at the prescribed printing position W, the print system 1 can easily and rapidly determine the position, at the prescribed printing position W in the up-down direction with respect to the raising/lowering table 63, of the platen 50 for which the position in the up-down direction has been roughly determined. Further, in addition to being able to position the platen 50 at the prescribed printing position W in the horizontal direction, the print system 1 can position the platen 50 with respect to the raising/lowering table 63 in the up-down direction. Thus, the print system 1 can support the cloth P attached to the platen 50 at the constant height position during the conveyance of the platen 50. In this way, the print system 1 can inhibit positional displacement of the printing by the printer 3.

The conveyance mechanism 14 conveys the platen 50 using the longitudinal belts 14A. The conveyance mechanism 15 conveys the platen 50 using the lateral conveyance belts 15A. The print conveyance mechanism 41 conveys the raising/lowering table 63 using the pair of rails 3B. The objective of the conveyance mechanism 14 is to convey the platen 50 to the pretreatment device 2, and thus, by using the longitudinal belts 14A, the cost of equipment can be reduced. The objective of the conveyance mechanism 15 also is to convey the platen 50, and thus, by using the lateral conveyance belts 15A, the cost of equipment can be reduced. On the other hand, it is necessary for the print conveyance mechanism 41 to convey the platen supporter 60 to the printer 3, and to position the platen 50 supported by the platen supporter 60 at the prescribed printing position W, and thus, the pair of rails 3B having the relatively high positioning accuracy are used. In this way, the print system 1 can inhibit the printing positional displacement in the printing by the printer 3.

The platen supporter 60 of the print conveyance mechanism 41 is provided with the pair of rails 67, the ball screw 68, the nut 681, and the raising/lowering motor 69. The pair of rails 67 guide the raising/lowering table 63 in the up-down direction. The ball screw 68 is provided in parallel with the pair of rails 67. The nut 681 is screwed onto the ball screw 68, and is fixed to the raising/lowering table 63. The raising/lowering motor 69 rotates the ball screw 68. In this way, the print system 1 can adjust the height position of the platen 50 supported by the raising/lowering table 63 with a high degree of accuracy.

The first positioning cylinder 70 and the second positioning cylinder 80 are disposed further to the inside than the outer shape of the raising/lowering table 63. In this way, the print system 1 can inhibit the cloth P from becoming caught up on the first positioning cylinder 70 and the second positioning cylinder 80 provided at the raising/lowering table 63, in a state in which, for example, the cloth P is attached along the outer shape of the platen 50 and the platen 50 supports the cloth P. Thus, when the cloth P is removed from the platen 50, for example, the print system 1 can inhibit the cloth from being damaged as a result of the cloth P being caught up on the first positioning cylinder 70 and the second positioning cylinder 80, or inhibit the first positioning cylinder 70 and the second positioning cylinder 80 from falling off as a result of being pulled by the cloth. Further, since the cloth P does not become caught up on the first positioning cylinder 70 and the second positioning cylinder 80, the print system 1 can inhibit any impact on the operation of the first positioning cylinder 70 and the second positioning cylinder 80.

The present disclosure is not limited to the first embodiment and various modifications are possible. Various modifications described below can be combined insofar as no contradictions arise. For example, the present disclosure can also employ a type of printer other than the inkjet printer as in the first embodiment. The print system 1 of the first embodiment positions the platen 50 in the left-right direction and the front-rear direction using the first positioning cylinder 70 and positions the platen 50 in the up-down direction using the second positioning cylinder 80, but the positioning may be performed using a method other than that of the first embodiment. Here, three modified examples are described below in which the method of positioning the platen 50 is changed.

Figure 21:
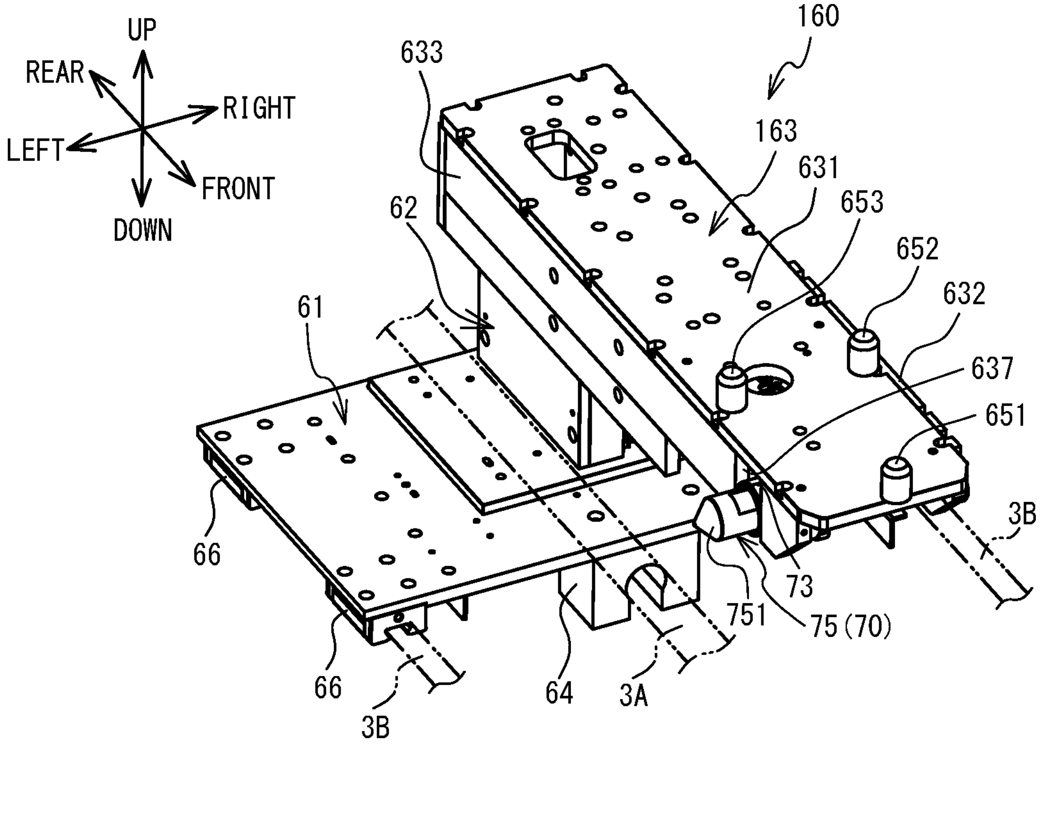
FIG. 21 is a perspective view (a first modified example) of a platen supporter.
Figure 22:
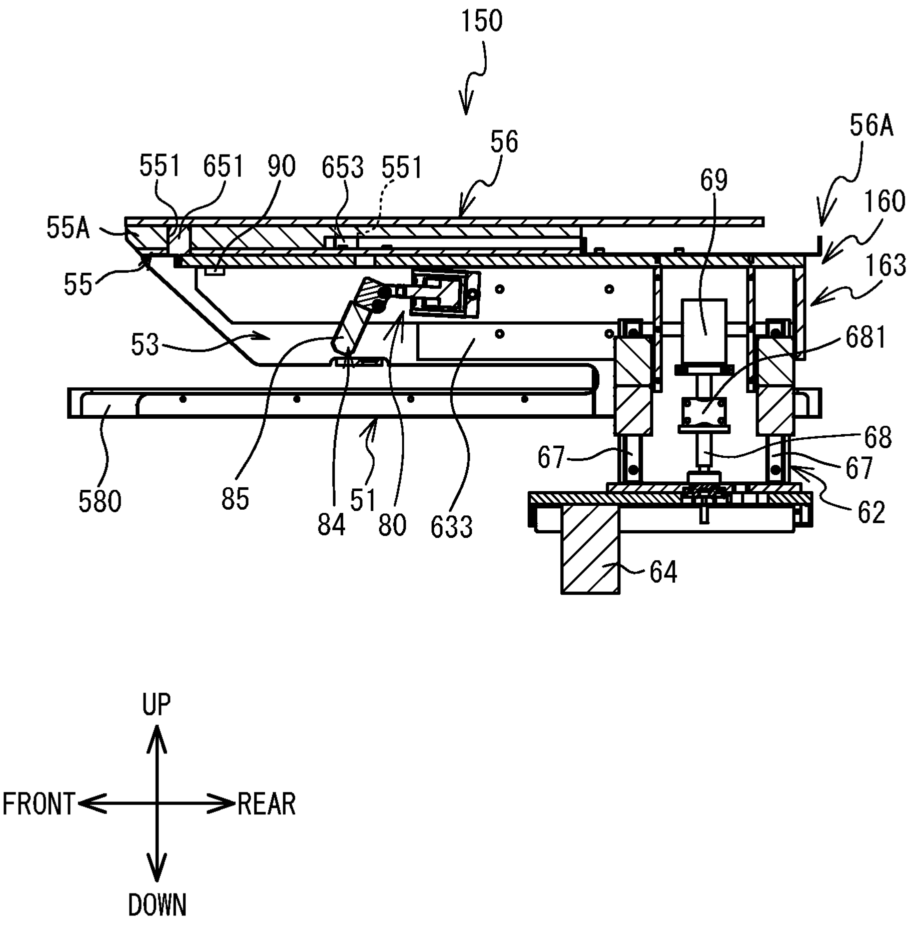
FIG. 22 is a diagram (the first modified example) showing a state in which a platen is positioned with respect to a raising/lowering table.

A first modified example will be described with reference to FIG. 21 and FIG. 22. A platen supporter 160 shown in FIG. 21 is a member obtained by changing the shape of a part of the platen supporter 60 according to the first embodiment. Note that, in FIG. 21 and FIG. 22, the same reference signs are assigned to portions that are the same as those of the platen supporter 60 according to the first embodiment. Three pins 651 to 653 are provided at the upper surface of the upper plate 631 of a raising/lowering table 163 of the platen supporter 160. The pins 651 to 653 are provided at the same positions as the protrusions 634 to 636 (refer to FIG. 6) according to the first embodiment. The pins 651 to 653 have a substantially cylindrical shape and protrude upward. Each of the leading end portions of the pins 651 to 653 are formed in a tapered shape in which a diameter thereof becomes smaller in the upward direction. On the other hand, as shown in FIG. 22, three fitting holes 551 (only two are illustrated in FIG. 22) are provided in the upper plate 55 of a platen 150. The three fitting holes 551 are provided at positions corresponding to each of the three pins 651 to 653, and penetrate from the lower surface of the upper plate 55 upward as far as the spacer 55A.

Figure 13:
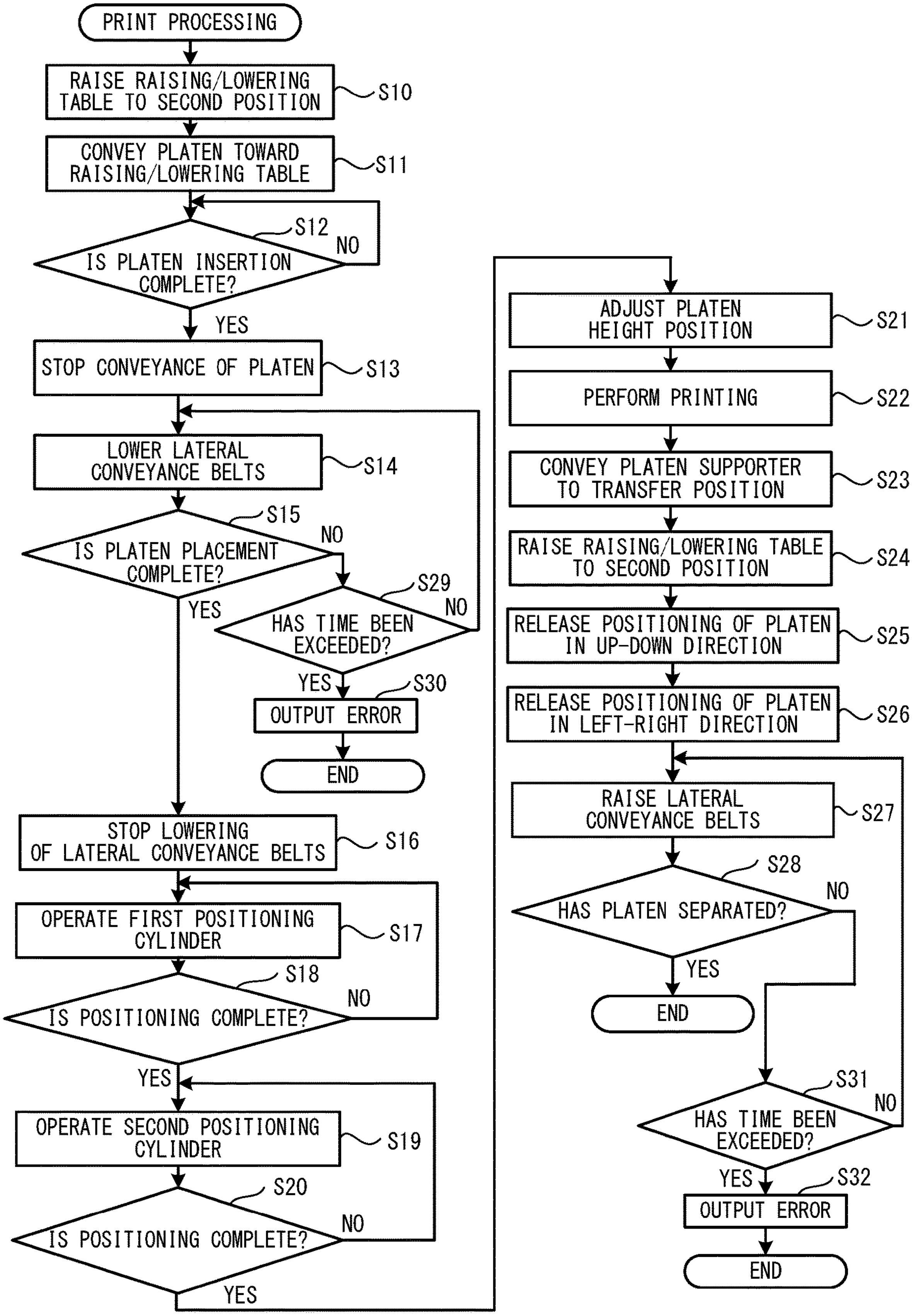
FIG. 13 is a flowchart of print processing.

In the processing at step S14 of the print processing shown in FIG. 13, when lowering the lateral conveyance belts 15A, the CPU 101 causes the three pins 651 to 653 on the raising/lowering table 163 to respectively engage with the three fitting holes 551 on the platen 150. In this way, in the first modified example, the platen 150 can be positioned in the left-right direction and the front-rear direction without using the first positioning cylinder 70.

Figure 23:
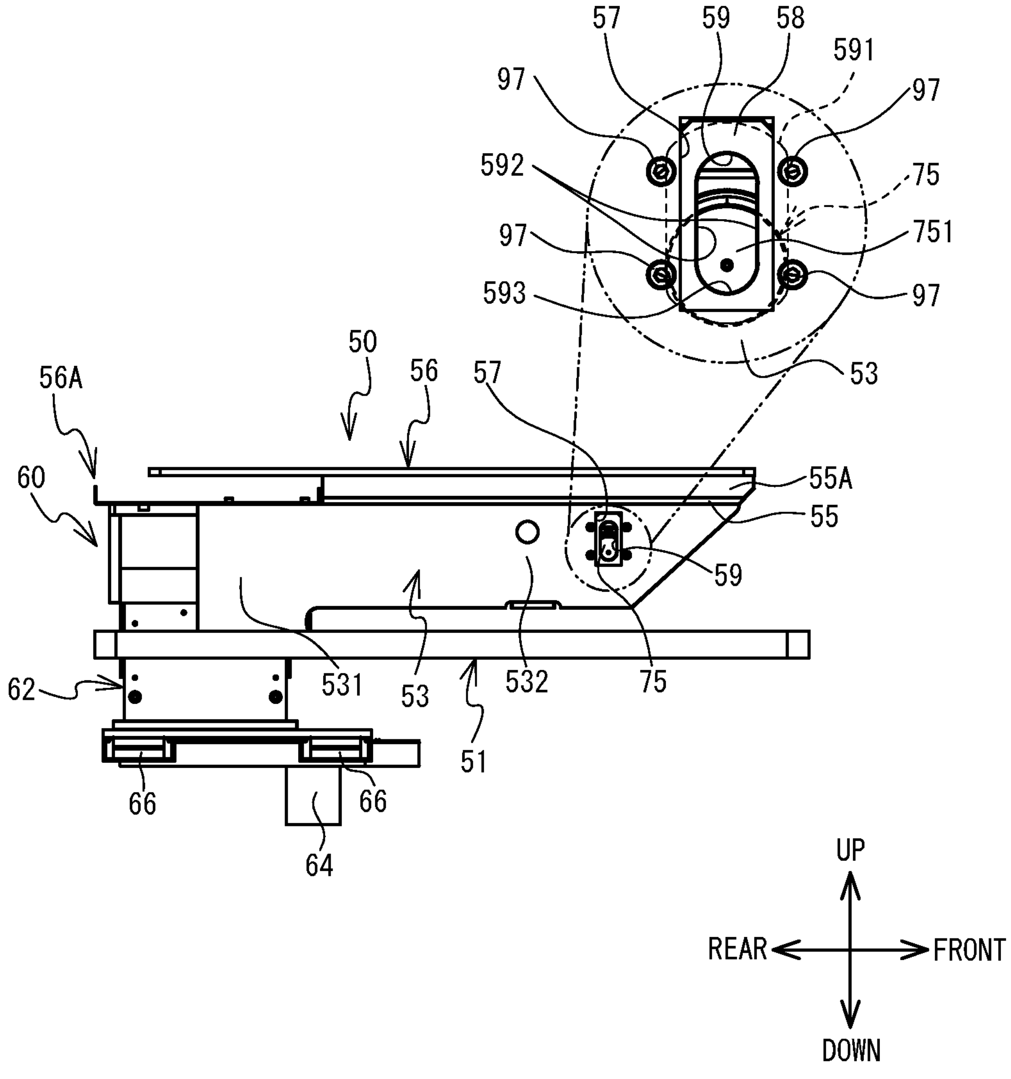
FIG. 23 is a diagram (a second modified example), as seen from the left of the left-side face plate, of a state in which the tapered portion of the horizontal pin has come into contact with the side edge portions and a lower edge portion of the insertion hole, and the side edge portions and the lower edge portion are pressed.

A second modified example will be described with reference to FIG. 23. The second modified example positions the platen 50 in the left-right direction, the front-rear direction, and the up-down direction, using only the first positioning cylinder 70. In the second modified example, the position of the first positioning cylinder 70 is a position slightly lower than the position according to the first embodiment.

When the horizontal pin 75 of the first positioning cylinder 70 has extended to the left, the tapered portion 751 of the horizontal pin 75 comes into contact with the pair of side edge portions 592 of the tapered portion 591 of the insertion hole 59 and pushes the side edge portions 592 to the left. Then, in a similar manner to the first embodiment, the tapered portion 751 of the horizontal pin 75 and the tapered portion 591 of the insertion hole 59 are both are inclined so as to widen in the up-down direction and the front-rear direction from the left toward the right. In this way, the tapered portion 591 slides along the inclined surface of the tapered portion 751, and moves such that the center of the insertion hole 59 is aligned with the position, in the front-rear direction, of the leading end of the horizontal pin 75. At the same time, the tapered portion 751 of the horizontal pin 75 presses the pair of side edge portions 592 to the left. When all of the front end portion, the rear end portion, and the lower end portion of the tapered portion 751 of the horizontal pin 75 are in contact with the front end portion, the rear end portion, and the lower end portion of the insertion hole 59, the platen 50 cannot move in any of the front-rear direction, the left-right direction, and the up-down direction. Thus, the platen 50 is firmly positioned with respect to the raising/lowering table 63 in the front-rear direction, the left-right direction, and the up-down direction. In this way, the second modified example can position the platen 50 in the front-rear direction, the left-right direction, and the up-down direction using only the first positioning cylinder 70, without needing to use the second positioning cylinder 80.

Note that, in the second modified example, the tapered portion 751 of the horizontal pin 75 comes into contact with and presses the pair of side edge portions 592 and the lower edge portion 593, but may position the platen 50 in the left-right direction, the front-rear direction, and the up-down direction by coming into contact with and pressing the pair of side edge portions 592 and an upper edge portion.

Figure 24:
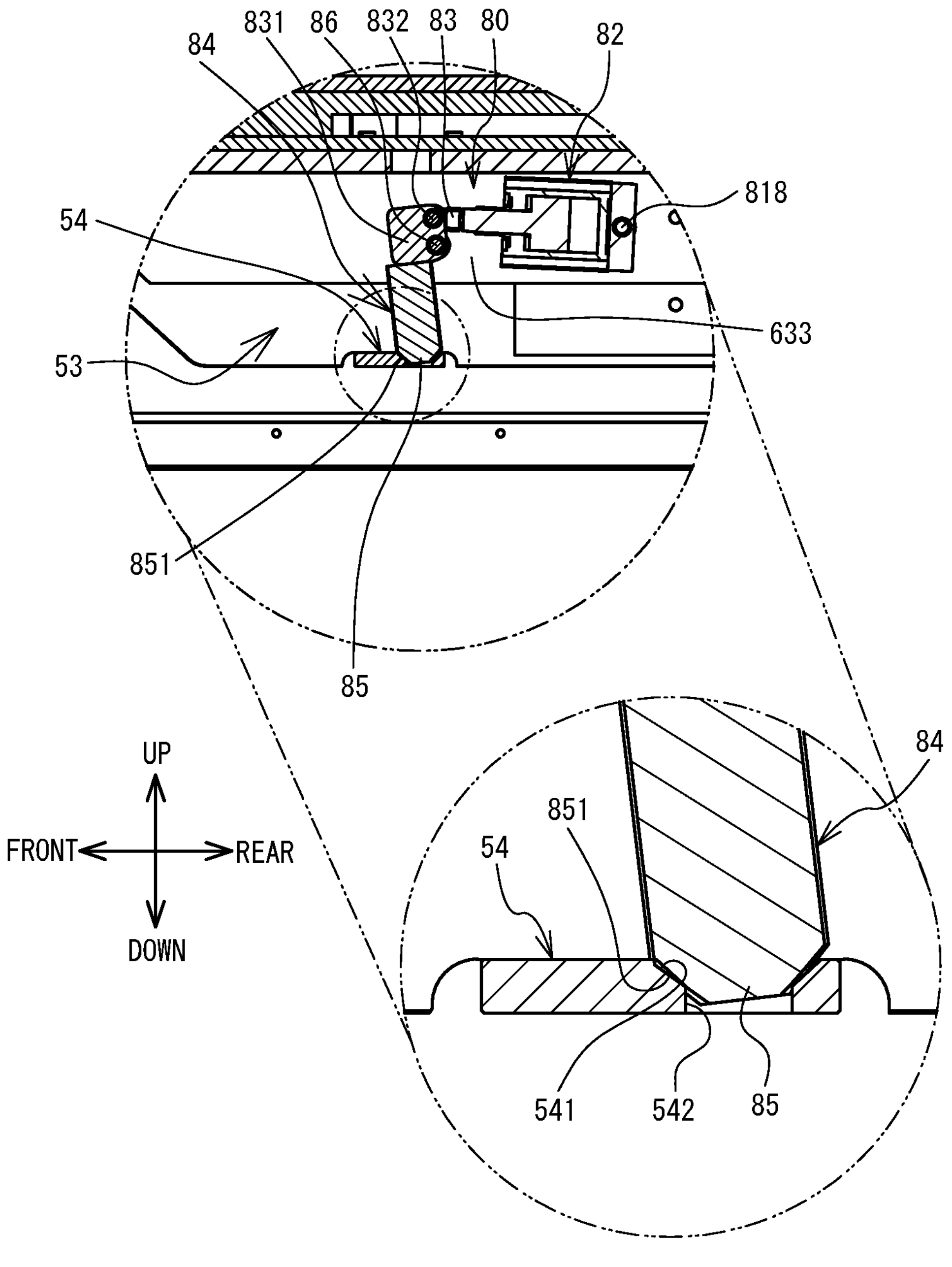
FIG. 24 is a partial expanded view (a third modified example) showing a fitted state in which an R portion of the pin of the second positioning cylinder is fitted into a fitting hole of the lower plate.

A third modified example will be described with reference to FIG. 24. The third modified example positions the platen 50 in the left-right direction, the front-rear direction, and the up-down direction using only the second positioning cylinder 80. The fitting hole 542 that has a circular shape in a plan view is provided in the upper surface of the lower plate 54 of the platen 50 according to the third modified example, and a tapered portion 541 is provided around the outer periphery thereof. The diameter of the tapered portion 541 becomes smaller toward the fitting hole 542. The diameter of the fitting hole 542 is smaller than the diameter of the pin 84 of the second positioning cylinder 80.

When the pin 84 of the second positioning cylinder 80 pivots downward, the R portion 851 of the leading end portion 85 comes into contact with the tapered portion 541 of the upper surface of the lower plate 54. The diameters of both the R portion 851 of the leading end portion 85 and the tapered portion 541 of the fitting hole 542 become wider toward the upward direction, and thus, when the pin 84 pivots further downward, the tapered portion 541 of the upper surface of the lower plate 54 slides along the inclined surface of the R portion 851 of the leading end portion 85, and, in accordance with the position of the leading end portion 85, the fitting hole 542 moves in the front-rear direction and the left-right direction. Then, as a result of the leading end portion 85 fitting into the fitting hole 542, the platen 50 is positioned in the left-right direction and the front-rear direction.

Then, by pressing the lower plate 54 downward in a state in which the pin 84 is fitted into the fitting hole 542, the platen 50 is positioned in the up-down direction. In this way, the third modified example can position the platen 50 in the left-right direction, the front-rear direction, and the up-down direction using only the second positioning cylinder 80, without needing to use the first positioning cylinder 70.

In addition to the three above-described modified examples of the present disclosure, various modifications are possible. The conveyance path of the platen 50 of the print system 1 shown in FIG. 1 is not limited to the path shown in FIG. 1, and the first return line 204 and the second return line 205 may be omitted, for example. The number of the printers can be freely changed, and one or both of the pretreatment device 2 and the post-treatment device 9 may be omitted. Further, in the first embodiment, the print conveyance mechanisms 41 to 43 are configured by the rails and the other conveyance mechanisms are configured by belts, but a conveyance method other than the belt may be used (such as a roller, for example). In addition to being used for the cloth, the platen 50 may be used for a hat, shoes, or the like. The dispatch line 201, the left processing line 202, the right processing line 203, the first return line 204, and the second return line 205 are all straight lines, but may be curved.

The proximity sensor 90 is fixed to the upper plate 631 of the raising/lowering table 63 for detecting the platen 50, but a lever switch may be provided in place of the proximity sensor 90. In this case, when the platen 50 is placed on the raising/lowering table 63, the lever switch is pressed by the platen 50 and is switched on. As a result, the CPU 101 can detect that the platen 50 has been placed on the raising/lowering table 63.

The CPU 101 that controls the print system 1 performs the print processing shown in FIG. 13, but the print processing may be performed by a CPU of each of other devices. In the print processing shown in FIG. 13, at step S14, the CPU 101 lowers the lateral conveyance belts 15A, and causes the platen supporter 60 to support the platen 50. In contrast to this, the CPU 101 may raise the raising/lowering table 63 and may cause the platen supporter 60 to support the platen 50. Note that a second embodiment to be described below can also be changed in a similar manner.

In the print processing shown in FIG. 13, the second positioning cylinder 80 is operated and performs the positioning in the up-down direction after the first positioning cylinder 70 has been operated and the positioning in the left-right direction and the front-rear direction has ended. However, for example, the CPU 101 may first operate the second positioning cylinder 80 and then operate the first positioning cylinder 70 after the positioning in the up-down direction has ended. Further, the CPU 101 may operate the first positioning cylinder 70 and the second positioning cylinder 80 simultaneously, and may position the platen 50 in the left-right direction, the front-rear direction, and the up-down direction simultaneously.

At step S30 and step S32 shown in FIG. 13, when the CPU 101 outputs the error, for example, the CPU 101 may display information indicating error content on the touch panel of the operation portion 110, or may perform error notification using audio.

In the first embodiment, the identification information portion (not shown in the drawings) read by the code reader 95 is provided at the cloth P, but may be provided at the platen 50, for example.

In the first embodiment, the platen 50 is conveyed from the lateral conveyance belts 15A to the printer 3, and after the printing has ended, is transferred to the lateral conveyance belts 16A and conveyed, but after the printing has ended, the platen 50 may be returned to the lateral conveyance belts 15A. The platen supporter 60 moves inside the printer 3 and supports the platen 50 during the printing, and it is thus preferable that the position thereof in the up-down direction, the left-right direction, and the front-rear direction does not become displaced. Thus, when the platen 50 is transferred from the lateral conveyance belts 15A to the platen supporter 60, and when the platen 50 is transferred from the platen supporter 60 to the lateral conveyance belts 16A, it is preferable for the lateral conveyance belts 15A and the lateral conveyance belts 16A to move in the up-down direction rather than the platen supporter 60 moving in the up-down direction. However, the platen supporter 60 may move in the up-down direction without the lateral conveyance belts 15A and the lateral conveyance belts 16A moving in the up-down direction.

In the first embodiment, the first positioning cylinder 70, the second positioning cylinder 80, and the proximity sensor 90 are disposed further inside than the outer shape of the platen supporter 60. An example of this arrangement format will be described. In the state in which the raising/lowering table 63 is inserted inside the platen 50, as shown in FIG. 16, it is sufficient that the first positioning cylinder 70, the second positioning cylinder 80, and the proximity sensor 90 be disposed, in the up-down direction, to be lower than the attachment plate 56 of the platen 50, and to be higher than the lower ends of the forward extending portions 522 and 532 (refer to FIG. 4 for the forward extending portion 522). It is sufficient that the first positioning cylinder 70, the second positioning cylinder 80, and the proximity sensor 90 be positioned between the left end and the right end of the attachment plate 56 in the left-right direction. It is sufficient that the first positioning cylinder 70, the second positioning cylinder 80, and the proximity sensor 90 be disposed further to the rear than the front end of the attachment plate 56 and further to the front than the rear end of the platen 50, in the front-rear direction. As long as this positional relationship is obtained, when the shirt, such as the T-shirt or the like that is the cloth P, is attached to the attachment plate 56 such that a front surface thereof is on the upper surface side of the attachment plate 56 and a back surface thereof is on the lower surface side of the attachment plate 56, the first positioning cylinder 70, the second positioning cylinder 80, and the proximity sensor 90 do not interfere with the cloth P. Note that a positioning mechanism in the horizontal direction and a positioning mechanism in the up-down direction are not limited to those of the first embodiment, and may be provided on the outside of the platen 50, for example, and may come into contact with and position the platen 50 from the outside of the platen 50.

In the first embodiment, when the second positioning cylinder 80 (refer to FIG. 11 and FIG. 20) is operated, the leading end portion 85 of the pin 84 rotates downward in accordance with the extension, to the front, of the cylinder rod 83, and presses the upper surface of the lower plate 54 of the platen 50. At this time, as a result of the cylinder rod 83 further extending to the front, for example, the R portion 851 of the leading end portion 85 of the pin 84 may further press the upper surface of the lower plate 54 of the platen 50 downward. In this case, at the same time that the front portion of the main body portion 82 pivots upward around the main body support shaft 818, the pin 84 gradually lifts up with respect to the upper surface of the lower plate 54 while the R portion 851 slides. In this way, the more the cylinder rod 83 extends to the front, the further downward the leading end portion 85 of the pin 84 presses the upper surface of the lower plate 54.

Hereinafter, the second embodiment will be described with reference to FIG. 25 to FIG. 33. In the following description, in the second embodiment, members having the same shape as those of the first embodiment are assigned with the same reference numbers as the members of the first embodiment, and a description thereof will be omitted or simplified.

Figure 25:
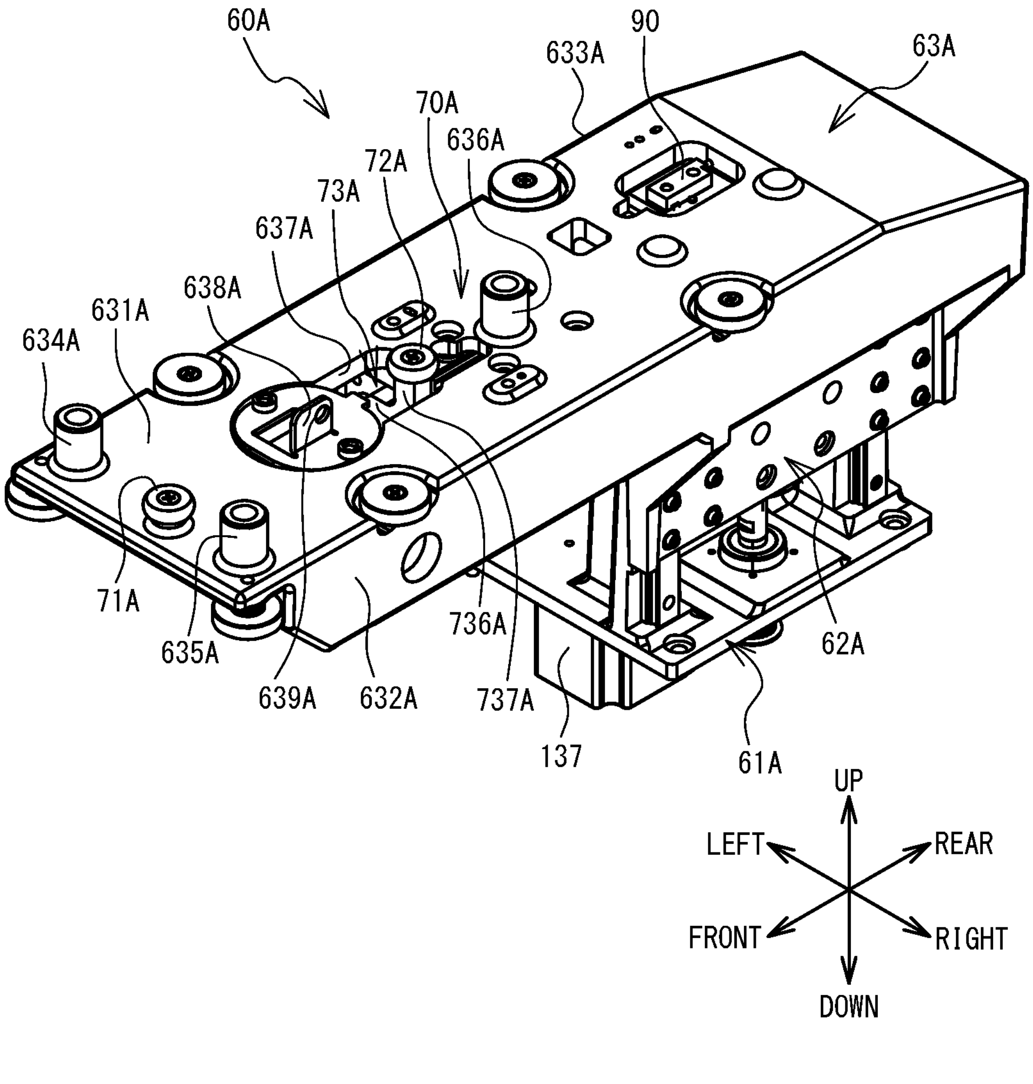
FIG. 25 is a perspective view of a platen supporter.
Figure 27:
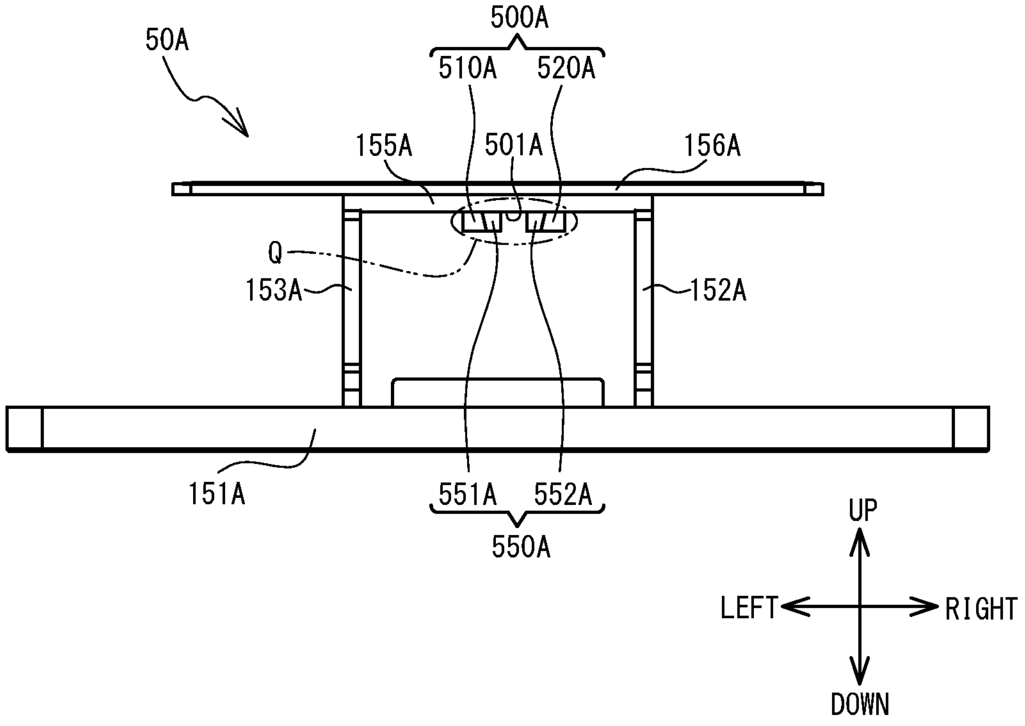
FIG. 27 is a front view of a platen.

In the second embodiment, for the printer 3, the conveyance mechanisms 14, 15, 17, and 19, and the print conveyance mechanisms 41, 42, and 43, the same devices and mechanisms (refer to FIG. 1) are employed as those of the first embodiment. In the second embodiment, points of difference are that, in place of the platen supporter 60 according to the first embodiment shown in FIG. 6, a platen supporter 60A shown in FIG. 25 is employed, and, in place of the platen 50 according to the first embodiment shown in FIG. 3, a platen 50A shown in FIG. 27 is employed.

A detailed configuration of the platen supporter 60A will be described with reference to FIG. 25 and FIG. 26. As shown in FIG. 25, the platen supporter 60A is provided with a base 61A, a column 62A, and a raising/lowering table 63A and the like. The base 61A and the column 62A correspond to the base 61 and the column 62 according the first embodiment shown in FIG. 6, and a description thereof is thus omitted here. The raising/lowering table 63A corresponds to the raising/lowering table 63 according to the first embodiment shown in FIG. 6, and is provided with a upper plate 631A, a right plate 632A, and a left plate 633A. The upper plate 631A has a substantially rectangular shape in a plan view. The right plate 632A extends downward from the right end of the upper plate 631A. The left plate 633A extends downward from the left end of the upper plate 631A.

A hole 637A is provided at the center, in the left-right direction, of the upper plate 631A, and further to the front than the center in the front-rear direction. The hole 637A penetrates the upper plate 631A in the up-down direction. The hole 637A is larger than a movement range, in the front-rear direction, of a rear roller 72A to be described later. Protrusions 634A and 635A are provided, respectively, at the front left corner portion and the front right corner portion of the upper plate 631A. A protrusion 636A is provided to the rear of the hole 637A, of the upper plate 631A. The protrusions 634A, 635A, and 636A protrude upward from the upper surface of the upper plate 631A. In the second embodiment, the proximity sensor 90 is provided to the rear of the protrusion 636A. In other words, the proximity sensor 90 is disposed further to the inside than the outer shape of the upper plate 631A in a plan view.

Figure 33:
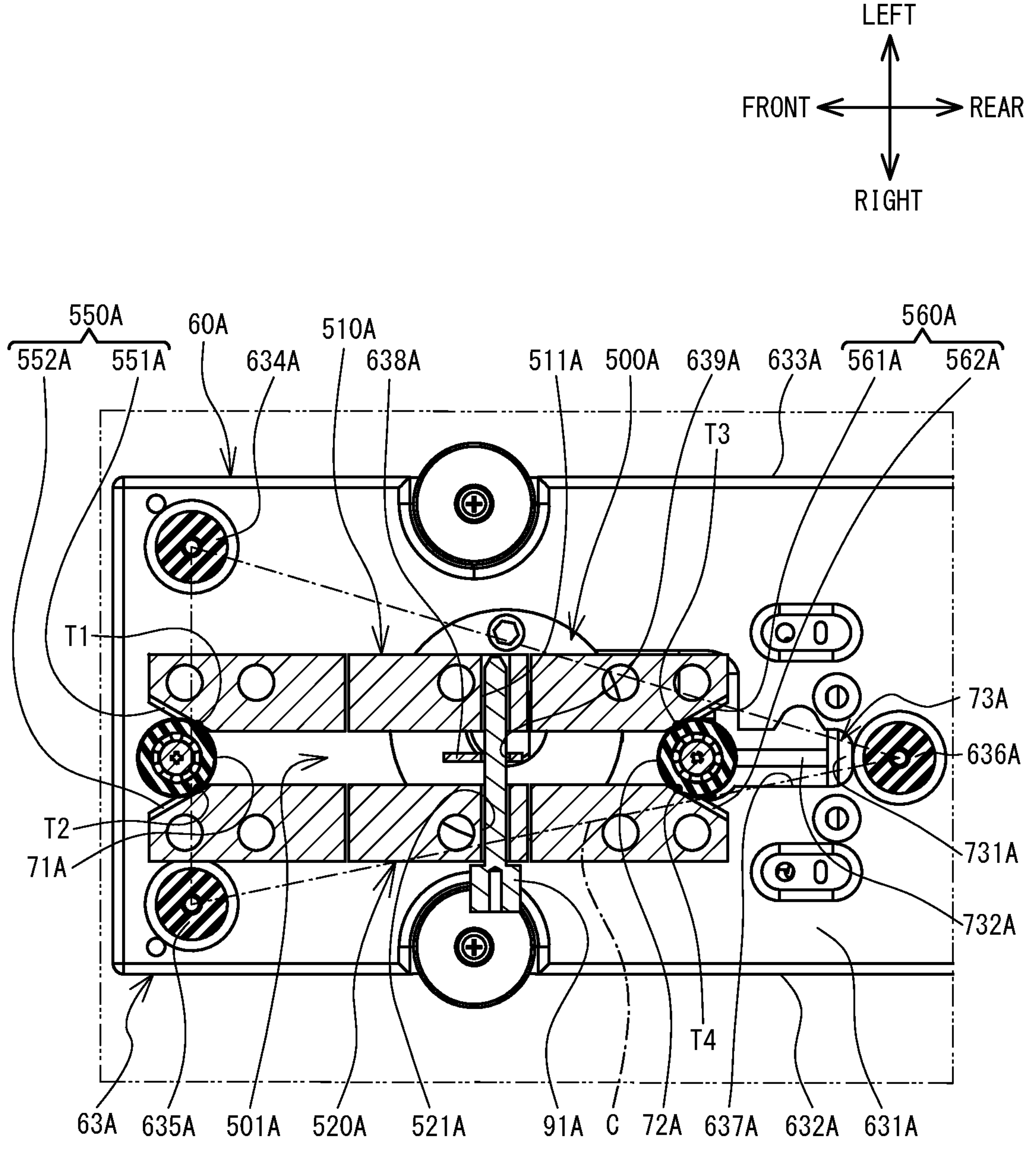
FIG. 33 is a cross-sectional view in the direction of arrows along a line V-V shown in FIG. 32, of a state in which a rotation restricting member is inserted.

A plate 638A is provided at the front end portion of the hole 637A. The plate 638A extends upward from the upper plate 631A. A hole 639A is provided in the plate 638A. The hole 639A penetrates the plate 638A in the left-right direction. A rotation restricting member 91A to be described later and shown in FIG. 33 is inserted through the hole 639A.

Figure 28:
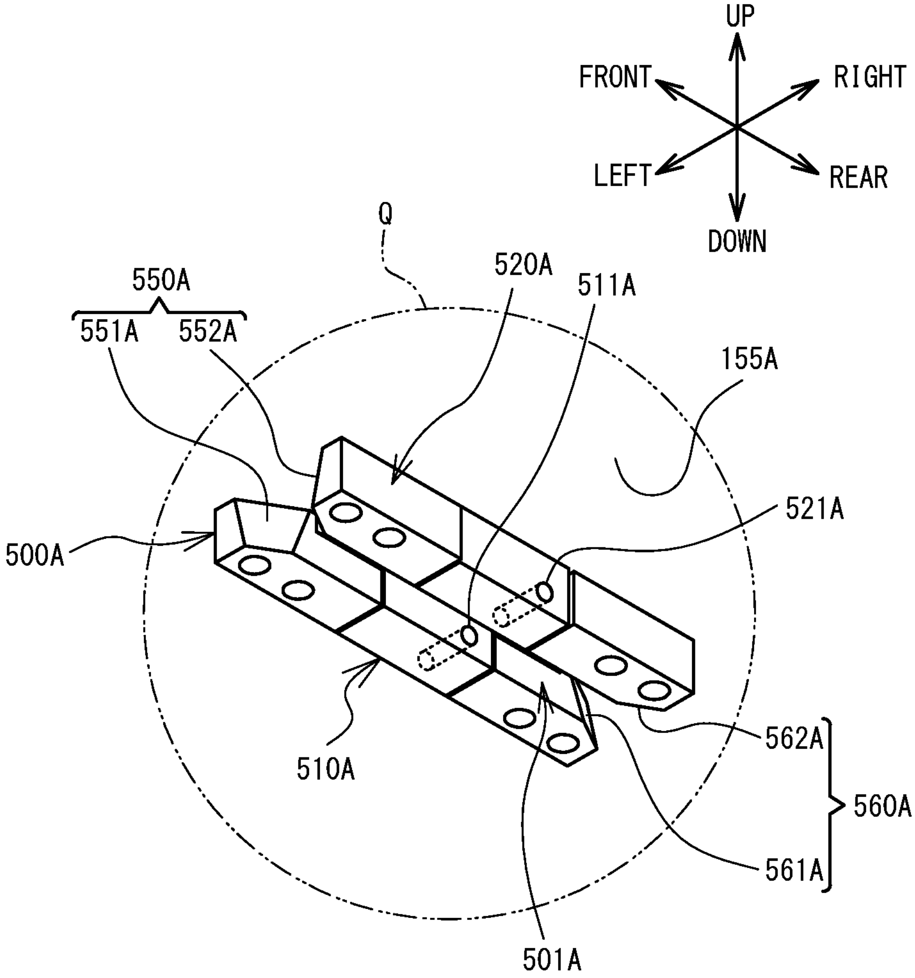
FIG. 28 is a perspective view of a region Q shown in FIG. 27.

A positioner 70A for determining the position of the platen 50A shown in FIG. 28 at the prescribed printing position W is provided at the platen supporter 60A. The positioner 70A is provided with a front roller 71A, a rear roller 72A, and a positioning cylinder 73A. The front roller 71A is provided further to the front than the hole 637A, and protrudes upward from the upper surface of the upper plate 631A. The front roller 71A has a cylindrical shape, and is rotatably supported by the upper plate 631A. A center of rotation of the front roller 71A extends in the up-down direction. The rear roller 72A is provided inside the hole 637A in a plan view, and protrudes further upward than the upper surface of the upper plate 631A. The rear roller 72A has a cylindrical shape and is rotatably supported by a roller support portion 737A to be described later. A center of rotation of the rear roller 72A extends in the up-down direction. Each of the members configuring the positioner 70A, namely, the front roller 71A, the rear roller 72A, and the positioning cylinder 73A are all disposed further to the inside than the outer shape of the upper plate 631A in a plan view.

Figure 26:
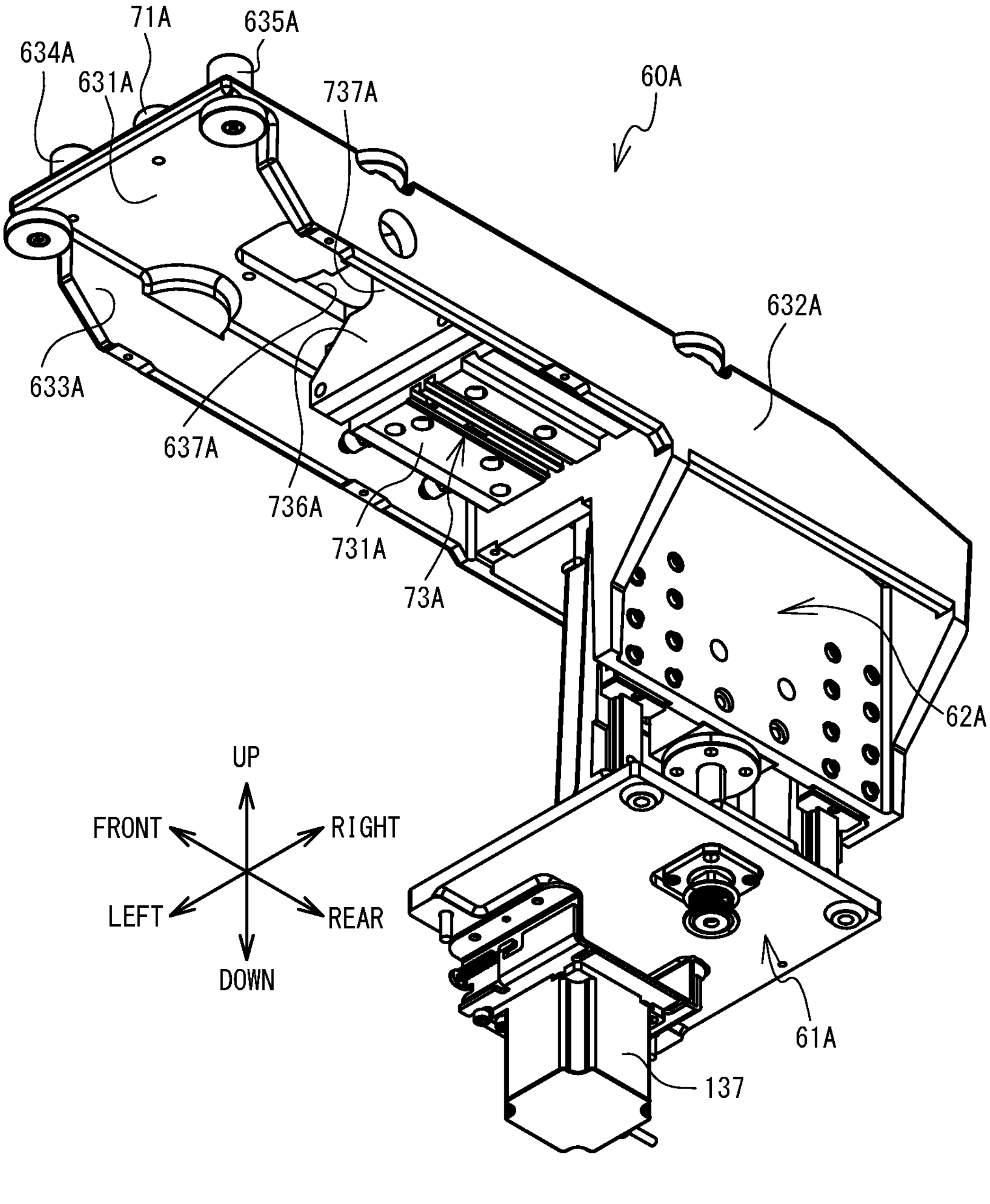
FIG. 26 is a perspective view of the platen supporter.

As shown in FIG. 26, the positioning cylinder 73A is provided at the lower side of the upper plate 631A, and is provided with a main body portion 731A and a cylinder rod 732A. The main body portion 731A is fixed to the lower surface of the upper plate 631A, at a position further to the rear than the hole 637A. The cylinder rod 732A extends to the front from the main body portion 731A, and advances and retracts in the front-rear direction with respect to the main body portion 731A as a result of the driving of the positioning cylinder 73A.

A plate 736A is fixed to the front end of the cylinder rod 732A. The plate 736A extends in the left-right direction. The roller support portion 737A is provided at the center, in the left-right direction, of the plate 736A. As shown in FIG. 25, the roller support portion 737A extends upward from the plate 736A via the hole 637A, to a position above the upper plate 631A. The roller support portion 737A rotatably supports the rear roller 72A.

According to the above-described configuration, the plate 736A moves in the front-rear direction as a result of the cylinder rod 732A advancing and retracting with respect to the main body portion 731A by the driving of the positioning cylinder 73A. In this way, the rear roller 72A moves in the front-rear direction with respect to the platen supporter 60A. When the cylinder rod 732A is retracted with respect to the main body portion 731A, the roller support portion 737A is disposed at the rear end of the hole 637A. At this time, the rear roller 72A is disposed at the rear end of the movable range of the rear roller 72A.

The configuration of the platen 50A will be described in detail with reference to FIG. 27 and FIG. 28. As shown in FIG. 27, the platen 50A is provided with a seat 151A, a right side face plate 152A, a left side face plate 153A, a lower plate 154A, a upper plate 155A, an attachment plate 156A, and the like. The seat 151A, the right side face plate 152A, the left side face plate 153A, the lower plate 154A, the upper plate 155A, and the attachment plate 156A correspond to the seat 51, the right side face plate 52, the left side face plate 53, the lower plate 54, the upper plate 55, and the attachment plate 56 according to the first embodiment shown in FIG. 3, and a description thereof is thus omitted here.

A block 500A is provided at the lower surface of the upper plate 155A. The block 500A has a cuboid shape, and is fixed at a central portion of the upper plate 155A. As shown in FIG. 28, a groove 501A is provided in the lower surface of the block 500A. The groove 501A extends in the front-rear direction at the center, in the left-right direction, of the block 500A. Hereinafter, a portion of the block 500A further to the left than the groove 501A will be referred to as a "left block 510A," and a portion of the block 500A further to the right than the groove 501A will be referred to as a "right block 520A."

The left block 510A and the right block 520A are arranged side by side in the left-right direction and extend in the front-rear direction. Holes 511A and 521A are formed in central portions, in the front-rear direction, of each of the left block 510A and the right block 520A. The hole 511A extends in the left-right direction from the left surface of the left block 510A to the groove 501A. The hole 521A extends in the left-right direction from the right surface of the right block 520A to the groove 501A. The holes 511A and 521A are aligned on a single straight line in the left-right direction. The rotation restricting member 91A to be described later and shown in FIG. 33 is inserted into the holes 511A and 521A.

A rear engaging portion 560A is provided at the rear end portions of the left block 510A and the right block 520A. The rear engaging portion 560A is configured by inclined surfaces 561A and 562A. The inclined surface 561A is formed at a rear right corner portion of the left block 510A, and, in a bottom view, extends to the left the further from the front side toward the rear side. The inclined surface 562A is formed at a rear left corner portion of the right block 520A, and, in a bottom view, extends to the right the further from the front side toward the rear side. Thus, when the rear engaging portion 560A is cut in a horizontal plane, a cross-sectional shape thereof widens in both the left and right directions the further from the front toward the rear, namely, the further from the rear engaging portion 560A toward the rear roller 72A (refer to FIG. 31 and FIG. 33).

In a back view, the inclined surface 561A extends to the left the further from the lower side to the upper side thereof. In a back view, the inclined surface 562A extends to the right the further from the lower side to the upper side thereof. In a side view, the inclined surface 561A extends to the front the further from the lower side to the upper side thereof (refer to FIG. 30 and FIG. 32). In a similar manner, in a side view, the inclined surface 562A extends to the front the further from the lower side to the upper side thereof. Thus, when the rear engaging portion 560A is cut in a plane extending in the up-down direction and the left-right direction, a cross-sectional shape thereof widens in both the left and right directions the further from the lower side toward the upper side.

A front engaging portion 550A is provided at the front end portions of the left block 510A and the right block 520A. Since both the left block 510A and the right block 520A are fixed to the upper plate 155A, the position of the front engaging portion 550A with respect to the rear engaging portion 560A in the front-rear direction is fixed.

The front engaging portion 550A is configuration by inclined surfaces 551A and 552A. The inclined surface 551A is formed at a front right corner portion of the left block 510A, and, in a bottom view, extends to the left the further from the rear side toward the front side. The inclined surface 552A is formed at a front left corner portion of the right block 520A, and, in a bottom view, extends to the right the further from the rear side toward the front side. Thus, when the front engaging portion 550A is cut in a horizontal plane, a cross-sectional shape thereof widens in both the left and right directions the further from the rear toward the front, namely, the further from the front engaging portion 550A toward the front roller 71A (refer to FIG. 31 and FIG. 33).

In a front view, the inclined surface 551A extends to the left the further from the lower side to the upper side thereof. In a front view, the inclined surface 552A extends to the right the further from the lower side to the upper side thereof. In a side view, the inclined surface 551A extends to the rear the further from the lower side to the upper side thereof (refer to FIG. 30 and FIG. 32). In a similar manner, in a side view, the inclined surface 552A extends to the rear the further from the lower side to the upper side thereof. Thus, when the front engaging portion 550A is cut in a plane extending in the up-down direction and the left-right direction, a cross-sectional shape thereof widens in both the left and right directions the further from the lower side toward the upper side.

The electrical configuration of the print system 1 according to the second embodiment will be described. The electrical configuration of the print system 1 according to the second embodiment is the same as the electrical configuration of the print system 1 according to the first embodiment (refer to FIG. 12) excepting the following point. The second embodiment differs from the first embodiment in that an encoder (not shown in the drawings) is provided at the conveyance motor 137. The encoder detects a rotation angle of the conveyance motor 137, and outputs a detection result to the CPU 101.

Figure 29:
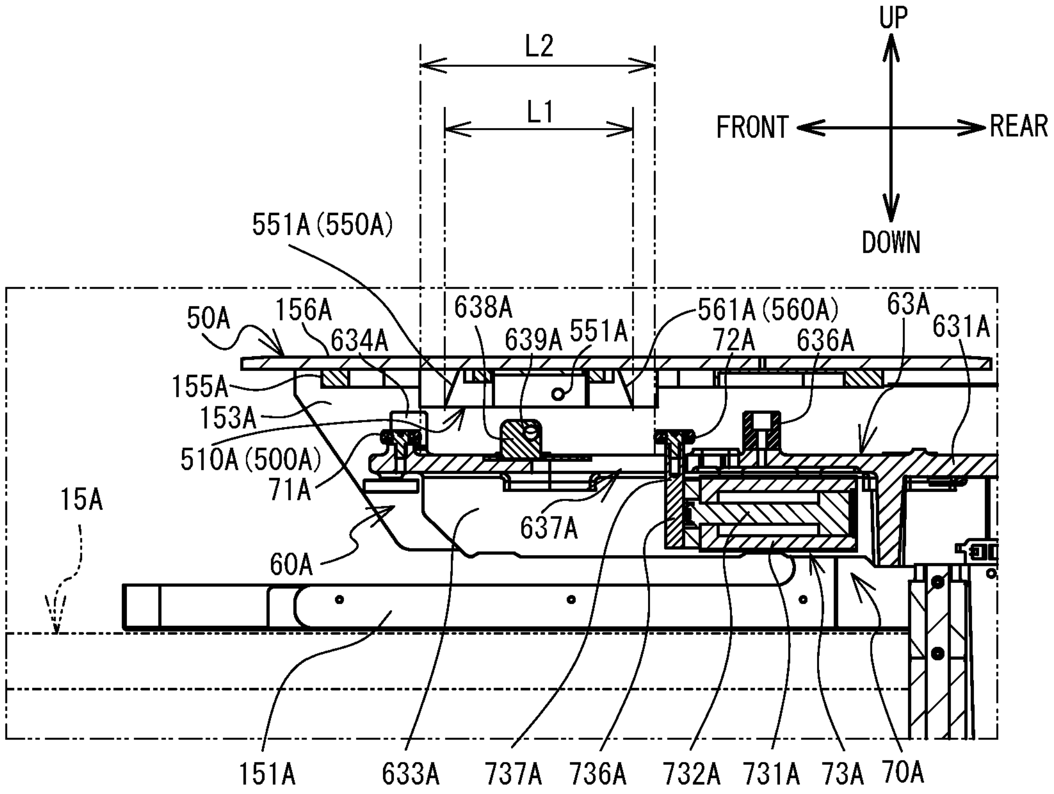
FIG. 29 is a cross-sectional view showing a state in which a raising/lowering table is inserted into the platen.
Figure 30:
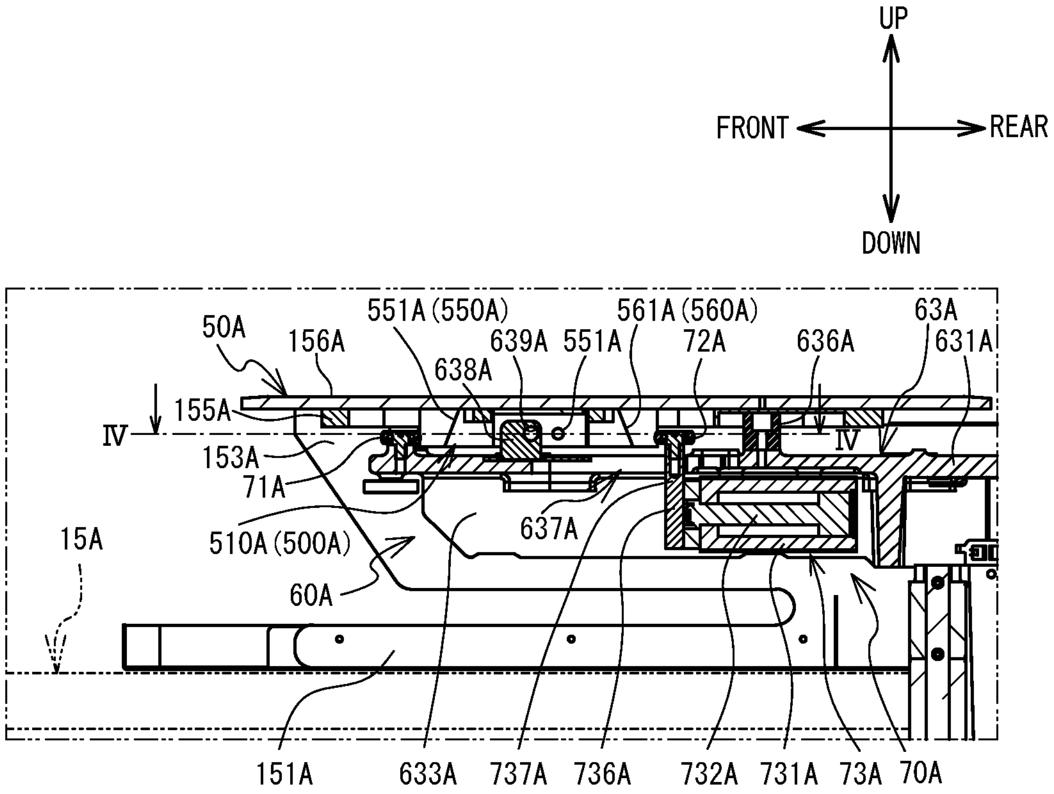
FIG. 30 is a cross-sectional view showing a state in which the lateral conveyance belt is lowered from a state shown in FIG. 29 and the platen is supported on the raising/lowering table.

At the same time as describing the print processing according to the second embodiment with reference to FIG. 13, and FIG. 29 to FIG. 33, a flow will be described from transferring the platen 50A to the platen supporter 60A to determining the position of the platen 50A at the prescribed printing position W. FIG. 29, FIG. 30, and FIG. 32 are cross-sectional views, as seen from the right, of each of states in which the platen 50A is positioned at the prescribed printing position W, when cut in a plane passing through the respective centers, in the left-right direction, of the platen 50A and the platen supporter 60A. Hereinafter, of the print processing according to the second embodiment, a description of the processing that is the same as that of the print processing according to the first embodiment shown in FIG. 13 will be omitted or simplified.

As shown in FIG. 13, in the print processing according to the second embodiment, in a similar manner to the first embodiment, the CPU 101 performs the processing at step S10 to step S13. As shown in FIG. 29, in a state in which the conveyance of the platen 50A in the processing at step S13 shown in FIG. 13 is stopped, the platen 50A is in a state of being separated from the platen supporter 60A. In this state, a distance L2 in the front-rear direction between the rear roller 72A and the front roller 71A is larger than a distance L1 in the front-rear direction between the rear engaging portion 560A and the front engaging portion 550A. It is sufficient that the distance L1 and the distance L2 have a distance relationship in which the rear engaging portion 560A and the front engaging portion 550A can be disposed, in the front-rear direction, between the rear roller 72A and the front roller 71A. For example, the distance L1 is a distance from the front end, at the lower end, of the rear engaging portion 560A to the rear end, at the lower end, of the front engaging portion 550A. The distance L2 is a distance from the front end of the rear roller 72A to the rear end of the front roller 71A in the front-rear direction. Thus, the front engaging portion 550A is positioned further to the front than the front roller 71A, at a position above the front roller 71A, and the rear engaging portion 560A is positioned further to the rear than the rear roller 72A, at a position above the rear roller 72A. As a result, when the platen 50A is transferred to the platen supporter 60A, the print system 1 can suppress the front engaging portion 550A and the rear engaging portion 560A from interfering with the front roller 71A and the rear roller 72A from above.

When the processing at step S14 shown in FIG. 13 is performed by the CPU 101, the platen 50A is transferred to the platen supporter 60A. During the transfer of the platen 50A to the platen supporter 60A, when, for example, the platen supporter 60A moves in the front-rear direction along the pair of rails 3B shown in FIG. 6, the front engaging portion 550A or the rear engaging portion 560A interferes with the front roller 71A or the rear roller 72A from above, and there is a possibility that the transfer of the platen 50A to the platen supporter 60A is not appropriately performed.

In the second embodiment, as described above, the encoder (not shown in the drawings) is provided at the conveyance motor 137. In the processing at step S13 shown in FIG. 13, the CPU 101 controls the conveyance motor 137 on the basis of the detection result from the encoder, and restricts the platen supporter 60A from being conveyed in the front-rear direction by the print conveyance mechanism 41 shown in FIG. 1. Thus, during the transfer of the platen 50A to the platen supporter 60A, even if a force in the front-rear direction acts on the platen supporter 60A, the platen supporter 60A does not move in the front-rear direction along the pair of rails 3B shown in FIG. 6. Thus, in the second embodiment, the transfer of the platen 50A to the platen supporter 60A is appropriately performed.

Figure 31:
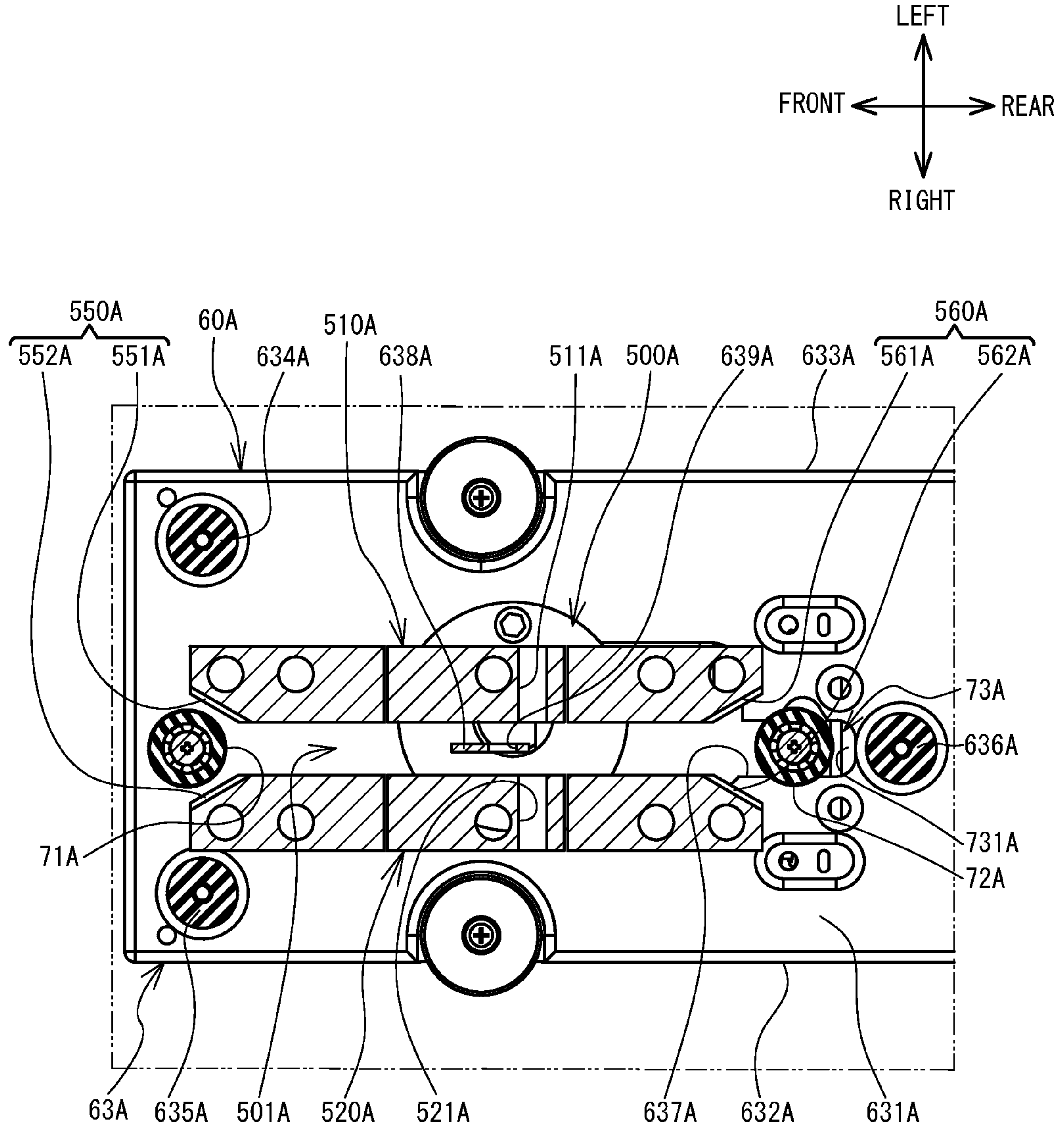
FIG. 31 is a cross-sectional view in the direction of arrows along a line IV-IV shown in FIG. 30.
Figure 32:
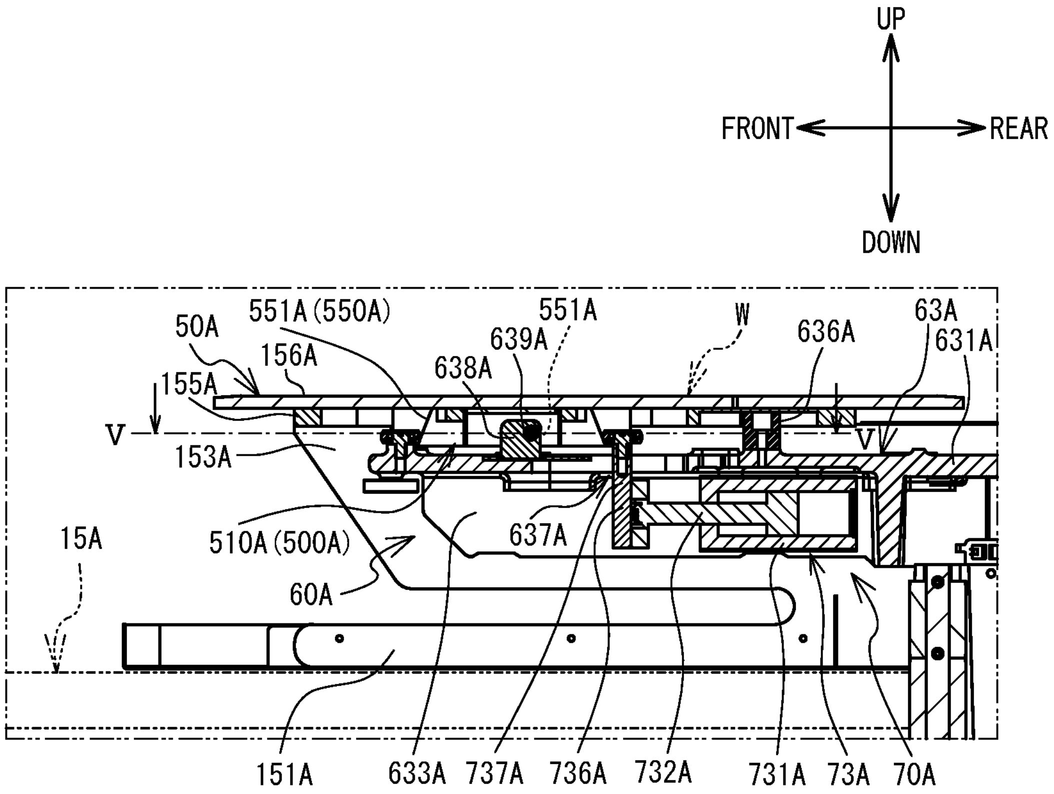
FIG. 32 is a cross-sectional view showing a state in which the platen is positioned at a prescribed printing position by a positioner, from a state shown in FIG. 30.

As shown in FIG. 30 and FIG. 31, when the platen 50A is lowered along with the lowering of the lateral conveyance belts 15A by the processing at step S14 shown in FIG. 13, the upper ends of each of the protrusions 634A, 635A, and 636A come into contact with the lower surface of the upper plate 155A. In this way, the platen 50A is supported by the platen supporter 60A. In other words, the position, in the up-down direction, of the upper ends of each of the protrusions 634A, 635A, and 636A serves as a reference position in the up-down direction for the platen 50A with respect to the platen supporter 60A. Note that the lower end of the block 500A is at a position separated, upward, from the upper surface of the upper plate 631A.

As shown in FIG. 13, the CPU 101 determines whether the platen 50A is placed on the raising/lowering table 63, on the basis of the detection signal from the proximity sensor 90 (step S15). When the platen 50A is not placed on the raising/lowering table 63 (no at step S15), the CPU 101 performs the processing at step S29 and step S30.

When the platen 50A is placed on the raising/lowering table 63 (yes at step S15), the CPU 101 stops the driving of the second raising/lowering motor 136, and stops the lowering of the lateral conveyance belts 15A (step S16). In this state, as shown in FIG. 30 and FIG. 31, the front roller 71A is disposed at the front of the front engaging portion 550A, and the rear roller 72A is disposed at the rear of the rear engaging portion 560A. The plate 638A is disposed further to the rear than a central portion, in the front-rear direction, of the groove 501A. Thus, in this state, the hole 639A is positioned to the rear of the holes 521A and 511A.

As shown in FIG. 13, in the processing at step S17, instead of controlling the first positioning cylinder 70 according to the first embodiment shown in FIG. 9, the CPU 101 controls the positioning cylinder 73A shown in FIG. 32, and causes the cylinder rod 732A to extend to the front from the main body portion 731A. In this way, as shown in FIG. 32 and FIG. 33, the rear roller 72A moves to the front toward the front roller 71A, and the rear engaging portion 560A engages with the rear roller 72A. In a state in which the rear engaging portion 560A is engaged with the rear roller 72A, the rear roller 72A presses the rear engaging portion 560A to the front using an urging force of the positioning cylinder 73A.

When the rear roller 72A presses the rear engaging portion 560A to the front, when the rear roller 72A is displaced toward the inclined surface 561A (the left) or toward the inclined surface 562A (the right) with respect to the center, in the left-right direction, between the inclined surface 561A and the inclined surface 562A, the rear roller 72A moves to the front relative to the rear engaging portion 560A while rotating along the inclined surface 561A or the inclined surface 562A. If, for example, the rear roller 72A does not rotate, a larger friction is more easily generated between the rear roller 72A and the inclined surfaces 561A and 562A than when the rear roller 72A rotates. In the second embodiment, the rear roller 72A rotates, and thus, the large friction between the rear roller 72A and the inclined surfaces 561A and 562A is less likely to be generated. As a result, the print system 1 can suppress wear due to the friction between the rear roller 72A and the inclined surfaces 561A and 562A.

The rear engaging portion 560A is engaged with the rear roller 72A, and thus, the rear engaging portion 560A moves to the front with respect to the platen supporter 60A in accordance with the movement to the front of the rear roller 72A. In this way, the platen 50A moves to the front with respect to the platen supporter 60A. The front engaging portion 550A moves to the front toward the front roller 71A while maintaining the distance, in the front-rear direction, between the front engaging portion 550A and the rear engaging portion 560A to be constant. In this case, when the front roller 71A has become displaced toward the inclined surface 551A (the left) or toward the inclined surface 552A (the right) with respect to the center in the left-right direction between the inclined surface 551A and the inclined surface 552A, the front roller 71A moves to the rear relative to the inclined surfaces 551A and 552A while rotating along the inclined surface 551A or the inclined surface 552A. In the second embodiment, the front roller 71A rotates, and thus, in a similar manner as with the rear roller 72A and the inclined surfaces 561A and 562A, the print system 1 can suppress wear due to the friction between the front roller 71A and the inclined surfaces 551A and 552A.

As a result of the front engaging portion 550A engaging with the front roller 71A, the movement to the front of the platen 50A with respect to the platen supporter 60A is restricted. In other words, the position of the front roller 71A in the front-rear direction is a reference position in the front-rear direction of the platen 50A with respect to the platen supporter 60A. The rear roller 72A is urged to the front toward the front roller 71A by the positioning cylinder 73A, and thus, the movement of the rear roller 72A to the rear is restricted. Thus, as a result of the rear roller 72A moving to the front with respect to the platen supporter 60A in the state in which the rear engaging portion 560A is engaged with the rear roller 72A, the platen 50A is positioned at the prescribed printing position W in the front-rear direction by the positioner 70A.

In addition, when the front engaging portion 550A is cut in the horizontal plane, the cross-sectional shape thereof opens while widening in both the left and right directions from the rear toward the front. As a result, in a state in which the platen 50A is positioned in the front-rear direction, the front roller 71A presses the front engaging portion 550A in both the left and right directions due to the urging force of the positioning cylinder 73A. When the rear engaging portion 560A is cut in the horizontal plane, the cross-sectional shape thereof opens while widening in both the left and right directions from the front toward the rear. As a result, in the state in which the platen 50A is positioned in the front-rear direction, the rear roller 72A presses the rear engaging portion 560A in both the left and right directions due to the urging force of the positioning cylinder 73A. In this way, due to the engagement of the front engaging portion 550A and the front roller 71A, and the engagement of the rear engaging portion 560A and the rear roller 72A, the movement in the left-right direction of the platen 50A with respect to the front roller 71A and the rear roller 72A is restricted. Thus, as a result of the rear roller 72A moving to the front with respect to the platen supporter 60A in the state in which the rear engaging portion 560A is engaged with the rear roller 72A, the platen 50A is positioned at the prescribed printing position W in the left-right direction by the positioner 70A.

Furthermore, when the front engaging portion 550A is cut in a plane extending in the up-down direction and the left-right direction, the cross-sectional shape thereof opens while widening in both the left and right directions from the lower side toward the upper side. As a result, in the state in which the platen 50A is positioned in the front-rear direction, the front roller 71A presses the front engaging portion 550A downward due to the urging force of the positioning cylinder 73A. When the rear engaging portion 560A is cut in a plane extending in the up-down direction and the left-right direction, the cross-sectional shape thereof opens while widening in both the left and right directions from the lower side toward the upper side. As a result, in the state in which the platen 50A is positioned in the front-rear direction, the rear roller 72A presses the rear engaging portion 560A downward due to the urging force of the positioning cylinder 73A. In this way, due to the engagement of the front engaging portion 550A and the front roller 71A, and the engagement of the rear engaging portion 560A and the rear roller 72A, the lower surface of the platen 50A is pressed against the protrusions 634A, 635A, and 636A. As a result, the platen 50A is restricted from lifting up from the protrusions 634A, 635A, and 636A. Thus, as a result of the rear roller 72A moving to the front with respect to the platen supporter 60A in the state in which the rear engaging portion 560A is engaged with the rear roller 72A, the platen 50A is positioned at the prescribed printing position W in the up-down direction.

As described above, the platen 50A is positioned at the prescribed printing position W in the front-rear direction, the left-right direction, and the up-down direction, by the positioner 70A. In this state, a state is maintained, by the positioning cylinder 73A, in which the rear roller 72A is urged to the front toward the front roller 71A. Thus, due to the urging force of the positioning cylinder 73A, the engagement between the front roller 71A and the front engaging portion 550A, and the engagement between the rear engaging portion 560A and the rear roller 72A are not easily released. As a result, the print system 1 can suppress the platen 50A from becoming displaced from the prescribed printing position W.

As shown in FIG. 33, in a plan view, contact portions T1 and T2 between the front roller 71A and the front engaging portion 550A, and contact portions T3 and T4 between the rear roller 72A and the rear engaging portion 560A are all disposed inside a triangular region C formed by joining centers of the protrusions 634A, 635A, and 636A. Thus, a downward force acting on the protrusions 634A, 635A, and 636A due to the urging force of the positioning cylinder 73A is easily distributed in an even manner over each of the protrusions 634A, 635A, and 636A. As a result, the positioning of the platen 50A at the prescribed printing position W in the up-down direction is stable.

Furthermore, the platen 50A is positioned at the prescribed printing position W with respect to the platen supporter 60A, at the two locations of the front roller 71A and the front engaging portion 550A, and the rear roller 72A and the rear engaging portion 560A. Thus, the platen 50A is restricted from rotation in the horizontal direction around the front engaging portion 550A, and the platen 50A is restricted from rotating in the horizontal direction around rear engaging portion 560A. Furthermore, the platen 50A is restricted from lifting up to the rear end with the front engaging portion 550A as a fulcrum, and the platen 50A is restricted from lifting up to the front end with the rear engaging portion 560A as a fulcrum.

When the platen 50A is positioned at the prescribed printing position W as a result of the platen 50A moving to the front with respect to the platen supporter 60A, the plate 638A is disposed at a central portion, in the front-rear direction, of the groove 501A. In this way, in the state in which the platen 50A is positioned at the prescribed printing position W, the holes 511A, 639A, and 521A are aligned on the straight line in the left-right direction. In this state, a user inserts the rotation restricting member 91A into the holes 521A, 639A, and 511A.

The rotation restricting member 91A is a pin for restricting the platen 50A from rotating in the horizontal direction with respect to the platen supporter 60A, and extends from the right end of the right block 520A to the left end of the left block 510A. In this case, if the platen 50A tries to rotate in the horizontal direction with respect to the platen supporter 60A, the rotation restricting member 91A engages with the walls of the holes 511A, 639A, and 521A. In this way, the platen 50A is further restricted from rotating in the horizontal direction with respect to the platen supporter 60A. The flow from transferring the platen 50A to the platen supporter 60A up to determining the position of the platen 50A at the prescribed printing position W ends in this way.

The description will return to FIG. 13. The CPU 101 omits the processing at step S18 to step S20, and performs the processing at step S21 to step S24. In the processing at step S25, the CPU 101 controls the positioning cylinder 73A shown in FIG. 32 and FIG. 33, and causes the cylinder rod 732A to retract to the rear into the main body portion 731A. In this way, the rear roller 72A is separated, to the rear, from the rear engaging portion 560A. Thus, the positioning of the platen 50A at the prescribed printing position W in the front-rear direction, the left-right direction, and the up-down direction is released. The user removes the rotation restricting member 91A shown in FIG. 33 from the holes 511A, 639A, and 521A. The CPU 101 omits the processing at step S26, and performs the processing at step S27, step S28, step S31, and step S32. The CPU 101 ends the print processing according to the second embodiment.

As described above, the print system 1 according to the second embodiment is provided with the conveyance mechanisms 14 and 15, the print conveyance mechanism 41, and the positioner 70A. The conveyance mechanism 14 conveys the platen 50A to the pretreatment device 2. The print conveyance mechanism 41 is provided with the platen supporter 60A. The platen supporter 60A supports the platen 50A conveyed by the conveyance mechanism 15. The print conveyance mechanism 41 conveys the platen supporter 60A to the printer 3. Thus, the positioner 70A positions the platen 50A at the prescribed printing position W in the front-rear direction. In this way, in a similar manner to the first embodiment, the printer 3 can accurately perform the printing on the cloth P without any positional displacement.

The rear engaging portion 560A is provided at the platen 50A. The positioner 70A is provided with the rear roller 72A. The rear roller 72A is provided at the platen supporter 60A, and can move in the front-rear direction with respect to the platen supporter 60A. When the platen 50A is positioned at the prescribed printing position W by the positioner 70A, the rear engaging portion 560A engages with the rear roller 72A. Thus, the print system 1 can even more accurately position the platen 50A at the prescribed printing position W.

As a result of the rear roller 72A moving in the front-rear direction in the state in which the rear engaging portion 560A is engaged with the rear roller 72A, the positioner 70A positions the platen 50A at the prescribed printing position W. The positioner 70A is provided with the front roller 71A. The front roller 71A is provided at the platen supporter 60A. For example, the rear roller 72A can move between a first position and a second position. The first position and the second position are different from each other in the front-rear direction. When the rear roller 72A is at the first position in the state in which the platen 50A is supported, from below, by the platen supporter 60A, the rear engaging portion 560A engages with the rear roller 72A from the front, and the front engaging portion 550A engages with the front roller 71A from the rear. When the rear roller 72A is at the second position in the state in which the platen 50A is supported, from below, by the platen supporter 60A, the rear engaging portion 560A separates from the rear roller 72A to the front, or the front engaging portion 550A separates from the front roller 71A to the rear. Alternatively, when the rear roller 72A is at the second position in the state in which the platen 50A is supported, from below, by the platen supporter 60A, the rear engaging portion 560A separates from the rear roller 72A to the front, and the front engaging portion 550A separates from the front roller 71A to the rear. When the platen 50A is positioned at the prescribed printing position W by the positioner 70A, the rear engaging portion 560A engages with the rear roller 72A, and the front engaging portion 550A engages with the front roller 71A. In this way, the platen 50A engages with the platen supporter 60A in the two locations in the front-rear direction. Thus, the print system 1 can suppress the platen 50A from rotating in the horizontal direction with respect to the platen supporter 60A.

The positioner 70A is provided with the positioning cylinder 73A. The positioning cylinder 73A urges the rear roller 72A toward the front roller 71A. Thus, due to the urging force of the positioning cylinder 73A, the rear engaging portion 560A reliably engages with the rear roller 72A. As a result, the print system 1 can even more accurately position the platen 50A at the prescribed printing position W. In the state in which the platen 50A is positioned at the prescribed printing position W, the urging force of the positioning cylinder 73A is maintained. Thus, the print system 1 can suppress the platen 50A from becoming displaced from the prescribed printing position W.

The rear roller 72A is provided so as to be able to move in a direction approaching the front roller 71A in the front-rear direction. The print system 1 is provided with the proximity sensor 90 and the CPU 101. The proximity sensor 90 detects that the platen 50A is supported by the platen supporter 60A. When it is detected by the proximity sensor 90 that the platen 50A is supported by the platen supporter 60A, the CPU 101 urges the rear roller 72A toward the front roller 71A by controlling the positioning cylinder 73A. In the state in which the platen 50A is separated from the platen supporter 60A, the distance L2 between the rear roller 72A and the front roller 71A in the front-rear direction is larger than the distance L1 between the rear engaging portion 560A and the front engaging portion 550A in the front-rear direction. Thus, when the platen 50A is transferred to the platen supporter 60A, the print system 1 can suppress the front engaging portion 550A and the rear engaging portion 560A from interfering with the front roller 71A and the rear roller 72A from above. When it is detected by the proximity sensor 90 that the platen 50A is supported by the platen supporter 60A, the positioning cylinder 73A is controlled, and the rear roller 72A is urged toward the front roller 71A. Thus, the print system 1 can suppress the rear roller 72A from being urged toward the front roller 71A by the positioning cylinder 73A in the state in which the platen 50A is not supported by the platen supporter 60A.

As a result of moving the rear roller 72A to the front in the state in which the rear engaging portion 560A is engaged with the rear roller 72A, the positioner 70A positions the platen 50A at the prescribed printing position W in the left-right direction. For example, the rear roller 72A can move between the first position and the second position. The first position and the second position are different from each other in the front-rear direction. When the rear roller 72A is at the first position in the state in which the platen 50A is supported, from below, by the platen supporter 60A, the rear engaging portion 560A engages with the rear roller 72A from the front and from the left and right directions, and the front engaging portion 550A engages with the front roller 71A from the rear and from the left and right directions. When the rear roller 72A is at the second position in the state in which the platen 50A is supported, from below, by the platen supporter 60A, the rear engaging portion 560A separates from the rear roller 72A to the front, or the front engaging portion 550A separates from the front roller 71A to the rear. Alternatively, when the rear roller 72A is at the second position in the state in which the platen 50A is supported, from below, by the platen supporter 60A, the rear engaging portion 560A separates from the rear roller 72A to the front, and the front engaging portion 550A separates from the front roller 71A to the rear. Thus, in addition to positioning the platen 50A at the prescribed printing position W in the front-rear direction, the print system 1 can position the platen 50A at the prescribed printing position W in the left-right direction.

The rear engaging portion 560A is open while widening in both the left and right directions the further from the rear engaging portion 560A toward the rear roller 72A, that is, the further from the front toward the rear. Thus, it is not necessary to separately provide a mechanism for positioning the platen 50A at the prescribed printing position W in the front-rear direction, and a mechanism for positioning the platen 50A at the prescribed printing position W in the left-right direction. As a result, the print system 1 can position the platen 50A at the prescribed printing position W in the front-rear direction and the left-right direction using a simple mechanism.

As a result of moving the rear roller 72A to the front in the state in which the rear engaging portion 560A is engaged with the rear roller 72A, the positioner 70A positions the platen 50A at the prescribed printing position W in the up-down direction. For example, the rear roller 72A can move between the first position and the second position. The first position and the second position are different from each other in the front-rear direction. When the rear roller 72A is at the first position in the state in which the platen 50A is supported, from below, by the platen supporter 60A, the rear engaging portion 560A engages with the rear roller 72A from the front and from below, and the front engaging portion 550A engages with the front roller 71A from the rear and from below. When the rear roller 72A is at the second position in the state in which the platen 50A is supported, from below, by the platen supporter 60A, the rear engaging portion 560A separates from the rear roller 72A to the front, or the front engaging portion 550A separates from the front roller 71A to the rear. Alternatively, when the rear roller 72A is at the second position in the state in which the platen 50A is supported, from below, by the platen supporter 60A, the rear engaging portion 560A separates from the rear roller 72A to the front, and the front engaging portion 550A separates from the front roller 71A to the rear. Thus, in addition to positioning the platen 50A at the prescribed printing position W in the front-rear direction, the print system 1 can position the platen 50A at the prescribed printing position W in the up-down direction.

The print system 1 is provided with the rotation restricting member 91A. Thus, using the rotation restricting member 91A, the print system 1 can suppress the platen 50A from rotating in the horizontal direction with respect to the platen supporter 60A. If, for example, an upward force acts on the platen 50A, the rotation restricting member 91A engages with the walls of the holes 521A, 639A, and 511A. Thus, using the rotation restricting member 91A, the print system 1 can suppress the platen 50A from being removed upward from the platen supporter 60A.

In the processing at step S13, the print system 1 controls the conveyance motor 137 using the CPU 101. In this way, the platen supporter 60A is suppressed from moving in the front-rear direction while the platen 50A is being transferred to the platen supporter 60A. As a result, the print system 1 can suppress the transfer of the platen 50A to the platen supporter 60A from becoming difficult.

The present disclosure is not limited to the second embodiment and various modifications are possible. For example, in the second embodiment, the rear roller 72A may be fixed with respect to the platen supporter 60A, and the front roller 71A may be movable with respect to the platen supporter 60A in the front-rear direction. In the second embodiment, the rear roller 72A may be movable in the front-rear direction, for example, rather than in the front-rear direction. In this case, the front roller 71A may be provided on the left or on the right of the rear roller 72A, and the block 500A may be fixed to the platen 50A at an orientation obtained by rotating the block 500A by 90° in the horizontal direction, centered on itself, from the orientation of the second embodiment.

In the second embodiment, a configuration may be adopted in which one or both the front roller 71A and the rear roller 72A are not able to rotate. For example, a wall may be provided in place of the front roller 71A. In the second embodiment, the front roller 71A and the rear roller 72A are cylindrically shaped. In contrast to this, the front roller 71A and the rear roller 72A may be another shape, such as a conical shape, for example. The front roller 71A and the rear roller 72A may have a polygonal shape in a plan view, or may have the shape of the front engaging portion 550A and the rear engaging portion 560A in a plan view, for example. The front roller 71A and the rear roller 72A may have mutually different shapes.

One or both of the front engaging portion 550A and the rear engaging portion 560A may have a shape that is different from the above-described embodiment. For example, the front engaging portion 550A and the rear engaging portion 560A may have flat surfaces that extend in the up-down direction and the left-right direction, or may have a curved shape. When the front engaging portion 550A is cut in a horizontal plane, the shape thereof may be a tapered shape that is inclined to the inside in both the left and right directions the further from the rear to the front. In this case, the shape of the front roller 71A in a horizontal plane may correspond to the tapered shape of the front engaging portion 550A, and may be a shape that is open while widening in both the left and right directions the further from the front toward the rear.

In the second embodiment, the front engaging portion 550A and the rear engaging portion 560A are configured by the block 500A. In contrast to this, the front engaging portion 550A and the rear engaging portion 560A may be configured by a plurality of divided blocks. For example, four blocks, namely, a block on which the inclined surface 551A is formed, a block on which the inclined surface 552A is formed, a block on which the inclined surface 561A is formed, and a block on which the inclined surface 562A is formed may be fixed to the lower surface of the platen 50A. Alternatively, two blocks, namely a block on which the inclined surfaces 551A and 552A are formed, and a block on which the inclined surfaces 561A and 562A are formed, may be fixed to the lower surface of the platen 50A. In the above-described embodiment, the respective rear ends of the inclined surfaces 551A and 552A are separated from each other in the left-right direction. In contrast to this, the respective rear ends of the inclined surfaces 551A and 552A may be connected to each other. Similarly, the respective front ends of the inclined surfaces 561A and 562A may be connected to each other.

In the second embodiment, an elastic member, such as a spring, a rubber, a sponge, or the like, may be provided in place of the positioning cylinder 73A. In other words, the rear roller 72A may be urged toward the front roller 71A by an elastic force of the elastic member.

In the second embodiment, the positioning cylinder 73A urges the rear roller 72A toward the front roller 71A by pressing the rear roller 72A from the rear. In contrast to this, the positioning cylinder 73A may urge the rear roller 72A toward the front roller 71A by pulling the rear roller 72A from the front. The positioning cylinder 73A may urge the front roller 71A toward the rear roller 72A.

In the second embodiment, the user inserts the rotation restricting member 91A into each of the holes 521A, 639A, and 511A. In contrast to this, the print system 1 may be provided with a restricting pin drive portion (a robot, for example) for moving between a position at which the rotation restricting member 91A is inserted into each of the holes 521A, 639A, and 511A, and a position at which the rotation restricting member 91A is removed from each of the holes 521A, 639A, and 511A. In this case, the CPU 101 may control the restricting pin drive portion and may perform an operation to remove the rotation restricting member 91A from or insert the rotation restricting member 91A into each of the holes 521A, 639A, and 511A.

In the second embodiment, the platen 50A is restricted from rotating in the horizontal direction with respect to the platen supporter 60A by the rotation restricting member 91A being inserted into each of the holes 521A, 639A, and 511A. A member other than the pin, such as a plate, or a block, may be employed as the rotation restricting member 91A. The print system 1 may adopt another rotation restricting mechanism and restrict the platen 50A from rotating in the horizontal direction with respect to the platen supporter 60A. The print system 1 need not necessarily be provided with the rotation restricting member 91A.

In the second embodiment, the print system 1 may be provided with a sensor for detecting the removal and insertion of the rotation restricting member 91A into and from the holes 521A, 639A, and 511A. In this case, the CPU 101 may move to subsequent processing when it is detected by the sensor that the rotation restricting member 91A has been inserted into the holes 521A, 639A, and 511A, or that the rotation restricting member 91A has been removed from the holes 521A, 639A, and 511A.

In the second embodiment, by the restriction control, the print system 1 restricts the platen supporter 60A from being conveyed in the front-rear direction by the print conveyance mechanisms 41, 42, and 43. In contrast to this, the print system 1 may configured to be able to structurally restrict the platen supporter 60A from being conveyed in the front-rear direction by the print conveyance mechanism 41. For example, a movement restricting hole may be provided in the platen supporter 60A, and a movement restricting pin may be engaged with the print conveyance mechanism 41 by inserting the movement restricting pin into the movement restricting hole. In this case, since the movement restricting pin is engaged with both the movement restricting hole and the print conveyance mechanism 41, the print system 1 can structurally restrict the platen supporter 60A from being conveyed in the front-rear direction by the print conveyance mechanism 41. The user may insert the movement restricting pin into the movement restricting hole before attaching the platen 50A to the platen supporter 60A, and may remove the movement restricting pin from the movement restricting hole after the attachment of the platen 50A to the platen supporter 60A is complete. The print system 1 may be provided with a movement restricting pin drive portion (a robot, for example) for moving the movement restricting pin to a position at which the movement restricting pin is inserted into the movement restricting hole and to a position at which the movement restricting pin is removed from the movement restricting hole. In this case, the CPU 101 may control the movement restricting pin drive portion and remove the rotation restricting pin from or insert the rotation restricting pin into the movement restricting hole.

In the second embodiment, some or all of the contact portions T1 to T4 may be disposed outside the triangular region C in a plan view. The number of the protrusions 634A, 635A, and 636A may be two or less, or may be four or more. The print system 1 need not necessarily be provided with the protrusions 634A, 635A, and 636A. In this case, the lower surface of the upper plate 155A may be in contact with the upper surface of the upper plate 631A. The protrusions 634A, 635A, and 636A may be provided on the lower surface of the upper plate 155A.

The first conveyance path may convey the platen using a belt or a roller, and the second conveyance path may convey the platen supporter using a rail.

The objective of the first conveyance path is to convey the platen to the pretreatment device, and thus, by using the belt or the roller having the relatively low positioning accuracy, a cost of equipment can be reduced. On the other hand, it is necessary for the second conveyance path to convey the platen supporter to the printer, and to position the platen supported by the platen supporter at the prescribed printing position, and thus, the rail having the relatively high positioning accuracy is used. In this way, the platen conveyance device can inhibit a printing position in the printing by the printer from becoming displaced.

The second conveyance path may be provided with a rail that guides the platen supporter in the up-down direction, a ball screw provided in parallel with the rail, a nut that is screwed onto the ball screw and that is fixed to the platen supporter, and a motor that rotates the ball screw.

The second conveyance path can accurately adjust a height position, in the up-down direction, of the platen supported by the platen supporter, by raising and lowering the platen supporter using the ball screw.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A platen conveyance device comprising:

a first conveyance path configured to convey a platen to a pretreatment device;

a platen supporter configured to support the platen conveyed by the first conveyance path;

a second conveyance path provided with the platen supporter, and configured to convey the platen supporter to a printer; and a positioner configured to position the platen supported by the platen supporter at a prescribed printing position in a first direction in a horizontal direction;

wherein the positioner includes an engaged portion provided on the platen supporter, the engaged portion being configured to move in the first direction with respect to the platen supporter and being a portion with which an engaging portion, provided on the platen, engages in a state of the platen being supported by the platen supporter, and the engaged portion positioning the platen at the prescribed printing position by moving in the first direction in a state of the engaging portion being engaged therewith, and the engaging portion includes a first engaging portion configured to move in the first direction with respect to the platen supporter, and a second engaging portion being fixed in the first direction with respect to the first engaging portion, and the positioner positions the platen at the prescribed printing position by the engaged portion moving in the first direction in a state of at least one of the first engaging portion or the second engaging portion being engaged therewith.

2. The platen conveyance device according to claim 1, wherein the positioner positions the platen at the prescribed printing position by the engaged portion moving in the first direction in the state of the one of the first engaging portion or the second engaging portion being engaged therewith, and the positioner includes a reference portion provided on the platen supporter, the reference portion engaging with the other of the first engaging portion or the second engaging portion when the platen is positioned at the prescribed printing position.

3. The platen conveyance device according to claim 2, wherein the positioner includes an urging portion configured to urge the engaged portion toward the reference portion.

4. The platen conveyance device according to claim 3, wherein in a state of the platen being separated from the platen supporter, in the first direction, a distance between the engaged portion and the reference portion is larger than a distance between the first engaging portion and the second engaging portion, the engaged portion is configured to move in a direction approaching the reference portion, in the first direction, and the platen conveyance device further comprises:

a detector configured to detect that the platen is supported by the platen supporter; and a controller configured to urge the engaged portion toward the reference portion by controlling the urging portion, when it is detected by the detector that the platen is supported by the platen supporter.

5. The platen conveyance device according to claim 1, wherein the positioner positions the platen at the prescribed printing position, in a second direction orthogonal to the first direction in the horizontal direction, by the engaged portion moving in the first direction in the state of the at least one of the first engaging portion or the second engaging portion being engaged with the engaged portion.

6. The platen conveyance device according to claim 5, wherein a specific engaging portion, which is the at least one of the first engaging portion or the second engaging portion engaged with the engaged portion, has a shape that opens while widening to both sides, in the second direction, the further from the specific engaging portion toward the engaged portion.

7. The platen conveyance device according to claim 1, wherein the positioner positions the platen at the prescribed printing position, in an up-down direction, by the engaged portion moving in the first direction in the state of the at least one of the first engaging portion or the second engaging portion being engaged therewith.

8. The platen conveyance device according to claim 1, further comprising:

a rotation restricting member configured to restrict the platen from rotating with respect to the platen supporter in the horizontal direction.

9. The platen conveyance device according to claim 1, further comprising:

a movement restricting portion configured to restrict the platen supporter from being conveyed by the second conveyance path.

10. A platen conveyance device comprising:

a first conveyance path configured to convey a platen to a pretreatment device;

a platen supporter configured to support the platen conveyed by the first conveyance path;

a second conveyance path provided with the platen supporter, and configured to convey the platen supporter to a printer; and a positioner configured to position the platen supported by the platen supporter at a prescribed printing position in a first direction in a horizontal direction;

wherein the platen includes an upper plate and a lower plate separated from each other in an up-down direction, and extending in the horizontal direction, the positioner includes a vertical moving member provided on the platen supporter and configured to move in the up-down direction between the upper plate and the lower plate, the vertical moving member positions the platen at the prescribed printing position in the up-down direction also, by coming into contact with one of the upper plate or the lower plate when moving in an upward direction or a downward direction, the positioner includes a pin provided on the platen supporter and extending in the up-down direction, the upper plate or the lower plate includes a fitting hole, and the positioner positions the platen at the prescribed printing position in the horizontal direction by the pin fitting into the fitting hole.

11. The platen conveyance device according to claim 10, wherein the vertical moving member positions the platen by moving in the upward direction or the downward direction after the platen supporter supports the platen.

12. The platen conveyance device according to claim 10, wherein the vertical moving member positions the platen by moving in the downward direction.

13. A platen conveyance device comprising:

a first conveyance path configured to convey a platen to a pretreatment device;

a platen supporter configured to support the platen conveyed by the first conveyance path;

a second conveyance path provided with the platen supporter, and configured to convey the platen supporter to a printer; and a positioner configured to position the platen supported by the platen supporter at a prescribed printing position in a first direction in a horizontal direction; wherein the platen includes an upper plate and a lower plate separated from each other in an up-down direction, and extending in the horizontal direction, the positioner includes a vertical moving member provided on the platen supporter and configured to move in the up-down direction between the upper plate and the lower plate, the vertical moving member positions the platen at the prescribed printing position in the up-down direction also, by coming into contact with one of the upper plate or the lower plate when moving in an upward direction or a downward direction, the platen includes a side face plate provided standing in the up-down direction, and an insertion hole provided in the side face plate, having an elliptical shape longer in the up-down direction than in the first direction in the horizontal direction, and extending in a second direction orthogonal to the first direction in the horizontal direction, the positioner includes a horizontal pin configured to move in the horizontal direction toward the side face plate, the horizontal pin has a diameter larger than a length, in the first direction, of the insertion hole, a tapered portion is provided at a leading end portion, of the horizontal pin, facing the side face plate, a diameter of the tapered portion becoming smaller toward the side face plate, and the positioner positions the platen at the prescribed printing position in the horizontal direction by the horizontal pin moving in the horizontal direction toward the side face plate, and the tapered portion being inserted into the insertion hole and coming into contact with both of side edge portions, in the first direction, of the insertion hole.

14. The platen conveyance device according to claim 13, wherein the positioner positions the platen at the prescribed printing position in the horizontal direction by moving the horizontal pin in the horizontal direction toward the side face plate after the platen supporter supports the platen, and subsequently, positions the platen at the prescribed printing position in the up-down direction also, by moving the vertical moving member in the upward direction or the downward direction.

15. A platen conveyance device comprising:

a first conveyance path configured to convey a platen to a pretreatment device;

a platen supporter configured to support the platen conveyed by the first conveyance path;

a second conveyance path provided with the platen supporter, and configured to convey the platen supporter to a printer; and a positioner configured to position the platen supported by the platen supporter at a prescribed printing position in a first direction in a horizontal direction; wherein the platen includes a pair of side face plates provided standing in an up-down direction, and an insertion hole provided in the side face plate, having an elliptical shape longer in the up-down direction than in the first direction in the horizontal direction, and extending in a second direction orthogonal to the first direction in the horizontal direction, the positioner includes a horizontal pin configured to move in the horizontal direction toward the side face plate, the horizontal pin has a diameter larger than a length, in the first direction, of the insertion hole, a tapered portion is provided at a leading end portion, of the horizontal pin, facing the side face plate, a diameter of the tapered portion becoming smaller toward the side face plate, and the positioner positions the platen at the prescribed printing position in the horizontal direction and positions the platen at the prescribed printing position in the up-down direction also, by the horizontal pin moving in the horizontal direction toward the side face plate, and the tapered portion being inserted into the insertion hole and coming into contact with both of side edge portions, in the first direction, and a lower edge portion of the insertion hole, or with both the side edge portions and an upper edge portion of the insertion hole.

16. A platen conveyance device comprising:

a first conveyance path configured to convey a platen to a pretreatment device;

a platen supporter configured to support the platen conveyed by the first conveyance path;

a second conveyance path provided with the platen supporter, and configured to convey the platen supporter to a printer; and a positioner configured to position the platen supported by the platen supporter at a prescribed printing position in a first direction in a horizontal direction; wherein the platen includes an upper plate and a lower plate separated from each other in an up-down direction, and extending in the horizontal direction, the positioner includes a vertical moving member provided on the platen supporter and configured to move in the up-down direction between the upper plate and the lower plate, the vertical moving member positions the platen at the prescribed printing position in the up-down direction also, by coming into contact with one of the upper plate or the lower plate when moving in an upward direction or a downward direction, the vertical moving member includes an R portion having a diameter becoming smaller toward a leading end, a hole, into which the R portion of the vertical moving member is fitted, is provided in one of the upper plate or the lower plate, and the positioner positions the platen at the prescribed printing position in the horizontal direction and positions the platen at the prescribed printing position in the up-down direction also, by the vertical moving member moving between the upper plate and the lower plate toward the upper plate or the lower plate in which the hole is provided, and the R portion being fitted into the hole.

17. The platen conveyance device according to claim 1, wherein the positioner is disposed further to an inside than an outer shape of the platen supporter.

* * * * *